(12) United States Patent
Chou et al.

(10) Patent No.: US 11,933,720 B2
(45) Date of Patent: Mar. 19, 2024

(54) OPTICAL TRANSMISSION SAMPLE HOLDER AND ANALYSIS AT MULTIPLE WAVELENGTHS

(71) Applicant: Essenlix Corporation, Monmouth Junction, NJ (US)

(72) Inventors: Stephen Y. Chou, Princeton, NJ (US); Wei Ding, Princeton, NJ (US); Ji Qi, Hillsborough, NJ (US); Jun Tian, Belle Mead, NJ (US); Wu Chou, Basking Ridge, NJ (US); Hongbing Li, Skillman, NJ (US)

(73) Assignee: Essenlix Corporation, Monmouth Junction, NJ (US)

( * ) Notice: Subject to any disclaimer, the term of this patent is extended or adjusted under 35 U.S.C. 154(b) by 0 days.

(21) Appl. No.: 17/621,216

(22) PCT Filed: Jun. 22, 2020

(86) PCT No.: PCT/US2020/039031
§ 371 (c)(1),
(2) Date: Dec. 20, 2021

(87) PCT Pub. No.: WO2020/257809
PCT Pub. Date: Dec. 24, 2020

(65) Prior Publication Data
US 2022/0357271 A1 Nov. 10, 2022

Related U.S. Application Data

(60) Provisional application No. 62/864,491, filed on Jun. 20, 2019.

(51) Int. Cl.
*G01N 21/31* (2006.01)
*G01N 21/03* (2006.01)

(52) U.S. Cl.
CPC ............. *G01N 21/31* (2013.01); *G01N 21/03* (2013.01); *G01N 2021/0346* (2013.01); *G01N 2021/3129* (2013.01)

(58) Field of Classification Search
None
See application file for complete search history.

(56) References Cited

U.S. PATENT DOCUMENTS 9,407,836 B2 8/2016 Langhoff et al.
2003/0128409 A1 7/2003 Vook et al.

FOREIGN PATENT DOCUMENTS

JP 2010078611 A 4/2010
WO 2017027643 A1 2/2017
WO 2018191180 A1 10/2018

OTHER PUBLICATIONS

Written Opinion of the International Searching Authority established by the ISA/KR completed on Oct. 13, 2020.

*Primary Examiner* — Rufus L Phillips

(57) ABSTRACT

The disclosure provides an apparatus, a device, and methods for improving optical analysis of a thin layer of a sample between two plates, particularly for multiple wavelengths.

40 Claims, 25 Drawing Sheets

OPTICAL TRANSMISSION SAMPLE HOLDER AND ANALYSIS AT MULTIPLE WAVELENGTHS

CROSS REFERENCE

This application is a National Stage Entry (§ 371) of International Application No. PCT/US2020/039031, filed on Jun. 22, 2020, which claims the benefit of U.S. provisional application No. 62/864,491, filed on Jun. 20, 2019, both of which are incorporated herein in its entirety for all purposes.

FIELD

The present disclosure is related to devices and methods for improving optical transmission analysis of a thin layer of a sample sandwiched between two plates.

BACKGROUND

The disclosure generally relates to the field of optical transmission analysis of a sample. More particularly, the disclosure relates to a method and apparatus for optical transmission analysis of a sample such hemoglobin.

An optical absorption by a thin layer of a sample is one of the methods to assay a biological and chemical sample. One way to measure an optical absorption is to measure the intensity of the incident light and the transmitted light that directly goes in and out of a sample, respectively.

However, in many practical situations, it can be difficult to directly measure these light intensities, because of various reasons. One reason is that a thin layer sample often needs a sample holder for a measurement and the transmitted light being measured is the light that goes through both the sample and the sample holder. Hence, there is a need for a method that can separate the light absorption by the sample holder from that by the sample.

Another reason is that the incident light and transmitted light are on the opposite side of a sample, it is difficult to use a single detector to both light. Hence, there is a need for using a single photodetector for an absorption measurement.

In prior approaches of optical transmission measurement of a thin sample, a sample holder that comprises two plates has been used to sandwich a sample into a thin layer between the two plates, and the light transmission through an air bubble inside the sample thin layer (which can occur under certain conditions) was used as a reference signal to separate the light absorption by the sample holder from that by the sample. This approach also allows an optical absorption measurement with a single photodetector. In the method, it assumes that (i) light transmission through the air bubble area is the same as that through a zero thickness sample, and (ii) light absorption by the sample holder is the same in the air bubble area (where the reference signal is measured) and in the sample area (where the sample single is measured). However, in reality, both assumptions can be wrong. An air bubble can be generated significantly away from the location of the sample signal, so that there is a significant difference in sample holder absorptions between two locations. The air bobble can be too small, so that light will be significantly scattered and the reference signal is significantly different from a sample having zero thickness. Furthermore, the air bubble generation is random in both occurrences (can or cannot occur) and the location (e.g., random locations).

Accordingly, an object of the present invention is to provide the devices and methods to generate the reference light, simplify the optical transmission measurement, and simplify a sample handling. The present invention can overcome or reduce the disadvantages of the prior devices or systems.

SUMMARY

In some embodiments, the disclosure provides an apparatus and a method for measuring different wavelengths using a single color camera (e.g., RGB) for analyte sensing and imaging.

In some embodiments, the disclosure provides an apparatus and a method for measuring or determining certain properties of, for example, a biological or a chemical sample by interrogation of the sample with light.

In some embodiments, the disclosure provides an apparatus and a method for optical transmission analysis of a sample, for example, situated in a sample holder comprising two plates.

In some embodiments, the apparatus (e.g., having a Bayer filter before a sample cavity), comprises in the order listed:
 a single white light source;
 a dual-band or triple-band bandpass filter to, e.g., selectively, filter the white light into component colors prior to interrogating the sample;
 a cavity for a receiving a sample, such as a sample holder having, for example, a slot to receive a plate having a sample, for example, a QMAX card;
 an imaging lens (for example, a single lens or a plurality of lenses. The function of the imaging lens is to allow enhanced imaging on the sensor);
 a RGB Bayer filter for filtering the light emitted from the interrogated sample;
 a sensor for receiving the filtered light from the RGB Bayer filter; and
 optionally a processor for image processing of light signal information recorded by the sensor.

An RGB Bayer filter and a sensor or sensor array are commercially available in combination, i.e., as a single or integral component having the combination of the filter and the sensor.

In embodiments: the sensor can be, for example, at least one pixel of a camera; the sensor can be, for example, part of the camera of a smartphone; and the RGB Bayer filter and the sensor are in a combination as a single component.

In some embodiments, the method comprises:
 irradiating a dual-band or triple-band bandpass filter with light from a single white light source to produce filtered light having a mixture of light having dual or triple wavelengths of a narrow bandwidth, e.g., narrow bands can have a width of from 50 to 100 nm;
 interrogating a sample with the filtered light;
 optionally conditioning or passing the light emitted from the interrogated sample through an imaging lens, e.g., at least one lens, or a plurality of lenses;
 passing the light emitted from the imaging lens through a RGB Bayer filter;
 sensing and recording the light emitted from the RGB Bayer filter with a sensor; and
 image processing and analyzing the sensed and recorded light.

In some embodiments, the sensed and recorded light can be, for example, further processed, i.e., the method further comprising, e.g., image processing of the sensed and recorded light to remove or cleanup color overlap (e.g., subtracting overlapping color signals); and analyzing the data for a particular analyte, such as hemoglobin and like analytes.

The following embodiments are illustrated in FIG. 20, where the RGB filter is situated after or subsequent to the sample.

In some embodiments, the apparatus (e.g., having the Bayer filter after a sample cavity)(i.e., for the sample and sample holder) comprises, in the order listed:
- a single white light source;
- a cavity for a receiving a sample, such as a sample holder;
- a dual-band or triple-band bandpass filter to selectively filter the light emitted from an interrogated sample into component colors;
- an imaging lens, for example, a single lens or a plurality of lenses (the function of the imaging lens is to allow imaging on the sensor);
- a RGB Bayer filter for filtering the light emitted from the imaging lens; and
- a sensor for receiving the filtered light from the RGB Bayer filter; and
- optionally a processor for image processing of the lighted sensed by the sensor.

In some embodiments, the method comprises:
- interrogating a sample with light from a single white light source; and
- filtering the light emitted from the interrogated sample with a dual-band or triple-band bandpass filter to produce a mixture of light having dual or triple wavelengths having narrow bands or band width;
- optionally conditioning the mixture of light having dual or triple wavelengths of narrow bandwidths with an imaging lens;
- passing the light emitted from the imaging lens through an RGB Bayer filter;
- sensing and recording the light emitted from the RGB Bayer filter with a sensor; and.
- optionally a processor for image processing of light signal information recorded by the sensor.

Among other things, the present invention is related to devices and methods for improving optical analysis of a thin layer of a sample sandwiched between containing between two plates, particularly, for generating a reference signal that can improve the optical analysis, and for applications, such as, for example, assaying hemoglobin of blood.

A property (e.g., a biological or chemical property) of a sample can be determined by the optical density (i.e., OD) of the sample by the ratio of the intensity of the transmitted light through a thin sample layer to the incident light (i.e. the Beer-Lambert's Law). However, a thin layer sample often needs a sample holder for a measurement, and the light being measured also goes through the sample holder. There is a need to separate the optical transmission signal and optical absorption (e.g., optical density) of a sample from the total transmitted light, which includes the light transmission through the sample and through the sample holder.

One objective of the present invention is to provide the devices and methods of certain embodiments of a sample holder and the use of that improves the optical transmission measurements.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A skilled artisan will understand that the drawings, described below, are for illustration purposes only. In some Figures, the drawings are in scale. In the figures that present experimental data points, the lines that connect the data points are for guiding a view of the data only and have no other means. For clarity purposes, some elements are enlarged when illustrated in the Figures. It should be noted that the Figures do not intend to show the elements in strict proportion. The dimensions of the elements should be delineated from the descriptions herein provided and incorporated by reference. The drawings are not intended to limit the scope of the present invention in any way.

DETAILED DESCRIPTION

Figure 1A:
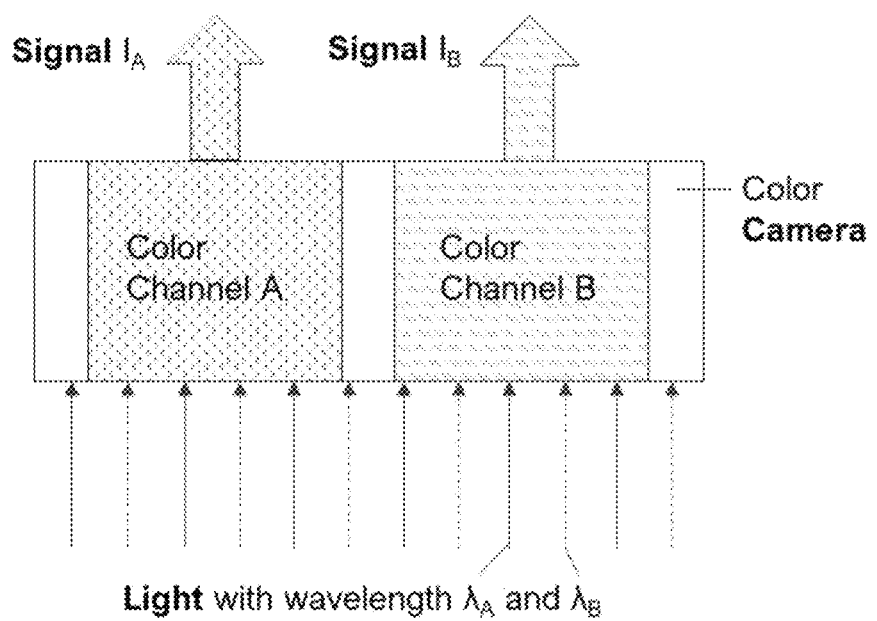
FIG. 1A illustrates a device for determining the intensity for each wavelength in a light with two different wavelengths using one color camera, in accordance with an embodiment.
Figure 1B:
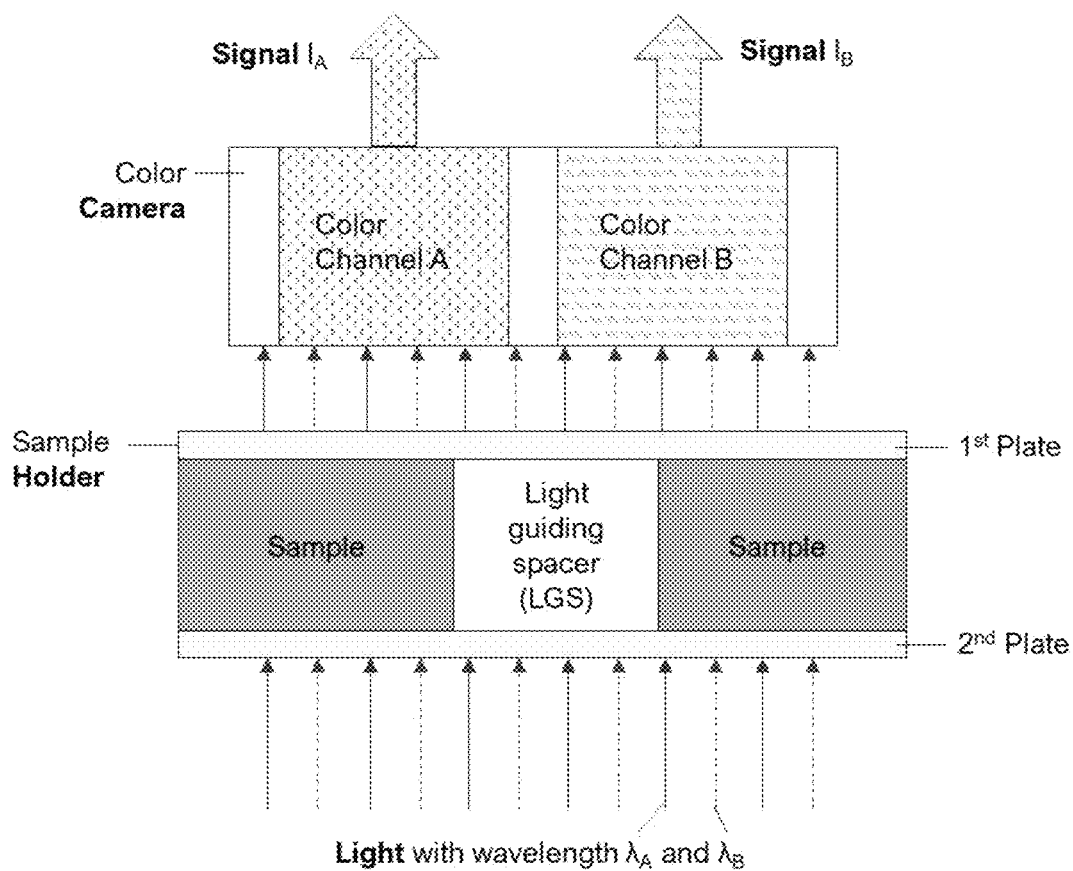
FIG. 1B illustrates an apparatus for measuring light absorption of a sample for each of the two different wavelengths, in accordance with an embodiment.

The following detailed description illustrates certain embodiments of the disclosure by way of example and not by way of limitation. If any, the section headings and any subtitles used herein are for organizational purposes only and are not to be construed as limiting the subject matter described in any way. The contents under a section heading or subtitle are not limited to the section heading or subtitle, but apply to the entire description of the disclosure.

The citation of any publication is for its disclosure prior to the filing date and should not be construed as an admission that the present claims are not entitled to antedate such publication by virtue of prior invention. Further, the dates of publication provided can be different from the actual publication dates which can be independently verified.

Definitions

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are now described.

"Interrogation", "interrogating", "interrogated", or like terms refer to addressing or contacting a sample or specimen with light or illumination to gain information about the sample or specimen that results from the interaction of the sample or specimen with the light. The light resulting from the interrogation or interaction of initial light or illumination with the sample or specimen can be analyzed to reveal information about the sample or specimen. For example, when a sample such as fresh blood may contain hemoglobin or oxyhemoglobin, the analyzed light can reveal whether hemoglobin, oxyhemoglobin, or both, are present, and if present, the relative amounts or respective concentrations of hemoglobin and oxyhemoglobin in the sample.

"Average error" or like terms such as "mean error" usually refers to the average of all the errors in a set. An "error" in this context is an uncertainty in a measurement, or the difference between the measured value and true/correct value. The more formal term for error is measurement error, also called observational error.

"OTSA" or like terms refer to an optical transmission sample analysis, that measures the optical density (OD) of a thin sample layer by optical transmission.

"Imager", "sensor", "camera" and like terms can be used interchangeably.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

The terms "light guiding spacer" or "LGS" can refer to a pillar that, during an optical transmission measurement of a sample, has one end of the pillar in direct contact to a first plate and the other end of the pillar in direct contact of a second plate, In certain embodiments, the first plate and the second plate sandwich the sample between the two plates. In certain embodiments, the optical index and the size of the pillar are predetermined and known. In certain embodiments, the LGS is made of the same material as one or both of the plate. In certain embodiments, the LGS is bond, mold, imprinted, or other ways to connected to one or both plates.

The term "no significant amount of sample" can refer to an amount of sample that is insignificant to an optical transmission measurement of the sample when the measurement is performed in an area that has the two plates and the sample.

The term "LGS-Plate contact areas" can refer to the area in each end of the LGS (which has a pillar shape) that is in direct contact to one of the plates. In certain embodiments, the LGS and one plate is made in one piece of a material, then the LGS-Plate contact area for the end of the LGS connected to the plate is the cross-section of the LGS. In certain embodiments, the LDG and both plates are made of a single piece of material, then the LGS-Plate contact area for both ends of the LGS is the cross-section of the LGS.

The terms "lateral cross-section of the LGS" can refer to that a cross-section of a LGS that is parallel with the plates when the LGS is sandwiched between the two plates.

The terms of "the LGS-contact area or a lateral cross-section of the LGS are larger than the wavelength of the light" can refer to that the LGS-contact area or a lateral cross-section of the LGS are larger than the wavelength of the light is larger than the area of disk that has a diameter equal to the wavelength of the light.

The terms "OTSA" means optical transmission sample analysis, that measures the optical density of a thin sample layer by optical transmission.

The term "a SR region" or "a pair of SR region", which are interchangeable, can refer to one sampling region and one corresponding reference region, where an OD of a thin sample layer is determined by taking a ratio of the intensities of the light transmitted through the sample region and through the reference region.

The term "reference region" of an OAC device can refer to the region of the device where light of a wavelength and a polarization goes through the first plate, the light-guiding spacer, and the second plate, wherein the light guiding spacer is a direct contact of the first and second plates. The term "reference region" of an OAC device can refer to the region of the device where a light guiding spacer is sandwich between the two plates and has a direct contact respectively to each plate, wherein, in the reference region, a probing light transmits through, in sequence, the first plate, the light-guiding spacer, and the second plate, without going through the sample.

The term "sampling region" of an OAC device can refer to the region of the device where the light of the sample wavelength and the polarization, that goes through the reference region, goes through the first plate, a sample between the two plates, and the second plate without going through the light guiding spacer.

The term "sampling region" of an OAC device can refer to the region of the device where the sample is between the two plates without a LGS in that region; namely, in the sampling region, a probing light transmits through, in sequence, the first plate, a sample between the two plates, and the second plate without encountering LGS.

The term "exclusion distance for reference" refers to the minimum distance between the edge of the light guiding spacer and that of the reference region.

The term "exclusion distance for sampling" refers to the minimum distance between the edge of the light guiding spacer and that of the sampling region.

The term "distance between the sampling region and the reference region" of an OAC device and "exclusion distance between sampling and reference" are interchangeable, they refer to the shortest separation between the boundary of reference region and the boundary of the sampling region. Namely, the exclusion distance between sampling and reference is the sum of the exclusion distance for sampling and the exclusion distance for reference.

The terms "imager" and "camera" are interchangeable.

The term "imprinted" means that a spacer and a plate are fixed monolithically by imprinting (e.g., embossing) a piece of a material to form the spacer on the plate surface. The material can be single layer of a material or multiple layers of the material.

The term "etched" means that a spacer and a plate are fixed monolithically by etching a piece of a material to form the spacer on the plate surface. The material can be single layer of a material or multiple layers of the material.

The term "fused to" means that a spacer and a plate are fixed monolithically by attaching a spacer and a plate together, the original materials for the spacer and the plate fused into each other, and there is clear material boundary between the two materials after the fusion.

The term "bonded to" means that a spacer and a plate are fixed monolithically by binding a spacer and a plate by adhesion.

The term "attached to" means that a spacer and a plate are connected together.

The terms "CROF Card (or card)", "COF Card", "QMAX-Card", "Q-Card", "CROF device", "COF device", "QMAX-device", "CROF plates", "COF plates", and "QMAX-plates" are interchangeable, except that in some embodiments, the COF card does not comprise spacers; and the terms refer to a device that comprises a first plate and a second plate that are movable relative to each other into different configurations (including an open configuration and a closed configuration), and that comprises spacers (except some embodiments of the COF card) that regulate the spacing between the plates. The term "X-plate" can refer to one of the two plates in a CROF card, wherein the spacers are fixed to this plate. More descriptions of the COF Card, CROF Card, and X-plate are given in the provisional application Ser. No. 62/456,065, filed on Feb. 7, 2017, which is incorporated herein in its entirety for all purposes.

The term "open configuration" of the two plates in a QMAX process means a configuration in which the two plates are either partially or completely separated apart and the spacing between the plates is not regulated by the spacers.

The term "closed configuration" of the two plates in a QMAX process means a configuration in which the plates are facing each other, the spacers and a relevant volume of the sample are between the plates, the relevant spacing between the plates, and thus the thickness of the relevant volume of the sample, is regulated by the plates and the spacers, wherein the relevant volume is at least a portion of an entire volume of the sample.

The term "a sample thickness is regulated by the plate and the spacers" in a QMAX process means that for a give condition of the plates, the sample, the spacer, and the plate compressing method, the thickness of at least a port of the sample at the closed configuration of the plates can be predetermined from the properties of the spacers and the plate.

The term "inner surface" or "sample surface" of a plate in a QMAX card can refer to the surface of the plate that touches the sample, while the other surface (that does not touch the sample) of the plate is termed "outer surface".

The term "height" or "thickness" of an object in a QMAX process can refer to, unless specifically stated, the dimension of the object that is in the direction normal to a surface of the plate. For example, spacer height is the dimension of the spacer in the direction normal to a surface of the plate, and the spacer height and the spacer thickness means the same thing.

The term "area" of an object in a QMAX process can refer to, unless specifically stated, the area of the object that is parallel to a surface of the plate. For example, spacer area is the area of the spacer that is parallel to a surface of the plate.

The term of QMAX card can refer the device that perform a QMAX (e.g., CROF) process on a sample, and have or not have a hinge that connect the two plates.

The term "QMAX card with a hinge and "QMAX card" are interchangeable.

The term "angle self-maintain", "angle self-maintaining", or "rotation angle self-maintaining" can refer to the property of the hinge, which substantially maintains an angle between the two plates, after an external force that moves the plates from an initial angle into the angle is removed from the plates.

The term "a spacer has a predetermined height" and "spacers have a predetermined inter-spacer distance" means, respectively, that the value of the spacer height and the inter spacer distance is known prior to a QMAX process. It is not predetermined, if the value of the spacer height and the inter-spacer distance is not known prior to a QMAX process. For example, in the case that beads are sprayed on a plate as spacers, where beads are landed at random locations of the plate, the inter-spacer distance is not predetermined. Another example of not predetermined inter spacer distance is that the spacers move during a QMAX processes.

The term "a spacer is fixed on its respective plate" in a QMAX process means that the spacer is attached to a location of a plate and the attachment to that location is maintained during a QMAX (i.e., the location of the spacer on respective plate does not change) process. An example of "a spacer is fixed with its respective plate" is that a spacer is monolithically made of one piece of material of the plate, and the location of the spacer relative to the plate surface does not change during the QMAX process. An example of "a spacer is not fixed with its respective plate" is that a spacer is glued to a plate by an adhesive, but during a use of the plate, during the QMAX process, the adhesive cannot hold the spacer at its original location on the plate surface and the spacer moves away from its original location on the plate surface.

Measuring Multiple Wavelengths Intensity and Sample Absorption Using a Single Color Camera In some embodiments, the disclosed apparatus and method can use a single white light source and a dual-band or triple-band bandpass filter to convert or clean the single white light into a mixture of different colored lights. The bandpass filter can convert or clean the single white light, for example, before interrogating the sample (see FIG. 19A-19D), after interrogating the sample (see FIG. 20), or both before and after interrogating the sample (not shown).

The dual or triple wavelengths will be sufficiently separated, e.g., one wavelength is in the red color region and another wavelength is in green color region. After the light is finally collected by the R, G, and B channels of a sensor (e.g., a digital camera or CCD array), the signal of each channel was nearly exclusively comprised of the light of a single wavelength of a narrow band width. By taking (i.e., making or recording) a single sensor image (a single "shot"), one can get the transmitted signal at two wavelengths of narrow band and at most at three wavelengths of narrow band with the Bayer filter.

In some embodiments, the disclosed apparatus and method can use a single white light source and a dual-band or a triple-band bandpass filter. In some embodiments, the disclosed apparatus and method causes or makes the white light go through a dual-band or triple band bandpass filter first to clean-up, i.e., separate the white light into two or three colored light components such as red and green light from a dual-band bandpass filter, or blue-red-green light from a triple-band bandpass filter. After clean-up, the light is a mixture of light separated into different colors. The dual or triple wavelengths can be sufficiently separated, e.g., one wavelength is in the red color region and another wavelength is in green color region. After the light is finally collected by the R, G, and B channels of a sensor (e.g., a digital camera, a CCD array, and like imagers), the signal of each channel is nearly exclusively comprised of the light of a single wavelength of a narrow bandwidth. If the signal of a channel is not exclusively comprised of the light of a single wavelength or a range of wavelengths of a narrow bandwidth it may include wavelengths or overlap from an adjacent color such as blue light having slight overlap with green wavelengths, red light having slight overlap with green wavelengths, or green having slight overlap with one or both of blue and red light wavelengths. By taking (i.e., making or recording) a single sensor image (i.e., a "single shot" or single exposure; or composite exposure), one can get the transmitted signal of at two wavelengths of narrow bandwidth or at most or no more than at three wavelengths of narrow bandwidth with a Bayer filter.

Figure 13:
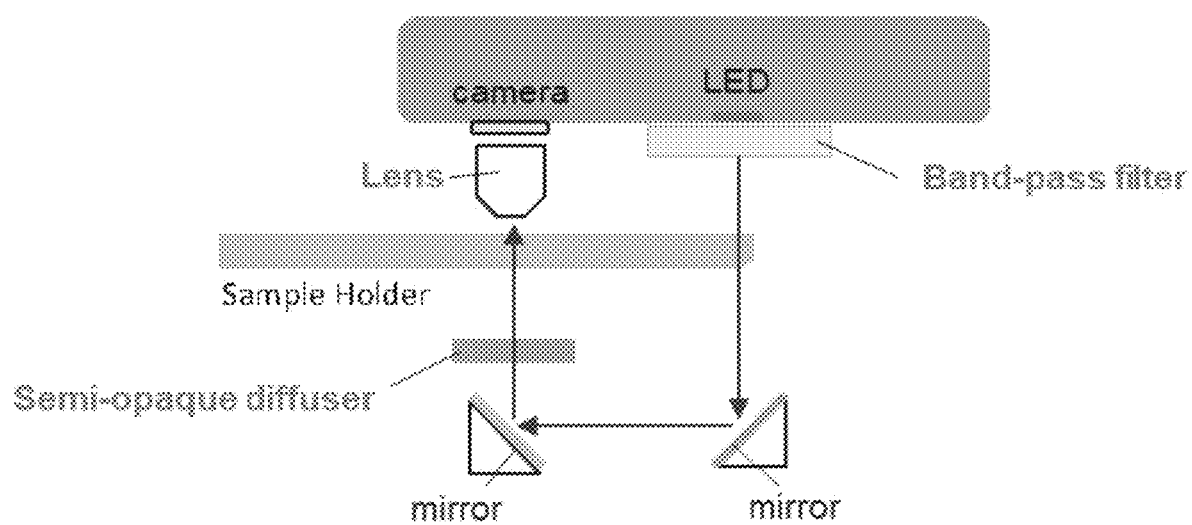
FIG. 13 illustrates an optical setup for measuring hemoglobin in QMAX card.

In some embodiments, the disclosure provides a method of making the abovementioned apparatus, comprising, for example: assembling the described and illustrated components into the configuration shown, for example, in FIG. 13.

In some embodiments, the disclosure provides a method of using the abovementioned apparatus, for analyzing a sample, such as a blood sample, for an analyte such hemoglobin.

In some embodiments, the disclosed apparatus and method sequentially: interrogates a sample in an imaging field with white emitted light from a single source light; processes the resultant light from the imaging field; generates digital information for the sample from the resultant light; and generates a response file for the sample from the digital information. The response file generated can be used for, for example, sizing, enumeration, characterization, classification, and like analysis of the content of the sample.

The processing step can include, for example, an optical detection step followed by an electronic processing step.

Applicant's aforementioned application entitled "Improved Optical Transmission Sample Holder and Analysis, Particularly for Hemoglobin" mentions an apparatus and method for measuring an analyte such as hemoglobin. The application mentions an apparatus or device having a particular sample holder, termed OAC (i.e., optical analysis card). The application also mentions a measurement method where the optical density of a material is determined by, for example, interrogating a sample in the holder with a single light source, such as an LED, and taking a ratio of the intensities of the two transmitted lights: one is the light that transmits through the sampling region of the sample holder, and the other is the light that transmits through the reference region of the sample holder, wherein the optical density (OD) of the sample is determined without directly measuring the incident light.

Example. The two color channels are the red and green channels of a color camera.

A method of distinguishing light absorption of a sample for each of two different wavelengths using a single color camera, the method comprising:
    providing a color camera comprising three groups of detecting elements, each group for detecting one different color, wherein the three different colors is respectively, red, green, and blue;
    providing a non-transitory computer readable medium storing an algorithm that
    transmitting, through a sample, the light of a first wavelength and the light of a second wavelength simultaneously;
    detecting, using the camera, the total transmitted light that is a sum of the light of the first wavelength and the second wavelength transmitted through the sample and collected by the camera;
    determining the transmitted light of the first wavelength through the sample and the transmitted light of the second wavelength through the sample using the total transmitted light and the algorithm;
    wherein the algorithm comprising a formula, $$\begin{bmatrix} R_{\lambda_1} & R_{\lambda_2} \\ G_{\lambda_1} & G_{\lambda_2} \end{bmatrix}^{-1} \begin{bmatrix} I_R \\ I_G \end{bmatrix} = \begin{bmatrix} I_{\lambda_1} \\ I_{\lambda_2} \end{bmatrix}$$

wherein $I_{\lambda_1}$ and $I_{\lambda_2}$ are the transmitted light intensity of the first and second wavelength to be determined; $I_R$ and $I_G$ are the sum of total transmitted light intensity measured in camera's green and red channels;
    wherein $$\begin{bmatrix} R_{\lambda_1} & R_{\lambda_2} \\ G_{\lambda_1} & G_{\lambda_2} \end{bmatrix}$$

is the channel cross-talking matrix,
    wherein $R_{\lambda_1}$ is the percentage of light going into camera's red channel when there is only the light of the first wavelength going into the camera; $R_{\lambda_2}$ is the percentage of light going into camera's red channel when there is only the light of the second wavelength going into the camera; wherein $G_{\lambda_1}$ is the percentage of light going into camera's green channel when there is only the light of the first wavelength going into the camera; $G_{\lambda_2}$ is the percentage of light going into camera's green channel when there is only the light of the second wavelength going into the camera;
    calculating the $I_{\lambda_1}$ of both the sample area and the pillar reference area, the ratio between the two value is the sample absorption at the first wavelength, calculating the $I_{\lambda_2}$ of both the sample area and the pillar reference area, the ratio between the two value is the sample absorption of the second wavelength Principles and Certain Examples In some embodiments, the disclosure provides an apparatus, a device, and a method for improving optical transmission analysis of, for example, a thin layer of a sample situated between two plates, particularly, for generating a sample signal that can improve the optical analysis, and for an application of assaying an analyte in a sample, e.g., hemoglobin in a blood sample.

Certain biological or chemical properties of a sample can be determined by measuring the absorption coefficient of a thin sample layer, $\alpha_s$, in a light transmission experiment through the sample layer. Using Beer-Lambert's Law, the light absorption coefficient of a thin sample layer, $\alpha_s$, is related to the incident light intensity (i.e., the light incident to the sample), $I_i$, and the transmitted light intensity (i.e., the light goes through the sample), $I_t$:

$$OD = \ln\left(\frac{I_i}{I_t}\right) = \alpha_s L_s,$$

where $L_s$ is the length (i.e., thickness) of the sample layer, and OD is the optical density through the sample layer. The light absorption coefficient of a thin sample layer, $\alpha_s$, can be related a property of the sample. Therefore, using the Beer-Lambert's Law, one can determine a property of a sample by measuring the OD of a sample layer.

However, in practice, it is hard to directly measure the intensity of both incident light (i.e., the light directly incident to a sample layer) and transmitted light (i.e., the light directly transmitted through the sample). Typically, what is measured in experiments are the total light transmission through both the sample and the sample holder. This is because a thin layer sample often needs a sample holder for a measurement, and the light being measured also goes through the sample holder. Accordingly, there is a need to separate or determine the OD of a sample from the total light transmission.

In some embodiments, a particular sample holder, termed OAC (i.e., optical analysis card), is provided, and an optical density of a material is determined by taking a ratio of the intensities of two transmitted lights: one is the light that transmits through the sampling region of the sample holder, and the other is the light that transmits through the reference region of the sample holder, wherein the OD of the sample is determined without directly measuring the incident light.

Specific and preferred values disclosed for components, ingredients, additives, dimensions, conditions, times, and like aspects, and ranges thereof, are for illustration only; they do not exclude other defined values or other values within defined ranges. The apparatus, device, and method of the disclosure can include any value or any combination of the values, specific values, more specific values, and preferred values described herein, including explicit or implicit intermediate values and ranges.

The Bayer Color Filter Array (CFA) CMOS Sensor

A Bayer filter mosaic is a color filter array (CFA) for arranging RGB color filters on, for example, a square grid of photosensors. Its particular arrangement of color filters is used in most single-chip digital image sensors used in digital cameras, camcorders, and scanners to create a color image. The filter pattern is 50% green, 25% red, and 25% blue.

Bryce Bayer (U.S. Pat. No. 3,971,065) referred to the green filtered photosites as luminance-sensitive elements and the red and blue sites as chrominance-sensitive elements. Bayer used twice as many green elements as red or blue to mimic the physiology of the human eye. The Bayer pattern data from the sensor is what is referred to as RAW image data.

Optical bandpass filters are used to selectively transmit a portion of the spectrum of the incident radiation while rejecting or blocking all or substantially all other wavelengths. A primitive optical bandpass filter is a prism that can split or disperse white light into a spectrum of light colors. Analysis of white light by dispersing it with a prism is an example of spectroscopy. A variety of bandpass filters and fluorescence bandpass filters are commercially available (see e.g., Edmund Optics, Inc., edmundoptics.com), such as Traditional Coated 400-699 nm Bandpass Interference Filters, available in UV, Visible, and IR Center Wavelengths, 10-80 nm Bandwidths Available, and ideal for Biomedical Applications and Instrumentation Integration To reconstruct a full-color RGB image from the data, such as "RAW" image data, collected by the color filter array, some form of interpolation is used to fill in the blanks. The mathematic processing is called demosaicing and can be performed in different ways. Simple methods interpolate the color value of the pixels of the same color in the neighborhood. For example, a pixel with a green filter provides an exact measurement of the green component. The red and blue components for this pixel are obtained from the neighbors. For a green pixel, two red neighbors can be interpolated to yield the red value. Also, two blue pixels can be interpolated to generate the blue value.

RAW refers to any of several native data formats that contain the full data captured by a sensor. Typically, these native data formats are proprietary, and each company uses its own. Since a RAW file is a set of single luminance values for each pixel on the sensor there is no actual per-pixel color information to a RAW file. Color is derived by comparing adjoining pixels that are filtered for one of three colors with a Bayer mask.

In some embodiments, alternatives to a Bayer Color Filter Array can be considered and can include, for example:

Panasonic's Low Light Filterless Sensor Technology, i.e., OPF (Organic Photoconductive Film) technology that can accomplished color separation by diffraction using "micro color splitters", and potentially offers higher sensitivity, wider dynamic range, improved global shutter, and variable sensitivity; and An article entitled "BRIGHT IDEA FOR LOWLIGHT PHOTOGRAPHY" (https://unews.utah.edu/bright-idea-for-lowlight-photography/)(Published Oct. 27, 2015, accessed Jun. 18, 2019) mentions a camera color filter for digital cameras that lets in three times more light than conventional filters, resulting in much cleaner, more accurate pictures taken in lowlight. The new filter can be used for any kind of digital camera, but the filter can be especially useful for smartphone cameras. The filter is about a micron thick (100 times thinner than a human hair). The filter includes a wafer of glass that has precisely-designed microscopic ridges etched on one side that bends the light in certain ways as it passes through and creates a series of color patterns or codes. Software then reads the codes to determine what colors they are.

In some embodiments, an apparatus and a method of using an RGB color camera sensor to measure a transmitted light signal at dual wavelengths in red and green color regions by a single sensor image or single camera shot. The white light from a white light source firstly goes through a dual-band bandpass filter to make the white light into a mixture of light having two wavelengths of a narrow band width that are, for example, green and red colored light, respectively. After the bandpass filter, the resulting cleaned-up light goes through the sample (i.e., interrogates the sample) and the imaging lens and finally reaches the RGB color filter situated in front of the camera sensor or like sensor. The R filter or R channel of the RGB color filter nearly exclusively collects the narrow-band width red light in the mixed light, and the G filter or R channel of the RGB color filter nearly exclusively collects the narrow-band width green light in the mixed light. The center wavelength of the dual-band bandpass filter in the green region can be, for example, any wavelength from 500 to 550 nm, and the bandwidth can be, for example, 1 nm, 5 nm, 20 nm, 50 nm, or any intermediate values. The center wavelength of the dual-band bandpass filter in red region can be, for example, any wavelength from 600 to 700 nm, and the bandwidth can be, for example, 1 nm, 5 nm, 20 nm, 50 nm, or any intermediate values.

In some embodiments, an apparatus and a method of using an RGB color camera sensor to measure a transmitted signal at dual wavelengths in red and blue color regions by a single sensor image or single camera shot. The white light from a white light source firstly goes through a dual-band bandpass filter to make the white light into a mixture of light having two wavelengths of a narrow band width that are, for example, blue and red colored light, respectively. After the bandpass filter, the resulting cleaned-up light goes through the sample (i.e., interrogates the sample) and the imaging lens and finally reaches the RGB color filter situated in front of the camera sensor or like sensor. The R filter or R channel of the RGB color filter nearly exclusively collects the narrow-band width red light in the mixed light, and the B filter or B channel of the RGB color filter nearly exclusively collects the narrow-band width blue light in the mixed light. The center wavelength of the dual-band bandpass filter in the blue region can be, for example, any wavelength from 400 to 450 nm, and the bandwidth can be, for example, 1 nm, 5 nm, 20 nm, 50 nm, or any intermediate values. The center wavelength of the dual-band bandpass filter in red region can be, for example, any wavelength from 600 to 700 nm, and the bandwidth can be, for example, 1 nm, 5 nm, 20 nm, 50 nm, or any intermediate values.

In some embodiments, an apparatus and a method of using an RGB color camera sensor to measure transmitted signal at dual wavelengths in green and blue color regions by a single sensor image or single camera shot. The white light from a white light source firstly goes through a dual-band bandpass filter to make the white light into a mixture of light having two wavelengths of a narrow band width that are, for example, green and blue colored light, respectively. After the bandpass filter, the resulting cleaned-up light goes through the sample (i.e., interrogates the sample) and the imaging lens and finally reaches the RGB color filter situated in front of the camera sensor or like sensor. The G filter or G channel of the RGB color filter nearly exclusively collects the narrow-band width green light in the mixed light, and the B filter or B channel of the RGB color filter nearly exclusively collects the narrow-band width blue light in the mixed light. The center wavelength of the dual-band bandpass filter in the blue region can be, for example, any wavelength from 400 to 450 nm, and the bandwidth can be, for example, 1 nm, 5 nm, 20 nm, 50 nm, or any intermediate values. The center wavelength of the dual-band bandpass filter in green region can be, for example, any wavelength from 500 to 550 nm, and the bandwidth can be, for example, 1 nm, 5 nm, 20 nm, 50 nm, or any intermediate values.

In some embodiments, an apparatus and a method of using an RGB color camera sensor to measure transmitted signal at triple wavelengths in green, blue and red color regions by a single sensor image or single camera shot. The white light from a white light source firstly goes through a triple-band bandpass filter to make the white light into a mixture of light having three wavelengths of narrow bandwidth that are, for example, green, blue, and red color, respectively. After the bandpass filter, the resulting cleaned-up light goes through the sample (i.e., interrogates the sample) and imaging lens and finally reaches the RGB color filter situated in front of the camera sensor or like sensor. The G filter or G channel of the RGB color filter nearly exclusively collects the narrow-band width green light in the mixed light, and the B filter or B channel of the RGB color filter nearly exclusively collects the narrow-band width blue light in the mixed light, and the R filter or R channel nearly exclusively collects the narrow-bandwidth red light in the mixed light. The center wavelength of the triple-band bandpass filter in blue region can be, for example, any wavelength from 400 nm to 450 nm, and the bandwidth can be 1 nm, 5 nm, 20 nm, 50 nm, or any values between them. The center wavelength of the triple-band bandpass filter in green region can be, for example, any wavelength from 500 nm to 550 nm, and the bandwidth can be, for example, 1 nm, 5 nm, 20 nm, 50 nm, or any intermediate value. The center wavelength of the triple-band bandpass filter in the red region can be, for example, any wavelength from 600 nm to 700 nm, and the bandwidth can be, for example, 1 nm, 5 nm, 20 nm, 50 nm, or any intermediate values.

In some embodiments, an apparatus and a method of using RGB color camera sensor to measure transmitted light signal at triple wavelengths in green, blue, and red color regions by a single sensor image or single camera shot. The position of the dual- or triple-band bandpass filter can be, for example, placed between two lenses or among the group of imaging lenses.

In some embodiments, the disclosure provides:

An apparatus comprising, in the order listed:

a single white light source;

a dual-band or triple-band bandpass filter to filter the white light into component colors prior to interrogating the sample;

a cavity for a receiving a sample;

an optional imaging lens for enhanced imaging on the sensor;

a RGB Bayer filter for filtering the light emitted from the interrogated sample; and a sensor for receiving the filtered light from the RGB Bayer filter.

A method comprising:

irradiating a dual-band or triple-band bandpass filter with light from a single white light source to produce filtered light having a mixture of light having dual or triple wavelengths of a narrow bandwidth of from 50 to 100 nm each;

interrogating a sample with the filtered light;

optionally conditioning or passing the light emitted from the interrogated sample through an imaging lens;

passing the light emitted from the imaging lens through a RGB Bayer filter;

sensing and recording the light emitted from the RGB Bayer filter with a sensor; and image processing the sensed and recorded light to remove or cleanup color overlap; and analyzing the data for a particular analyte.

An apparatus comprising, in the order listed:

a single white light source;

a cavity for a receiving a sample;

a dual-band or triple-band bandpass filter to selectively filter the light emitted from an interrogated sample into component colors;

an imaging lens;

a RGB Bayer filter for filtering the light emitted from the imaging lens; and a sensor for receiving the filtered light from the RGB Bayer filter.

A method comprising:

interrogating a sample with light from a single white light source; and filtering the light emitted from the interrogated sample with a dual-band or triple-band bandpass filter to produce a mixture of light having dual or triple wavelengths having narrow bands or band width;

optionally conditioning the mixture of light having dual or triple wavelengths of narrow bands with an imaging lens;

passing the light emitted from the imaging lens through an RGB Bayer filter;

sensing and recording the light emitted from the RGB Bayer filter with a sensor; and image processing the sensed and recorded light to remove or cleanup color overlap; and analyzing the data for a particular analyte.

Example. An Optical Setup for Measuring Hemoglobin in an QMAX Card Having a Dual Bandpass Filter Setup.

Figure 1C:
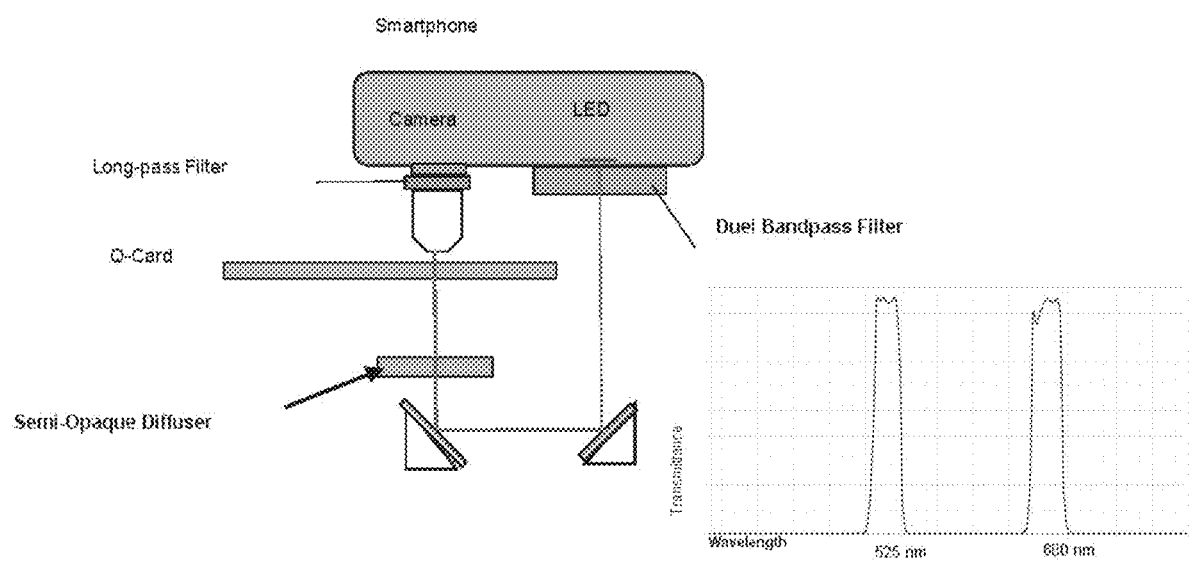
FIG. 1C illustrates an optical setup for measuring hemoglobin in QMAX card with duel bandpass filter setup, in accordance with an embodiment.

FIG. 1C illustrates an optical setup for measuring hemoglobin in an QMAX card having a dual bandpass filter setup. The optical filter before the LED can be, for example: (a) one wavelength setup (550 nm); (b) two separate wavelength setup (550 nm+650 nm); and (c) one dual BP wavelength (525 nm+680 nm). The bandwidth of the filter is between 20 nm to 60 nm.

In an experiment, a QMAX device has two plates. The first plate is 1 mm thick flat PMMA substrate with a size of 30 mm×24 mm. The second plate is 175 um thick PMMA film with a micro pillar array on it with a size of 24 mm×22 mm. The pillar array has pillar size of 30 um×40 um, pillar-to-pillar edge distance of 80 um, and pillar height of 10 um or 30 um. The reagent having Acridine orange dye and Zwittergent were coated uniformly onto the second plate (X-Plate).

The sample was a fresh whole blood (7 uL for 30 um pillar height), which was dropped in a location of the first plate and pressed by the second plate.

Figure 2:
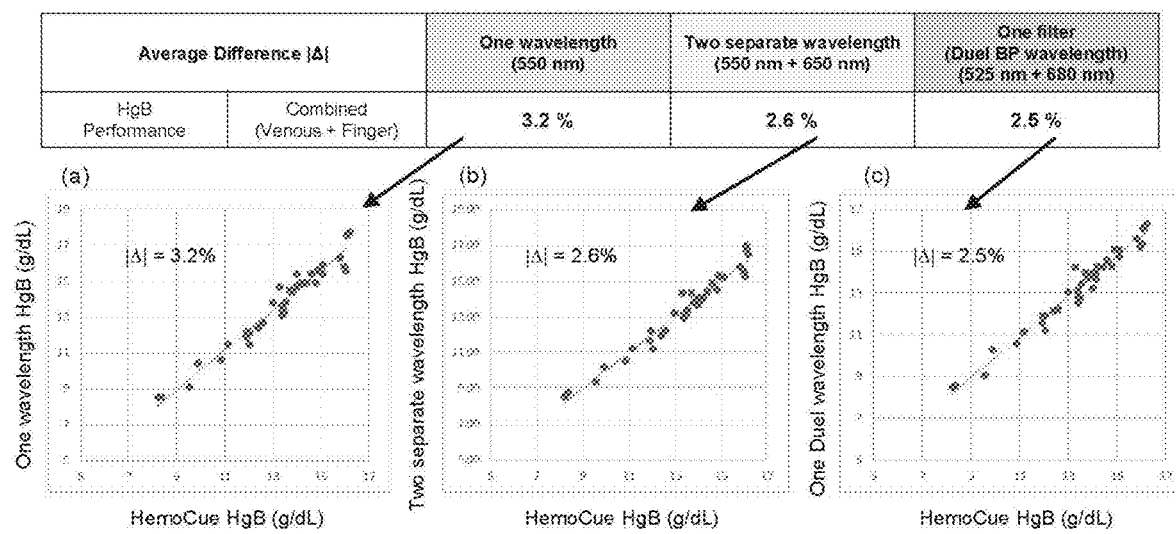
FIG. 2 illustrates HgB performance on iMOST platform vs. HemoCue 301 commercial HgB analyzer use (a) One wavelength setup (550 nm), (b) Two separate wavelength setup (550 nm+650 nm), and (c) Dual BP wavelength (525 nm+680 nm), in accordance with an embodiment. Total 38 samples are $K_2EDTA$ venous blood collected from patient in local hospital and fresh finger prick blood. The difference $|\Delta|$ is calculated for each sample. The average difference is 3.2% for (a), 2.6% for (b) and 2.5% for (c). The duel band pass method has the lowest error thus more accurate results compared with other two results.

FIG. 2 illustrates HgB performance on an iMOST platform vs. HemoCue 301 commercial HgB analyzer using: (a) a one wavelength setup (550 nm), (b) a two separate wavelength setup (550 nm+650 nm), and (c) a dual BP wavelength (525 nm+680 nm).

A total of 38 samples were measured, including 25 $K_2$EDTA venous blood collected from patients in a local hospital (Hunterdon Medical Center, NJ, US) and 13 sample of fresh finger prick blood. The difference |Δ| is calculated for each sample. The average difference was 3.2% for (a), 2.6% for (b), and 2.5% for (c). The dual band pass method had the lowest error, and provided superior results, i.e., more accurate, compared with the other two results.

Additionally, a correlation factor between the iMOST and the HemoCue 301 commercial HgB analyzer was 95.3% for (a) single wavelength measurement, 96.1% for (b) two separate wavelength measurement, and 96.6% for (c) dual bandpass wavelength measurements. Again, the dual bandpass wavelength measurement has the best correlation between the iMOST and reference method.

Figure 21:
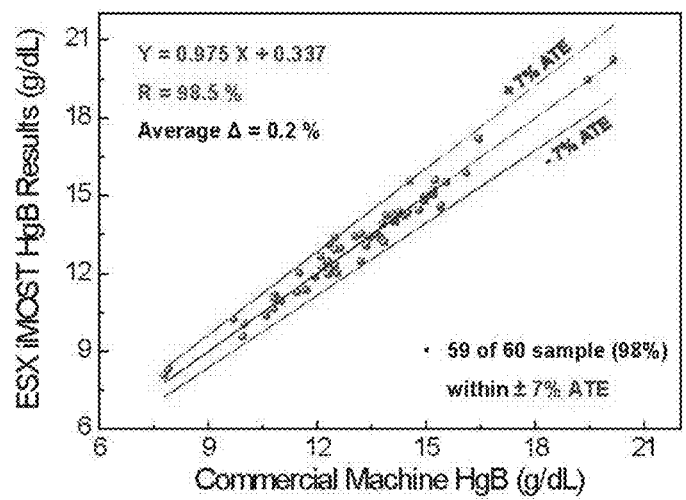
FIG. 21 illustrates HgB performance on iMOST platform vs. HemoCue 301 commercial HgB analyzer using total 60 samples (K$_2$EDTA venous blood collected from patient in local hospital) collected in 5 days. The difference |$\Delta$| is calculated for each sample. The average difference is 2.3%, with correlation R=98.5%, slope 0.975 and bias 0.2%. 59 of 60 samples (98%) within ±7% allowable total error.

In another measurement using dual bandpass filter iMOST setup, FIG. 21 illustrates HgB performance on the iMOST platform vs. the HemoCue 301 commercial HgB analyzer using a total of 60 samples ($K_2$EDTA venous blood collected from patient in a local hospital) collected over 5 days. The difference |Δ| was calculated for each sample. The average difference was 2.3%, with a correlation R=98.5%, a slope 0.975, and a bias of 0.2%. Notably, 59 of the 60 samples (i.e., 98%) were within ±7% allowable total error.

Microstructure Guided Flow Printing for Uniform Reagent Coating

A new reagent printing method was used in Qmax-Card manufacturing to produce a new card. The new card can be used, for example, for measurement of HgB, WBC, and other analytes.

In a previous disclosure, an inkjet droplet printing method was used. Small droplets, for example, in the range of 1 nL to 100 nL, with a periodicity of 100 um to 1000 um are dropped onto the X-Plate and dried. Such printing method usually forms a droplet boundary on the plate, and was not uniform.

In some embodiments, the disclosure provides a guided flow printing method with a new reagent. The reagent was hydrophilic and was used to make the plate hydrophilic and make the plate have a contact angle, for example, less than 45 degrees. With microstructure (e.g., pillars) on the plate, the hydrophilic reagent was uniformly guided by the microstructures to form a coat on the plate, and achieve a uniform coating without the aforementioned objectionable droplet boundaries.

In the disclosed guided flow printing methods, the solvent in the reagent was chosen to have small contact angle with the plate. The solvent can include, for example, alcohol, IPA, acetone, aromatic compounds, benzene, toluene, alcohols, methanol, esters and ethers, ketones, acetone, amines, nitrated and halogenated hydrocarbons, or like solvents, and mixtures thereof.

In the disclosed guided flow printing methods, the plate was treated to have small contact angle with the reagent. The treatment can include, for example, a coating of a hydrophilic layer, coating a surfactant on the plate, a plasma treatment, an ozone treatment, creating hydrophilic chemical bond, and like treatments, or combinations thereof.

In an example of the guided flow coating method, an X-Plate in an Q-Card uses a reagent formulation including Acridine orange dye with a concentration of 0.4 mg/mL to 1.0 mg/mL and Zwittergent with a concentration of 0.5 mg/mL to 1.5 mg/mL in over 90% of alcohol in water. 5 uL to 8 uL of the reagent was dropped onto the X-Plate with a 175 um thickness, and a pillar array of 30 um pillar height, a 100 um period, and 30 by 40 um pillar size. The reagent spread on the X-Plate uniformly into a square with a size around 15 mm to 25 mm, and dried.

Figure 22:
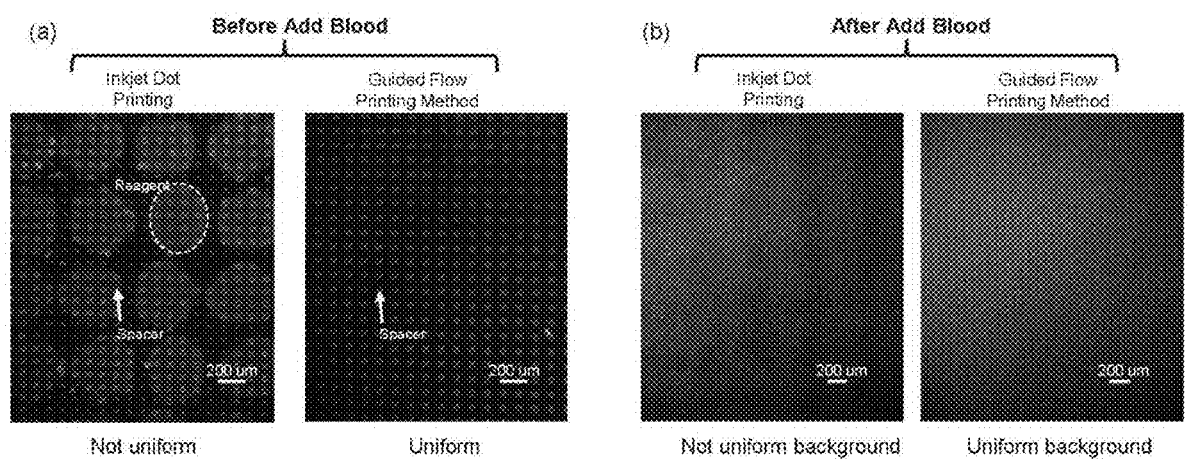
FIG. 22 illustrates two kinds of Q-Cards' fluorescence photos (a) before adding blood and (b) after adding blood, in accordance with an embodiment. One kind of Q-Card uses inkjet dot printing method with droplet size 10 nL, 600 um period and reagent in water. The other kind of Q-Card uses guided flow printing method with volume 8 uL and reagent is in over 90% alcohol. Clearly the guided flow printing method provides uniform coating without droplet boundary before and after adding blood.

FIG. 22 illustrates two kinds of Q-Cards' fluorescence photos: (a) before adding blood and (b) after adding blood. One kind of Q-Card used inkjet dot printing method having a droplet size of 10 nL, 600 um period, and reagent in water. The other kind of Q-Card used the guided flow printing method having an 8 uL volume, and the reagent was dissolved in over 90% alcohol. Clearly, the guided flow printing method provided uniform surface coatings of the card surfaces without a droplet boundary either before or after adding blood.

Other Transmission Measurement Applications

Other applications of the guided flow printing method can include, for example:

(1) Transmission and/or absorption-based applications, such as HgB and HCT measurements in CBC;
(2) Transmission and/or absorption-based applications, as OD (optical density) measurements for any biological or chemical samples;
(3) Transmission and/or absorption-based applications, as molecule density measurements for any biological or chemical samples;
(4) Transmission and/or absorption-based applications, as cell or tissue density measurements for any biological or chemical samples;
(5) Transmission and/or absorption-based applications, as beads, particle density measurements for any biological or chemical samples;
(6) Transmission and/or absorption-based applications, as turbidity measurements for any biological or chemical samples;
(7) Colorimetric based applications, as colorimetric enzyme reaction, for example, as in a glucose measurement, a cholesterol measurement, and a triglycerides measurement;
(8) All the applications can use transmission or absorption in the sample analysis.

A device of any prior device embodiment, can have, for example, the function of one or more of the following tests:
Composition analysis as identification of fibers, blend analysis, and others;

Color fastness tests in washing, laundering, bleaching, and others;

Wet processing analysis for scouring and bleaching in lab sample, and others;

Defect analysis of samples;

General chemical tests including carbonization, dissolution, stripping and redyeing, absorbency of textiles, bleaching loss, dry shrinkage, and others;

Parameter tests including density, nitrogen content, foaming propensity, emulsion stability, and others;

Water, effluent & sludge analysis including, for example, pH, density, conductivity, odor, turbidity, total dissolved solids, total hardness, acidity, total chlorine, and others;

Eco parameters tests including, for example, free formaldehyde, copper, cobalt, lead, mercury, polyvinyl chloride, APEO/NPEO tests, and like other tests;

A device of any prior device embodiment, can have, for example, one or more of the has following functions and purposes:
1) Determine the interactions of a sample with other known substances;
2) Determine the composition of a sample;
3) Provide standard data for other scientific, medical, and quality assurance functions;
4) Validate suitability for an end-use;
5) Provide a basis for technical communication;
6) Provide a technical means of comparison of several options;
7) Provide evidence in legal proceedings;
8) Determine if, or verify that, the requirements of a specification, regulation, or contract are met.

I. Colorimetric Sample Card Having a Laminated Diffusive Layer

In an assay involving a detection of light signal, such as a colorimetric assay, a small container holds a liquid sample and passes a light beam through the sample to measure the light absorption spectrum or the color of the sample. When the sample is very thin, the light or color becomes faint and difficult measure.

In a particular test scenario of interest, a sensor to collect a light signal can be above a sample and situated very close to the sample. A light source can be placed under the sample (i.e., on the opposite side of the flat plane of the sample, and the sensor measures, for example, the optical density after light passes through the sample.

To increase the color signal generated from the sample, the light should travel a longer distance in the sample to be absorbed more. In some embodiments, the disclosure presents a colorimetric sample card (e.g., a surface modified Qmax card) device for holding a thin sample that can enhance the color signal by increasing the optical path passing through the sample.

The sample card device comprises a top plate, a bottom plate, and the thin sample layer situated between the top plate and the bottom plate, and a diffuser layer on the face of the sample that is first illuminated by the interrogating light. A diffuser layer can be, for example, a semi-transparent layer that is attached to or integral with the first illuminated face of the sample card, for example, a diffuser can be laminated on the back of the bottom plate.

In embodiment, the disclosure provides a test apparatus for measuring colorimetric signal of a sample liquid in the sample card device that has a laminated diffusive layer, the apparatus comprises:

a light source;
a cavity or holder for a sample card (i.e., a workpiece such as a modified Qmax colorimetric sample card having a laminated diffusive layer on the face of the sample card that is first illuminated face of face nearest the light source); and
a sensor.

The light source illuminates light from the back of the sample card and hits on the diffusive layer first. The diffusive layer deflects the light beams and increases the optical path of the light traveling in the sample liquid layer to increase the light exposure of the colorimetric sample. A sensor is placed above the sample card (i.e., on the opposite side of the sample) to collect the transmitted light signal.

Figure 17:
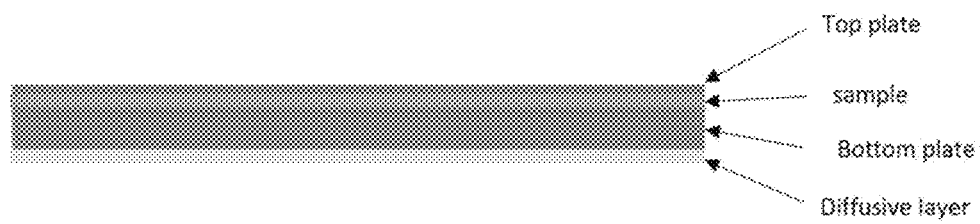
FIG. 17 illustrates an example of ready-to-test colorimetric assay sample card comprising a top plate, a bottom plate, a diffusive layer laminated on the back of the bottom plate and sample liquid between top and bottom plates.

FIG. 17 illustrates an example of ready-to-test colorimetric assay sample card comprising a top plate, a bottom plate, a diffusive layer laminated on the back of the bottom plate and sample liquid between top and bottom plates.

Figure 18:
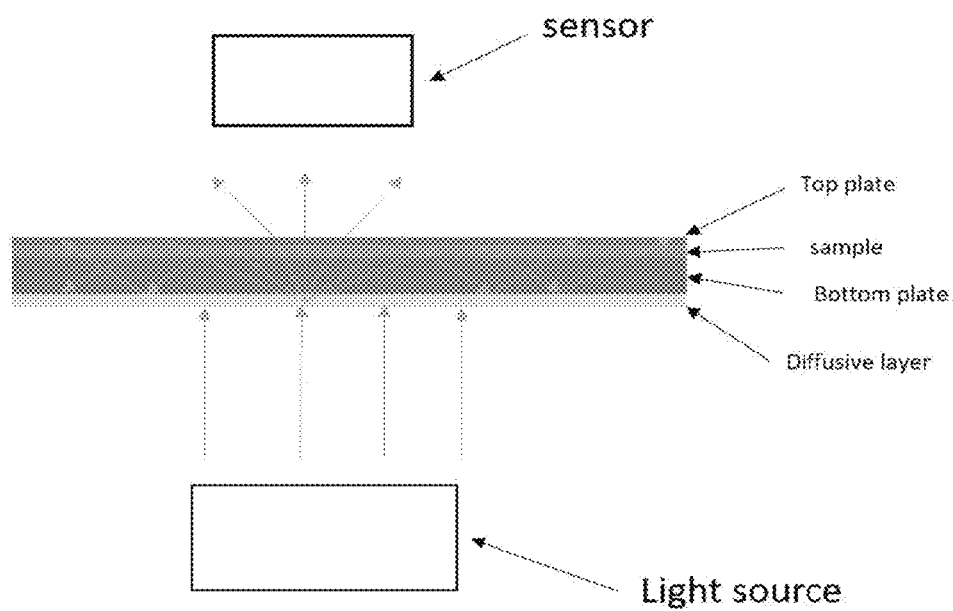
FIG. 18 illustrates a test apparatus of measuring colorimetric signal of sample liquid in the sample card having a laminated diffusive layer, the apparatus comprising, for example: a light source, a colorimetric sample card having the laminated diffusive layer; and a sensor.

FIG. 18 illustrates a test apparatus of measuring colorimetric signal of sample liquid in the sample card having a laminated diffusive layer, the apparatus comprising, for example: a light source, a colorimetric sample card having the laminated diffusive layer; and a sensor. The light source illuminates light from the back of the sample card and hits the diffusive layer first. The diffusive layer deflects the light beams and increases the optical path of the light traveling in sample liquid layer to increase the exposure of the colorimetric sample. A sensor is placed above the sample card to collect the transmitted light signal.

In some embodiments, the diffusive layer can be, for example, a white diffusive film laminated on the back of bottom plate, including: a film made of white plastic material; a film transparent material but with textured surface structures; or a combination thereof.

In some embodiments, the lamination can be accomplished, for example, by thermally binding, adhesive, and like methods.

In some embodiments, the diffusive layer can be, for example, a white paint applied on the back of the bottom plate.

In some embodiments, the diffusive layer can be, for example, formed by surface treatment on the back of the bottom plate with textured structures.

II. Lateral Dimension Correction (LDC) Algorithm

Figure 5:
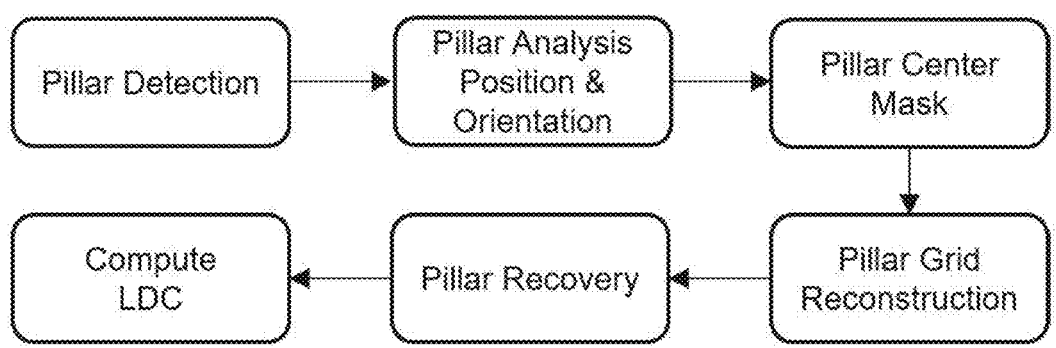
FIG. 5 illustrates a flowchart of the lateral dimension correction (LDC) calculation, in accordance with an embodiment.

The pillars are employed for lateral dimension correction (LDC), which is illustrated in FIG. 5. A HgB image is divided into non-overlapping regions. For each region, one runs LDC algorithm as follows:
1. runs pillar detection;
2. checks the pillar detection score (if the check fails, the image sample is rejected);
3. after the image passes the pillar detection score check, runs a horizontal pillar check;
4. runs vertical pillar check;
5. checks the inter-pillar distance (if the check fails, the image sample is rejected);
6. after the image passes the inter-pillar distance check, the algorithm generates a pillar gird; and
7. calculates the area under pillar centers and derives the LDC.

Sample Holders

Figure 6:
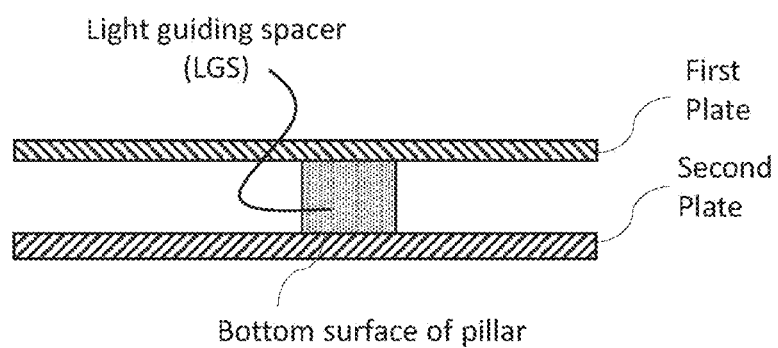
FIG. 6 illustrates a cross-section view of one embodiment of a sample holder, termed OAC (optical analysis card), for analyzing an analyte in a sample (e.g., hemoglobin in a blood sample) by optical transmission using light, in accordance with an embodiment. The sample holder comprises a first plate, a second plate, and a light guiding spacer (LGS), in which the LGS has a pillar shape, is sandwiched between the two plates with each end of the pillar in direct contact to one of the plates to form a LGS-plate contact area, and is configured to allow the light transmits from the first plate, through the LGS, to the second plate without going through a sample.
Figure 7:
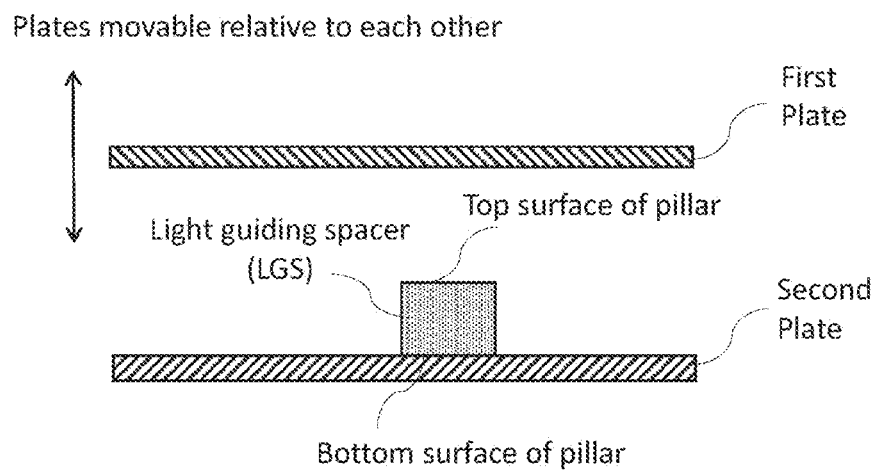
FIG. 7 illustrates a cross-section view of one embodiment of a sample holder, termed OAC (optical analysis card), for analyzing an analyte in a sample (e.g., hemoglobin in a blood sample) by optical transmission using light, in accordance with an embodiment. The sample holder comprises a first plate, a second plate, and a light guiding spacer (LGS), in which the two plates are movable relative to each other, and the pillar has flat top.

According to the present invention, as shown in FIG. 6 and FIG. 7, one embodiment of a sample holder, termed OAC (i.e., optical analysis card), for analyzing an analyte in a sample (e.g., hemoglobin in a blood sample) by optical transmission using light, comprising:
a first plate, a second plate, a light guiding spacer (LGS), a sampling region, and a reference region, wherein:

(i) the first plate and second plate are configured to sandwich a sample, this is for an optical transmission analysis by light, into a thin layer between the plates, and each plate has a sample contact area on its inner surface that contacts the sample;

(ii) the light-guiding spacer (LGS) has a pillar shape, is sandwiched between the two plates with each end of the pillar in direct contact to one of the plates forming a LGS-plate contact area, and is configured to allow the light transmits from the first plate, through the LGS, to the second plate without going through a sample, (iii) the sampling region is the region that the light can go through, in sequence, the first plate, the sample, and the second plate, wherein the sampling region does not have the LGS; and (iv) the reference region is the region that the light transmits through, in sequence, the first plate, the light-guiding spacer, and the second plate, without going through the sample;

wherein the LGS-contact areas and a lateral cross-section of the LGS are larger than the wavelength of the light, wherein the light-guiding spacer is surrounded by or near the sample; and wherein the sample in the sampling region has a thickness of 500 um or less.

At least a portion of the plates in the reference region and the sampling region are light transmissive.

According to the present invention, as shown in FIGS. 6 and 7, a sample holder, termed OAC (i.e., optical analysis card), has at least a "sampling region" and a "reference region", and the sample layer light absorption coefficient is determined by taking a ratio of the light transmitted through the sampling region to that transmitted through the reference region.

In some embodiments, the sample holder (also termed device) further comprises a plurality of light guiding spacers, that have substantially uniform height, and wherein at least one of the light-guiding spacers is inside the sample contact area.

In some embodiments, the first plate and the second plate are fixed with the LGS (FIG. 6). In some embodiments, as shown in FIG. 7, the first plate and the second plate are movable relative to each other into different configurations including an open configuration and a closed configuration. In an open configuration, the plates are separated a part and a sample is deposited. In a closed configuration, the first and second plate is respectively in touch with a flat end of the LGS.

In some embodiments, the first plate and the second plate in the sample regions and the references have uniform thickness, and are light transmissive.

The materials of the plates are plastics, glass, or other materials described by the disclosure.

In some embodiments, other spacers are used to regulate the spacing between the first plate and the second plate, and hence the sample thickness.

Sample OD Measurement Methods.

In some embodiments, properties of a sample can be determined by measuring the OD of a thin layer of the sample, where the OD is determined from the ratio of the light transmitted through the sampling region of OAC to that transmitted through the reference region of OAC.

In some embodiments, the image of a sample in a sample holder can be taken or recorded by a digital camera and analyzed.

In some embodiments, the wavelength of the light is in the range of 500 nm to 1200 nm, 200 nm to 3000 nm, 3000 nm to 30,000 nm, or 100 nm to 200 nm.

A) Light Absorption Through a Sample Determined by Light Transmissions in Sampling and Reference Regions For the light with an incident light intensity, $I_0$, the transmitted light intensity through a sample, $I_S$ is, using Beer-Lambert's Law, given by:

$$OD_s = \ln\left(\frac{I_0}{I_s}\right) = \varepsilon_s c L_s,$$

where, $\varepsilon_s$ is the extinction coefficient of the sample (e.g. hemoglobin), c is the average concentration of the sample (e.g. hemoglobin), and L is the length of light path through the sample. ($\varepsilon$ in cm$^{-1}$/M, c in M, L in cm), and $OD_s$ can refer to the optical density through sample.

For the light with an incident light intensity, $I_0$, the transmitted light intensity through a light-guiding spacer of a length $L_r$, $I_r$ is, using Beer-Lambert's Law, given by:

$$OD_r = \ln\left(\frac{I_0}{I_r}\right) = \alpha_r L_r,$$

where $\alpha_r$ is the absorption coefficient of the light-guiding spacer, and L is the length of light path through the sample, and $OD_s$ can refer to the optical density through the light guiding spacer, which is used as a reference.

Subtracting the first equation by the second equation leads to:

$$OD_s - OD_r = \ln\left(\frac{I_0}{I_s}\right) - \ln\left(\frac{I_0}{I_r}\right) = \ln\left(\frac{I_r}{I_s}\right) = \varepsilon_s c L_s - \alpha_r L_r$$

According to the present invention, the above equation shows that the absorption coefficient of a sample layer can be determined by taking a ratio of the transmitted light through the sampling region to that through the reference region, without measuring the incident light (assuming the incident light in the two regions are significantly the same).

Forming Uniform Thin Sample Layer Using Spacers.

Figure 8:
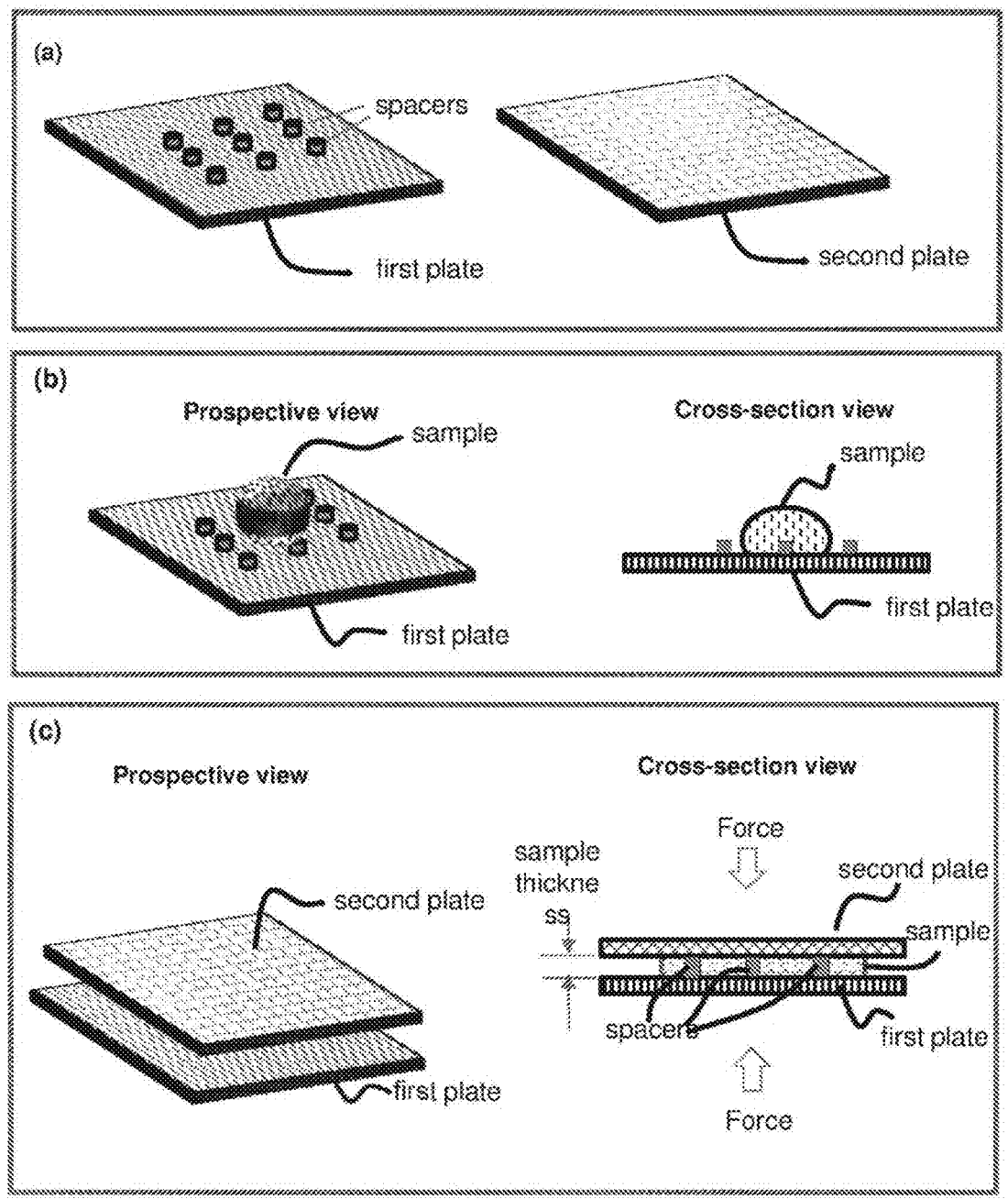
FIG. 8 is an illustration of a CROF (Compressed Regulated Open Flow), in accordance with an embodiment. Panel (a) illustrates a first plate and a second plate wherein the first plate has spacers. Panel (b) illustrates depositing a sample on the first plate (shown), or the second plate (not shown), or both (not shown) at an open configuration. Panel (c) illustrates (i) using the two plates to spread the sample (the sample flow between the plates) and reduce the sample thickness, and (ii) using the spacers and the plate to regulate the sample thickness at the closed configuration. The inner surface of each plate may have one or a plurality of binding sites and or storage sites (not shown).
Figure 9:
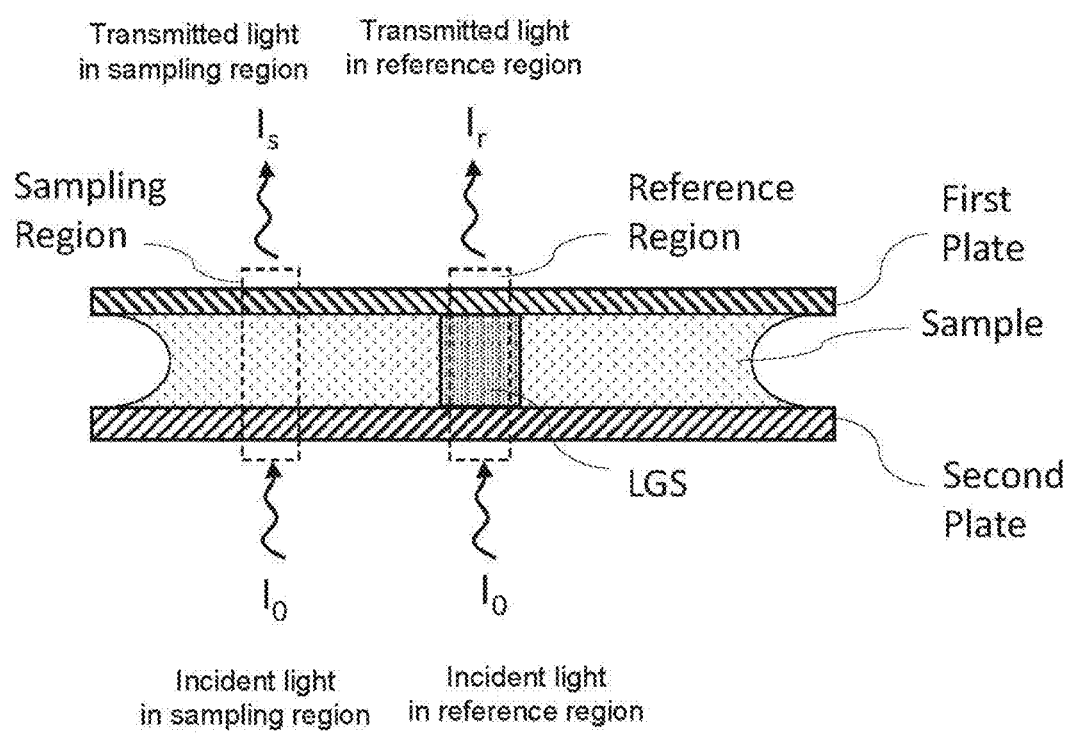
FIG. 9 illustrates a cross-section view of one embodiment of a sample holder with a first plate, second plate and a LGS, a sample in the holder, locations of a sampling region and a reference region, and incident light and transmitted light in the sample region and the reference region respectively
Figure 10:
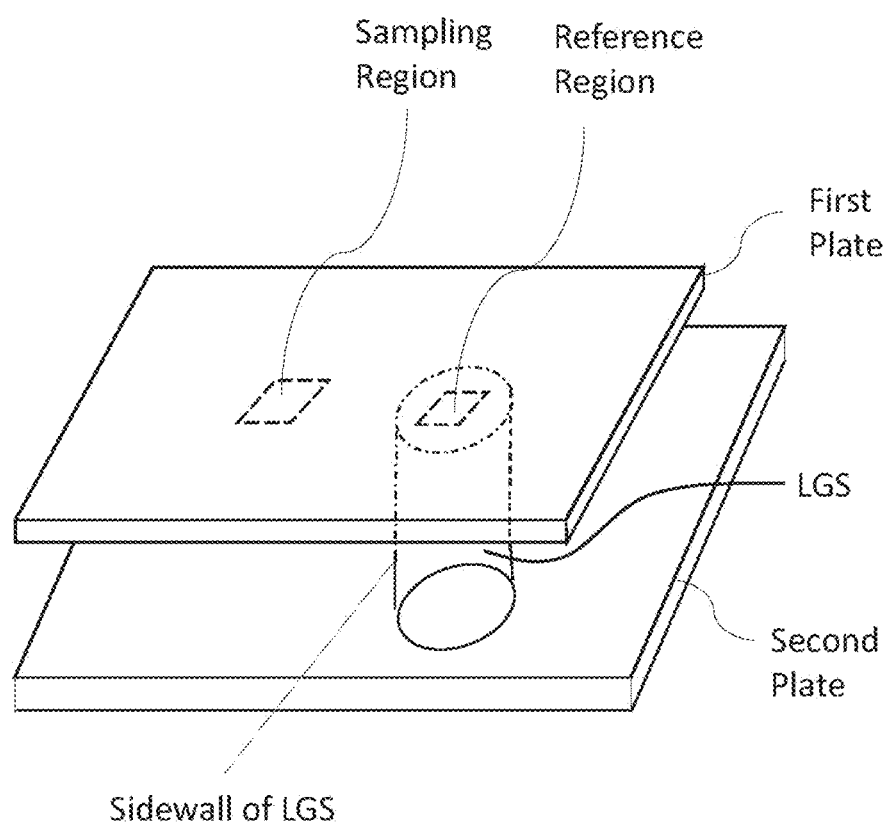
FIG. 10 illustrates a perspective view of one embodiment of a sample holder with a first plate, second plate and a LGS, a sample in the holder, and locations of a sampling region and a reference regions.
Figure 11:
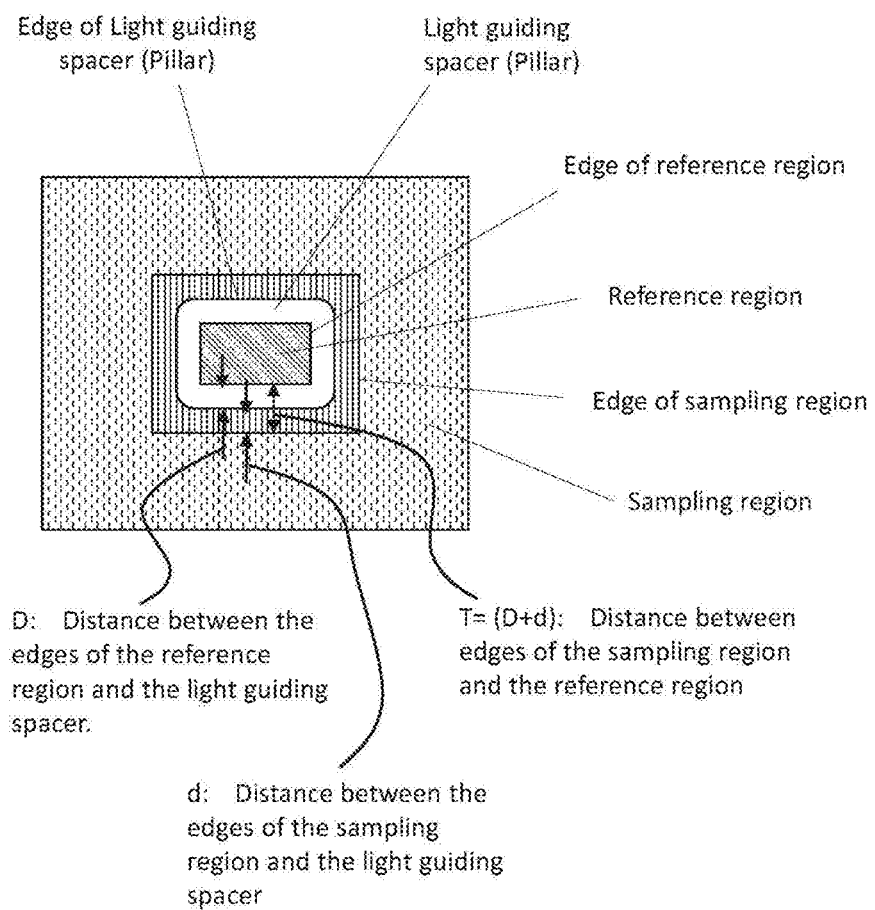
FIG. 11 illustrates a top view of one embodiment of a sample holder with a first plate, second plate and a LGS, location of a LGS, a sampling region, a reference region, and an exemplary location of the edge of the reference region and the sample region. Note that the edges are selected during an imaging processing.

FIG. 8 is an illustration of a CROF (Compressed Regulated Open Flow) embodiment. Panel (a) illustrates a first plate and a second plate wherein the first plate has spacers. Panel (b) illustrates depositing a sample on the first plate (shown), or the second plate (not shown), or both (not shown) at an open configuration. Panel (c) illustrates (i) using the two plates to spread the sample (the sample flow between the plates) and reduce the sample thickness, and (ii) using the spacers and the plate to regulate the sample thickness at the closed configuration. The inner surface of each plate may have one or a plurality of binding sites and/or storage sites (not shown).

B) Two Kinds of Hemoglobin

There are two kinds of hemoglobin in blood. Oxygenated hemoglobin [HbO$_2$] is the form of hemoglobin with the bound oxygen while deoxygenated hemoglobin [Hb] is the form of hemoglobin without the bound oxygen. Typically, oxygenated hemoglobin [HbO$_2$] is around 75% in vein and 90% in artery.

Total hemoglobin concentration=[HbO$_2$]+[Hb].

Figure 12:
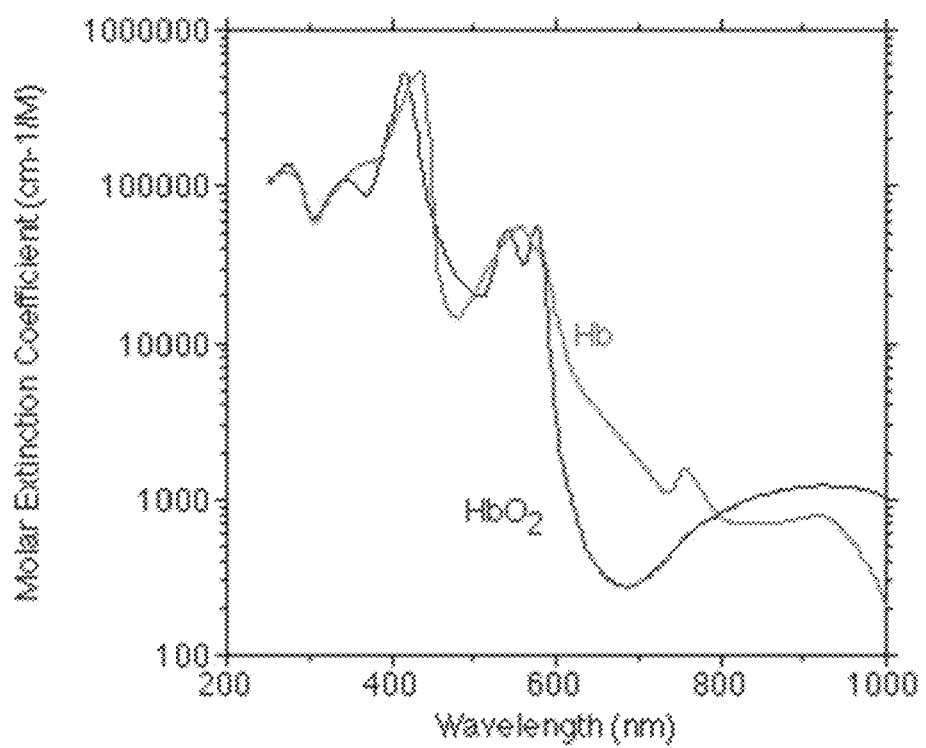
FIG. 12 illustrates the molar extinction coefficient of Oxygenated hemoglobin [HbO$_2$] and deoxygenated hemoglobin [Hb] at wavelength 200 nm to 1000 nm.

Two kinds of hemoglobin can have different extinction coefficient (i.e., light absorption) at different wavelengths as shown in FIG. 12. Therefore, by measuring the light absorption of blood over a different wavelength range, the concentration of the [$HbO_2$] and [Hb] in the blood can be determined, respectively.

C) Optical Transmission Sample Analysis by Comparing the Light Transmission from the Sampling Region and from the Reference Region According to the present invention, the light absorption (and optical density ("OD")) through a thin sample layer is measured by comparing the light transmission from the sample region and from the reference region.

In some cases, the comparison is taking ratio of the light transmission from the sample region to the reference region.

D) Improved Optical Transmission Sample Analysis

In many real measurement situations, there are many imperfections that can significantly reduce the accuracy of OD measurements. For examples, the sample in a sample holder and/or the sample holder itself can have a non-uniform thickness. There are defects in the sample or sample holder, such as air bubbles, dust, or others that can an optical transmission different from that through a perfect (i.e. ideal sample). The light intensity may not be uniform in the entire measurement area.

The present invention has a number of ways to reduce errors in an optical transmission sample analysis (OTSA) caused by the imperfection. According to the present invention, to improve the OD measurement accuracy, the following features, devices and methods below (i.e. in section 1.4 and its subsection) are used individually or a combination of thereof.

I. Reduction of Light Scattering by LGS Sidewall and/or LGS-Plate Interface

According to the present invention, in one of the embodiments of the OD measurement methods that measures the light intensity of the sample region and the reference region, and then takes a ratio of the two intensities, the measurement accuracy can be significantly reduced if the light that goes through the reference region has a strong scattering from (a) the LGS sidewall or (b) the LGS, or the light that goes from the sample region has a significant scattering from a nearby LGS sidewall.

To reduce the effects of the light scatting by the LGS sidewall on the light from the reference region, the edge of the reference region used for OD determination should be certain distance away from the LGS sidewall. Since the reference region cannot smaller than that of the wavelength of the light without suffering significant light diffraction, therefore to reduce the effects of the light scatting by the LGS sidewall on the light from the reference region, at least the cross-section of LGS should be larger than the wavelength of the light.

In some embodiments, the edge of the reference region used for OD determination is certain distance away from the LGS sidewall.

In some embodiments, the cross-section of LGS should be larger than the wavelength of the light, and the edge of the reference region used for OD determination is certain distance away from the LGS sidewall.

Similar to the light from the reference region, to reduce the effects of the light scattering on the light from the sampling region, the edge of the sampling region should be a certain distance away from the LGS sidewall.

In some embodiments, the edge of the sampling region used for OD determination is certain distance away from the LGS sidewall.

In some embodiments, the edge of the reference region used for OD determination is certain distance away from the LGS sidewall, and the edge of the sampling region used for OD determination is certain distance away from the LGS sidewall.

In some embodiments, the cross-section of LGS should be larger than the wavelength of the light, the edge of the reference region used for OD determination is certain distance away from the LGS sidewall, and the edge of the sampling region used for OD determination is certain distance away from the LGS sidewall.

II. Areas of Reference Region and Sampling Region, and Distance Between Them

In determining an OD of a sample by taking the ratio of the light intensities through the sample region and through the reference region, it assumes that the incident light in each region has the same intensity, or the thickness of the first plate and the second plate and the sample is respectively the same or known in the sampling region and the reference region. However, in many practical optical systems, neither of the above assumption is true, which causes uncertainties (i.e. errors) in determining the OD. For examples, in practice, the intensity of incident light for a sample optical transmission measurement is not uniform, particularly illumination area is large; and the thickness of the first plate, the second plate, and the sample is respectively not the same or known in the sampling region and the reference region, and each may have a significant variation.

According to the present invention, one way to reduce to errors is to limit the areas of the sampling region and the reference region used to determining an OD of the sample, or optimize the distance between the sampling region and the reference region (i.e. the sampling exclusion distance) for avoiding significant light scattering by the LGS sidewall, or both.

In some embodiments, the area of the sampling region and the distance between the sample region and the reference region are a combination of the above the two paragraphs.

III. Multiple Pairs of Sampling Region and Reference Region

Using one pair of sample region and the reference region can lead to a large error. This is because several reasons: (i) since the spatial variation of the thickness of the first plate, the second plate, and the sample is respectively random, just one pair of sample region and reference region may not represent the majority of the sample; and (ii) since the numbers of optical imperfection and their locations are also random, these optical imperfection can occur at the location of the sampling region and/or the reference region, making the sampling region and the reference region pair unusable in OTSA.

To solve these problems, according to the present invention, multiple pairs of the SR regions are used.

In some embodiments, an OAC comprises a plurality of pairs of SR regions, where the distance between the centers of two neighboring SR regions, and the distance is either substantially periodic or aperiodic.

According to the present invention, reagents for facilitating a test were deposited on the inner surface of the plates of an OAC, the reagents include but not limited to staining reagents, surfactants, antibodies, proteins, and nucleic acids.

Light Guiding Pillar (e.g., Spacer)

In some embodiments, the light guiding spacers are substantially periodic in inter spacer distance and predetermined.

Height of the Light Guiding Pillar

In some embodiments, the height of light-guiding spacer is 1 um, 2 um, 5 um, 10 um, 30 um, 50 um, 100 um, 200 um, 500 um, 1,000 um, 2,000 um, 5,000 um, 10,000 um, or in a range between any of the two values.

Periodicity of the Light Guiding Pillar

In some embodiments, spacers (also LGS) are arranged in periodic array with a period of 1 um, 2 um, 5 um, 10 um, 30 um, 50 um, 100 um, 200 um, 300 um, 500 um, 1,000 um, 2,000 um, 5,000 um, 10,000 um, or in a range between any of the two values.

In some embodiments, preferred spacers (also LGS) are arranged in periodic array with a period of 1 um, 2 um, 5 um, 10 um, 30 um, 50 um, 100 um, 200 um, 300 um, or in a range between any of the two values.

Inter Spacer Distance of the Light Guiding Pillar

In some embodiments, spacers (also LGS) has an inter spacer distance of 1 um, 2 um, 5 um, 10 um, 30 um, 50 um, 100 um, 200 um, 300 um, 500 um, 1,000 um, 2,000 um, 5,000 um, 10,000 um, or in a range between any of the two values.

In some embodiments, preferred spacers (also LGS) has an inter spacer distance of 1 um, 2 um, 5 um, 10 um, 30 um, 50 um, 100 um, 200 um, 300 um, or in a range between any of the two values.

Geometry of Light Guiding Spacers (LGS)

In some embodiments, the LGS has a pillar shape with its ends substantially flat. In some embodiments, one or both of the ends of the LGS are fixed with one or both of the plates by bonding, fusing, made from a single piece, or other methods that connect LGS to the plates.

In some embodiments, the shape of the lateral cross-section of LGS includes, not limited to circular, rectangle, square, triangle, polygon, alphabets, numbers, or a combination of thereof.

In some embodiments, the average lateral cross-section of each light-guiding spacer (LGS) is 1 um^2 (micron-square), 10 um^2, 20 um^2, 30 um^2, 50 um^2, 100 um^2, 150 um^2, 200 um^2, 300 um^2, 500 um^2, 1000 um^2, 2000 um^2, 5000 um^2, 10,000 um^2, 30,000 um^2, 100,000 um^2, 200,000 um^2, 500,000 um^2, 1 mm^2, 2 mm^2, 5 mm^2, 10 mm^2, 50 mm^2, or in a range between any of the two values.

In some preferred embodiments, in the average lateral cross-section of each light-guiding spacer is 1 um^2 (micron-square), 10 um^2, 20 um^2, 30 um^2, 50 um^2, 100 um^2, 150 um^2, 200 um^2, 300 um^2, 500 um^2, 1000 um^2, 2000 um^2, 5000 um^2, 10,000 um^2, 30,000 um^2, 100,000 um^2, 200,000 um^2, or in a range between any of the two values.

In certain preferred embodiments, the average lateral cross-section of each light-guiding spacer is 1 um^2 (micron-square), 10 um^2, 20 um^2, 30 um^2, 50 um^2, 100 um^2, 150 um^2, 200 um^2, 300 um^2, 500 um^2, 1000 um^2, 2000 um^2, 5000 um^2, 10,000 um^2, 30,000 um^2, or in a range between any of the two values.

In certain preferred embodiments, the average lateral cross-section of each light-guiding spacer is 1 um^2 (micron-square), 10 um^2, 20 um^2, 30 um^2, 50 um^2, 100 um^2, 150 um^2, 200 um^2, 300 um^2, 500 um^2, 1000 um^2, 2000 um^2, 5000 um^2, or in a range between any of the two values.

In some embodiments, the average lateral cross-section of each light-guiding spacer is larger than the wavelength of the light that goes through the reference region, by 1 fold, 2 fold, 3 fold, 5 fold, 10 fold, 20 fold, 50 fold, 100 fold, 200 fold, 500 fold, 1000 fold, 5000 fold or in a range between any of the two values.

In certain preferred embodiments, the average lateral cross-section of each light-guiding spacer is larger than the wavelength of the light that goes through the reference region, by 1 fold, 2 fold, 3 fold, 5 fold, 10 fold, 20 fold, 50 fold, 100 fold, 200 fold, 500 fold, or in a range between any of the two values.

Reference Region Geometry

Shape

In some embodiments, the reference region is less than the size of the minimum lateral cross-section of the light guiding pillar. One advantage is to avoid or reduce light scattering the light guiding sidewall to affect the reference signal.

In some embodiments, the minimum distance between the edge of the light guiding spacer and that of the reference region (i.e. the exclusion distance for reference) is 1 um (micron), 2 um, 3 um, 5 um, 10 um, 20 um, 30 um, 50 um, 100 um, 200 um, 500 um, 1000 um, or in a range between any of the two values.

In some preferred embodiments, the minimum distance between the edge of the light guiding spacer and that of the reference region is 1 um (micron), 2 um, 3 um, 5 um, 10 um, 20 um, 30 um, 50 um, 100 um, 200 um, or in a range between any of the two values.

In certain preferred embodiments, the minimum distance between the edge of the light guiding spacer and that of the reference region is 1 um (micron), 2 um, 3 um, 5 um, 10 um, 20 um, 30 um, 50 um, or in a range between any of the two values.

In certain preferred embodiments, the distance between the edge of sampling area and the reference region is 1 fold, 2 fold, 3 fold, 5 fold, 10 fold, 20 fold larger than the wavelength of the measurement wavelength (i.e. the light thaty goes through the reference region).

In certain preferred embodiments, the distance between the edge of sampling area and the reference region is 20 fold, 30 fold, 50 fold, 100 fold larger than wavelength of the measurement wavelength.plura In certain preferred embodiments, the minimum distance between the edge of the light guiding spacer and that of the reference region is larger than the wavelength, that goes through the reference region, by 1 fold, 2 fold, 3 fold, 5 fold, 10 fold, 20 fold, 50 fold, 100 fold, 200 fold, 500 fold, 1000 fold, 5000 fold or in a range between any of the two values.

In certain preferred embodiments, the minimum distance between the edge of the light guiding spacer and that of the reference region is larger than the wavelength, that goes through the sampling region, by 1 fold, 2 fold, 3 fold, 5 fold, 10 fold, 20 fold, 50 fold, 100 fold, 200 fold, 500 fold, 1000 fold, 5000 fold or in a range between any of the two values.

The ratio of the reference region area and the light guiding spacer area is 3/10, 2/5, 1/2, 3/5, 7/10, 4/5, or in a range between any of the two values.

Sampling Region Geometry

In some embodiments, the edge of the sampling region is a distance away from the edge of the light guiding pillar (i.e. the exclusion distance for sampling). One advantage is to avoid or reduce light scattering the light guiding sidewall to affect the reference signal.

In some embodiments, the exclusion distance for sampling is 1 um (micron), 2 um, 3 um, 5 um, 10 um, 20 um, 30 um, 50 um, 100 um, 200 um, 500 um, 1000 um, or in a range between any of the two values.

In some preferred embodiments, the exclusion distance for sampling is 1 um (micron), 2 um, 3 um, 5 um, 10 um, 20 um, 30 um, 50 um, 100 um, 200 um, or in a range between any of the two values.

In certain preferred embodiments, the exclusion distance for sampling is 1 um (micron), 2 um, 3 um, 5 um, 10 um, 20 um, 30 um, 50 um, or in a range between any of the two values.

In certain preferred embodiments, the exclusion distance for sampling is 1 um (micron), 2 um, 3 um, 5 um, 10 um, 20 um, or in a range between any of the two values.

In some preferred embodiments, the area of the sampling region is 3/5, 7/10, 4/5, 9/10, 1, 11/10, 6/5, 13/10, 7/5, 3/2, or in the range between any of the two values, of the periodic inter spacer distance.

In some preferred embodiments, the distance between the edge of the sampling region and that of the light guiding spacer is 1/5, 3/10, 2/5, 1/2, 3/5, 7/10, 4/5, 9/10, 1, or in the rage between any of the two values, of the light guiding spacer area.

In some preferred embodiments, the distance between the edge of the sampling region and that of the light guiding spacer is larger than the wavelength, that goes through the reference region, by 1 fold, 2 fold, 3 fold, 5 fold, 10 fold, 20 fold, 50 fold, 100 fold, 200 fold, 500 fold, 1000 fold, 5000 fold or in a range between any of the two values.

In some preferred embodiments, the distance between the edge of the sampling region and that of the light guiding spacer is larger than the wavelength, that goes through the sampling region, by 1 fold, 2 fold, 3 fold, 5 fold, 10 fold, 20 fold, 50 fold, 100 fold, 200 fold, 500 fold, 1000 fold, 5000 fold or in a range between any of the two values.

In some embodiment, the exclusion distance from the pillar wall is 7.5 um to 10 um.

In some embodiment, the exclusion distance from the pillar wall is ¼ of the light guiding spacer area.

In some embodiments, the sampling region boundary has a size of 120 um by 110 um;

The edge of sampling area has a size of 60 um by 45 um;

the light guiding spacer or pillar has a size of 40 um by 30 um;

The reference region has a size of 20 um by 15 um.

In some embodiments, the area of reference region is ½ of the size of the light guiding spacer area, the distance between edge of the sampling area and that of the light guiding spacer is ½ of the light guiding spacer area, and the area of the sampling area is equal to the periodic inter spacer distance.

Distance Between Sampling Region and Reference Region (i.e. the Exclusion Distance Between Sampling and Refence)

In some embodiments, the distance between the edge of sampling area and the reference region is 1 um (micron), 2 um, 3 um, 5 um, 10 um, 20 um, 30 um, 40 um, 50 um, 100 um, 200 um, 500 um, 1000 um or in the range between any of the two values.

In certain preferred embodiments, the distance between the edge of sampling area and the reference region is from 30 um (micron) to 50 um, 20 um to 60 um, 10 um to 70 um, 5 um to 75 um, or in the range between any of the two values.

In certain preferred embodiments, the distance between the edge of sampling area and the reference region is larger than the wavelength, that goes through the reference region, by 1 fold, 2 fold, 3 fold, 5 fold, 10 fold, 20 fold, 50 fold, 100 fold, 200 fold, 500 fold, 1000 fold, 5000 fold or in a range between any of the two values.

In some embodiments, the distance between the edge of sampling area and the reference region is 2/5, 1/2, 3/5, 7/10, 4/5, 9/10, 1, 11/10, 6/5, 13/10, 7/5, 3/2, 8/5, 17/10, or in the range between any of the two values, of the light guiding spacer area.

In some embodiments, the distance between the edge of sampling area and the reference region is larger than the wavelength of the light that goes through the reference region, by 1 fold, 2 fold, 3 fold, 5 fold, 10 fold, 20 fold, 50 fold, 100 fold, 200 fold, 500 fold, 1000 fold, 5000 fold or in a range between any of the two values.

In some embodiments, the distance between the edge of sampling area and the reference region is larger than the wavelength, that goes through the sampling region, by 1 fold, 2 fold, 3 fold, 5 fold, 10 fold, 20 fold, 50 fold, 100 fold, 200 fold, 500 fold, 1000 fold, 5000 fold or in a range between any of the two values.

Some Example of Q-Card Parameters

In some embodiments, the spacer height, the spacing between the plates, and/or sample thickness is around 30 um. The spacer height, the spacing between the plates, and/or sample thickness is 20 um to 40 um. The spacer is rectangle shape with round corners. The spacer is round shape. The lateral dimension of a spacer is around 30 µm by 40 um. The lateral dimension of a spacer is 10 um to 40 um. The round corners of spacer has a diameter of 10 um. The spacer is in a rectangular lattice array. The inter-spacer spacing of spacers is around 80 µm. The inter-spacer spacing of spacers is 70 µm to 150 um. The length of one plate of Q-Card is 27 mm and the width of this plate is 22 mm. The length of one plate is Q-Card is 32 mm and the width of this plate is 24 mm. The area of one plate is around 600 $mm^2$ and the area of another plate is around 750 $mm^2$. The thickness of one plate of Q-Card is around 175 um. The thickness of one plate of Q-Card is around 1 mm. The area of the notch on the QMAX card is in the range of 10 to 30 $mm^2$. The notch is half-round shape with a diameter of 3 to 6 mm. The notch has a width of 3 mm and a length of 6 mm. The width of the hinge joint is around 6 mm. The length of the hinge joint is around 20 mm. The hinge has a thickness around 70 µm.

The reagent is coated by droplet printing into an array. The reagent is coated by spray. The acridine orange or other staining reagents is coated onto the first plate, or the second plate or both. The Zwittergent or other detergent is coated onto the first plate, or the second plate or both. The acridine orange is coated on the plate with an area concentration of 5 to 20 $ng/mm^2$ and Zwittergent is coated on the plate with an area concentration of 10 to 30 $ng/mm^2$.

The material of first place and second plate is Poly(methyl methacrylate). A landing mark for blood droplet is on the outside surface of first plate or second plate. A landing mark for blood droplet is a small dot or a small cross. A landing mark for blood droplet is outside the field of view of the image. A landing mark for blood droplet is near the center of the card. At least one of the plates is transparent.

Example of Adapter Filter Parameters

In one embodiment, the duel band pass wavelength filter at least has one center wavelength at 500 nm to 550 nm.

In one embodiment, the duel band pass wavelength filter at least has one center wavelength at 600 nm to 700 nm.

In one embodiment, the duel band pass wavelength filter has a bandwidth of 10 nm to 50 nm.

In one embodiment, the duel band pass wavelength filter has a bandwidth of 50 nm to 100 nm.

In one embodiment, the duel band pass wavelength filter has a bandwidth of 50 nm to 100 nm.

The device, apparatus, or method of any prior embodiment, further comprising a reflector configured to reflect light emitted from the passive illuminator towards the diffuser.

In one embodiment, a wavelength dependent attenuator is added before the duel bandpass filter to balance the light intensity of the light from two bands.

Example of Light Guiding Spacer, Sampling Region, and Reference Region

In some embodiment, the exclusion distance from the pillar wall is 7.5 um to 10 um. In some embodiment, the exclusion distance from the pillar wall is ¼ of the light guiding spacer area. In some embodiments, the sampling region boundary has a size of 120 um by 110 um; The edge of sampling area has a size of 60 um by 45 um; the light guiding spacer or pillar has a size of 40 um by 30 um; The reference region has a size of 20 um by 15 um.

In some embodiments, the area of reference region is ½ of the size of the light guiding spacer area, the distance between edge of the sampling area and that of the light guiding spacer is ½ of the light guiding spacer area, and the area of the sampling area is equal to the periodic inter spacer distance.

Example of Color De-Interference Matrix and HgB Calculation Algorithm

A set of dc-RAW parameters as (−W −r 1 1 1 1 −g 1 1 −o 0 −c −6 −T) are used before the de-interference algorithm.
- −W: not using auto-brightness
- −r 1 1 1 1: set the channel gain of RGBG to 1.
- −g 1 1: turn off gamma correction
- −c: send output to stdout.
- −6: 16 bit output
- −T: tiff output
- −o 0: do not transfer color space, use RAW RGB.

A color de-interference matrix (also termed "channel cross talking matrix") is applied to derive new red and green channels to reduce color interference as:

$$\begin{pmatrix} R_{new} \\ G_{new} \end{pmatrix} = \begin{bmatrix} a_1 & a_2 \\ b_1 & b_2 \end{bmatrix} \begin{pmatrix} R \\ G \end{pmatrix}$$

where a1, a2, b1, and b2 are the color de-interference matrix coefficients. In one example the a1, a2, b1, b2 is in the range of 0 to 1.0.

The measurement and calibration of a1, a2, b1, b2 includes the experiment using two separate filters exactly matching the duel band pass filter. Two images using two sperate filters are taken as the reference standard for Rnew and Gnew.

The medium of intensity ratios, rred and rgreen, of both red and green channels are employed for the HgB value calculation. The formula for the HgB value calculation is based on a linear combination of the logarithm of these two ratios:

$$HgB = A \ln(r_{red}) + B \ln(r_{green}) + C$$

The three coefficients A, B, and C are pre-determined, for example, using regression on HgB blood samples with known HgB values. For example, in one case of determine A, B and C using 50 whole blood samples range from 5 g/dL to 25 g/dL measured by Commercial HgB analyzer as Hemocue, the regression was used to fit A, B, C value to matching commercial HgB analyzer. A for example in the range of 20 to 30, B for example in the range of −20 to −30, while C for example in the range of 0 to 1.

Light Transmission Measurement/Calculation Using a Plurality of Light Guiding Structures (LGS).

A method for measuring transmission and/or light absorption comprising,
(a) having a QMAX simple holder with a plurality of light guiding spacers that have substantially uniform height, and wherein more than one of the light-guiding spacers is inside the sample contact area,
(b) imaging the sample area;
(c) using the image in (b) to measure light transmission through a reference area of a LGS and a sample are round the same LGS, and then calculate light absorption for the area round the LGS, repeating such measurement for more one LGS;
(d) averaging the light absorption in a sample from the light absorption in each LGS area.

The LGS can take different configurations as described herein, such as periodic LGS, etc.

Mixed-Light Guiding Structures (M-LGS).

A M-LGS is a light guiding structure, where the height of the structure is less that of spacers, so that a part of the spacing is filled by a sample (light transit through part in sample and part in the M-LGS. This is useful in calculating the light absorption for different sample thickness.

Predict HgB Value Using Machine Learning on One Wavelength Method

One method of accurately predict HgB value only use one wavelength is using (1) machine learning to learn the scattering components from existing data, and/or (2) machine learning to learn the pure absorption components from existing data.

The challenge of HgB prediction from only one wavelength measurement at 500 nm to 550 nm is un-lysing whole blood at this wavelength has both absorption and scattering components. The absorption is the true value to predict HgB in the whole blood, while the scattering is the interference.

In the disclosure in this patent, a separate wavelength or duel band pass wavelength use another wavelength at 600 nm to 800 nm to measure the scattering components, and distract such from the 500 nm to 550 nm wavelength.

One way to predict scattering and/or absorption components is using machine learning to learn.

The annotated images are fed to the machine learning (ML) training module, and the model trainer in the machine learning module will train a ML model from the training data (annotated sample images). The input data will be fed to the model trainer in multiple iterations until certain stopping criterion is satisfied. The output of the ML training module is a ML model—a computational model that is built from a training process in the machine learning from the data that gives computer the capability to perform certain tasks (e.g. detect and classify the objects) on its own.

A Deep Learning—Generative Adversarial Network (GAN) is used in such application.

In one machine learning method to predict the pure absorption component from one wavelength is trained in this way:
(1) Annotate a pair of experiment images of Q-Card using same blood, one is whole blood without lysing (with scattering), one is lysed same whole blood (without scattering components from cells).
(2) The network is trained such that can accurately predict the whole blood without lysing to the lysed whole blood.
(3) In the training, the pillar can be used as the constant reference area to set the baseline for the model.

In one machine learning method to predict the pure scattering component from one wavelength is trained in this way:
(1) Annotate a pair of experiment images of Q-Card using same blood, one is whole blood without lysing (with scattering) measured at 500-550 nm, one is whole blood without lysing (with scattering) measured at 600-800 nm.
(2) The network is trained such that can accurately predict the whole blood at 500-550 nm without lysing to the measured value at 600-800 nm.
(3) In the training, the pillar can be used as the constant reference area to set the baseline for the model.

A method based on deep learning to transfer one single channel Hemoglobin image to an equivalent lysed image, which has minimum scattering effect on calculating the Hemoglobin based on colorimetric.

A method of automatically simulating large set of lysed Hemoglobin training data based on blood samples with ground truth Hemoglobin value. These training data is used to train the deep model for transferring single channel Hemoglobin image to lysed image.

Lysing Reagent Coating for iMOST-HgB Device

In some embodiment, surfactant is coated on the plate and dissolved into the blood to achieve a uniform distribution of red blood cell in device, wherein the coating can be on first plate, or second plate, or both.

In some embodiment, surfactant is coated on the plate and dissolved into the blood to lyse the red blood cell in device, wherein the coating can be on first plate, or second plate, or both.

In some embodiment, the surfactant coated in the device including but not limit to Zwittergent, ASB-14, ASB-16, CHAPS, Cationic surfactant NN-[Tris(hydroxymethyl) methyl]-N-alkyl-N,N-dimethyl ammonium chloride (IIa), IIb, IIc, IId, CTAC, Tween 20, Tween 40, Tween Tween 80, Sodium lauryl sulfate (SLS), ammonium lauryl sulfate, CTAB, sodium lauryl ether sulfate (SLES), sodium myreth sulfate, docusate, perfluorooctanesulfonate, alkyl-aryl ether phosphates, alkyl ether phosphates, CTAB, cetylpyridinium chloride (CPC), benzalkonium chloride (BAC), benzethonium chloride (BZT), dimethyldioctadecylammonium chloride, dioctadecyldimethlyammonium bromide (DODAB), cocamidopropyl hydroxysultaine, cocamidopropyl betaine, narrow-range ethoxylate, octaethylene glycol monododecyl ether, pentaethylene glycol monododecyl ether, nonxynols, Triton X-100, polyethoxylated tallow amine, cocamide monoethanolamine, cocamide diethanolamine, poloxamers, glycerol monostearate, glycerol monolaurate, sorbitan monolaurate, sorbitan monostearate, sorbitan tristearate, decyl glucoside, lauryl glucoside, octyl glucoside, lauryldimethylamine oxide, dimethyl sulfoxide, phosphine oxide.

In some embodiment, the reagent causing red blood cell lysis coated in the device including but not limit to Pluronic F-127, Cremophor EL, Pluronic F-68, Myrj 52, Brij 35, sodium oleate, sodium dodecyl sulfate, Tween 20, Tween 40, Tween 60, Tween 80, SLS, CTAB, CTAC, Tamoxifen, saponin, hydrochloric acid, sulfuric acid, nitric acid, phosphoric acid, lactic acid, ABS-14, ABS-16, anti-malaria drugs (quinine compounds), arsenic, dapsone, metals (chromium/ chromates, platinum salts, nickel compounds, copper, lead, cis-platinum), nitrites, nitrofurantoin, penicillin, phenazopyridine (pyridium), rho immune globulin, ribavirin, sulfonamides, sulfones.

In some embodiment, the anticoagulant coated in the device including but not limit to EDTA such as dipotassium ethylenediaminetetraacetic acid ($K_2$EDTA), tripotassium ethylenediaminetetraacetic ($K_3$EDTA), coumarins (vitamin K antagonists), warfarin (coumadin), acenocoumarol, phenprocoumon, atromentin, phenindione, heparin, fondaparinux and idraparinux, dabigatran, rivaroxaban, apixaban, edoxaban, betrixaban, NOACs, hirudin, lepirudin, bivalirudin, agratroban, dabigatran, batroxobin, hementin, Vitamin E, sodium citrate, acid citrate dextrose, oxalate such as fluoride oxalate, deltaparin, desirudin, enoxaparin.

In some embodiment, to achieve a uniform distribution of red blood cell in device, Zwittergent is coated on the plate with a preferred area concentration of 3 ng/mm$^2$, 5 ng/mm$^2$, 8 ng/mm$^2$, 12 ng/mm$^2$, 15 ng/mm$^2$, 25 ng/mm$^2$, 35 ng/mm$^2$, 50 ng/mm$^2$, 80 ng/mm$^2$, 100 ng/mm$^2$ or in a range between any of the two values.

In some embodiment, to lyse red blood cell in device, Zwittergent is coated on the plate with a preferred area concentration of 100 ng/mm$^2$, 120 ng/mm$^2$, 150 ng/mm$^2$, 180 ng/mm$^2$, 200 ng/mm$^2$, 300 ng/mm$^2$, 400 ng/mm$^2$, 500 ng/mm$^2$, 800 ng/mm$^2$, 1000 ng/mm$^2$ or in a range between any of the two values.

In some embodiment, to achieve a uniform distribution of red blood cell in device, Zwittergent is coated on the plate with a preferred final concentration in blood of 0.05 mg/mL, 0.1 mg/mL, 0.2 mg/mL, 0.3 mg/mL, 0.5 mg/mL, 0.6 mg/mL, 1.0 mg/mL, 2 mg/mL or in a range between any of the two values.

In some embodiment, to lyse red blood cell in device, Zwittergent is coated on the plate with a preferred final concentration in blood of 2 mg/mL, 3 mg/mL, 4 mg/mL, 5 mg/mL, 6 mg/mL, 7 mg/mL, 9 mg/mL, 10 mg/mL, 15 mg/mL, 25 mg/mL, 50 mg/mL, or in a range between any of the two values.

Measurement Range for iMOST-HgB Device

In some embodiment, the hemoglobin measurement range of the device is between 0 g/dL to 40 g/dL.

In some embodiment, the preferred hemoglobin measurement range of the device is between 0 g/dL to 30 g/dL.

In some embodiment, the preferred hemoglobin measurement range of the device is between 5 g/dL to 26 g/dL.

Scattering Particle Removal and Compensation

In certain situations, there are imperfections that can significantly reduce the accuracy of absorption and/or hemoglobin measurements.

For examples, there are interfering particles in the sample or sample holder, including but not limited to, particles increasing turbidity, light scattering particle, air bubbles, dust, or others that can an optical transmission different from that through a perfect (i.e. ideal sample). The present invention has a number of ways to reduce errors in an optical transmission sample analysis (OTSA) caused by the imperfection.

In some embodiment, multiple pairs of the SR regions are used. For each pair of the SR region, an OD of a sample is determined by taking the ratio of the light intensities through the sample region and through the reference region. For a given pair of the SR region, a quality measurement of the SR region is calculated; If the quality measurement is low, this pair of the SR region is excluded from the pooling algorithm in the next stage. The pooling algorithm is to pool OD of a sample over all pairs of SR regions. Various pooling algorithm can be utilized, including but not limited to median, mean, max, min, k-means, etc.

In some embodiment, the imperfection areas are removed or excluded from the image before the light intensities analyze.

In some embodiment, the imperfection areas with a boundary are removed or excluded from the image before the light intensities analyze, wherein the boundary size is between 1 um to 50 um; wherein the preferred boundary size is between 5 um to 20 um.

Measurement with/without Scanning

In certain embodiment, one location on device is measured for analysis, particularly for Hemoglobin.

QMAX System

A) QMAX Card

Details of the QMAX card are described in detail in a variety of publications including International Application No. PCT/US2016/046437, which is hereby incorporated by reference herein for all purposes.

B) Machine Learning

Details of the Network are described in detail in a variety of publications including International Application (IA) No. PCT/US2018/017504 filed Feb. 8, 2018, and PCT/US2018/057877 filed Oct. 26, 2018, each of which are hereby incorporated by reference herein for all purposes.

One aspect of the present invention provides a framework of machine learning and deep learning for analyte detection and localization. A machine learning algorithm is an algorithm that is able to learn from data. A more rigorous definition of machine learning is "A computer program is said to learn from experience E with respect to some class of tasks T and performance measure P, if its performance at tasks in T, as measured by P, improves with experience E." It explores the study and construction of algorithms that can learn from and make predictions on data—such algorithms overcome the static program instructions by making data driven predictions or decisions, through building a model from sample inputs.

Deep learning is a specific kind of machine learning based on a set of algorithms that attempt to model high level abstractions in data. In a simple case, there might be two sets of neurons: ones that receive an input signal and ones that send an output signal. When the input layer receives an input, it passes on a modified version of the input to the next layer. In a deep network, there are many layers between the input and output (and the layers are not made of neurons but it can help to think of it that way), allowing the algorithm to use multiple processing layers, composed of multiple linear and non-linear transformations.

One aspect of the present invention is to provide two analyte detection and localization approaches. The first approach is a deep learning approach and the second approach is a combination of deep learning and computer vision approaches.

(i) Deep Learning Approach. In the first approach, the disclosed analyte detection and localization workflow consists of two stages, training and prediction. We describe training and prediction stages in the following paragraphs.

(a) Training Stage

In the training stage, training data with annotation is fed into a convolutional neural network. Convolutional neural network is a specialized neural network for processing data that has a grid-like, feed forward and layered network topology. Examples of the data include time-series data, which can be thought of as a 1D grid taking samples at regular time intervals, and image data, which can be thought of as a 2D grid of pixels. Convolutional networks have been successful in practical applications. The name "convolutional neural network" indicates that the network employs a mathematical operation called convolution. Convolution is a specialized kind of linear operation. Convolutional networks are simply neural networks that use convolution in place of general matrix multiplication in at least one of their layers.

The machine learning model receives one or multiple images of samples that contain the analytes taken by the imager over the sample holding QMAX device as training data. Training data are annotated for analytes to be assayed, wherein the annotations indicate whether or not analytes are in the training data and where they locate in the image. Annotation can be done in the form of tight bounding boxes which fully contains the analyte, or center locations of analytes. In the latter case, center locations are further converted into circles covering analytes or a Gaussian kernel in a point map.

When the size of training data is large, training machine learning model presents two challenges: annotation (usually done by human) is time consuming, and the training is computationally expensive. To overcome these challenges, one can partition the training data into patches of small size, then annotate and train on these patches, or a portion of these patches. The term "machine learning" can refer to algorithms, systems and apparatus in the field of artificial intelligence that often use statistical techniques and artificial neural network trained from data without being explicitly programmed.

The annotated images are fed to the machine learning (ML) training module, and the model trainer in the machine learning module will train a ML model from the training data (annotated sample images). The input data will be fed to the model trainer in multiple iterations until certain stopping criterion is satisfied. The output of the ML training module is a ML model—a computational model that is built from a training process in the machine learning from the data that gives computer the capability to perform certain tasks (e.g. detect and classify the objects) on its own.

The trained machine learning model is applied during the predication (or inference) stage by the computer. Examples of machine learning models include ResNet, DenseNet, etc. which are also named as "deep learning models" because of the depth of the connected layers in their network structure. In certain embodiments, the Caffe library with fully convolutional network (FCN) was used for model training and predication, and other convolutional neural network architecture and library can also be used, such as TensorFlow.

The training stage generates a model that will be used in the prediction stage. The model can be repeatedly used in the prediction stage for assaying the input. Thus, the computing unit only needs access to the generated model. It does not need access to the training data, nor requiring the training stage to be run again on the computing unit.

(b) Prediction Stage

In the predication/inference stage, a detection component is applied to the input image, and an input image is fed into the predication (inference) module preloaded with a trained model generated from the training stage. The output of the prediction stage can be bounding boxes that contain the detected analytes with their center locations or a point map indicating the location of each analyte, or a heatmap that contains the information of the detected analytes.

When the output of the prediction stage is a list of bounding boxes, the number of analytes in the image of the sample for assaying is characterized by the number of detected bounding boxes. When the output of the prediction stage is a point map, the number of analytes in the image of the sample for assaying is characterized by the integration of the point map. When the output of the prediction is a heatmap, a localization component is used to identify the location and the number of detected analytes is characterized by the entries of the heatmap.

One embodiment of the localization algorithm is to sort the heatmap values into a one-dimensional ordered list, from the highest value to the lowest value. Then pick the pixel with the highest value, remove the pixel from the list, along with its neighbors. Iterate the process to pick the pixel with the highest value in the list, until all pixels are removed from the list. In the detection component using heatmap, an input image, along with the model generated from the training stage, is fed into a convolutional neural network, and the output of the detection stage is a pixel-level prediction, in the form of a heatmap. The heatmap can have the same size as the input image, or it can be a scaled down version of the input image, and it is the input to the localization component. We disclose an algorithm to localize the analyte center. The main idea is to iteratively detect local peaks from the heatmap. After the peak is localized, we calculate the local area surrounding the peak but with smaller value. We remove this region from the heatmap and find the next peak from the remaining pixels. The process is repeated only all pixels are removed from the heatmap.

In certain embodiments, the present invention provides the localization algorithm to sort the heatmap values into a one-dimensional ordered list, from the highest value to the lowest value. Then pick the pixel with the highest value, remove the pixel from the list, along with its neighbors. Iterate the process to pick the pixel with the highest value in the list, until all pixels are removed from the list.

```
Algorithm GlobalSearch (heatmap)
Input:
    heatmap
Output:
    loci
loci ← { }
sort(heatmap)
while (heatmap is not empty) {
    s ← pop(heatmap)
    D ← {disk center as s with radius R}
    heatmap = heatmap \ D // remove D from the heatmap
    add s to loci
}
```

After sorting, heatmap is a one-dimensional ordered list, where the heatmap value is ordered from the highest to the lowest. Each heatmap value is associated with its corresponding pixel coordinates. The first item in the heatmap is the one with the highest value, which is the output of the pop(heatmap) function. One disk is created, where the center is the pixel coordinate of the one with highest heatmap value. Then all heatmap values whose pixel coordinates resides inside the disk is removed from the heatmap. The algorithm repeatedly pops up the highest value in the current heatmap, removes the disk around it, till the items are removed from the heatmap.

In the ordered list heatmap, each item has the knowledge of the proceeding item, and the following item. When removing an item from the ordered list, we make the following changes:

Assume the removing item is $x_r$, its proceeding item is $x_p$, and its following item is $x_f$.

For the proceeding item $x_p$, re-define its following item to the following item of the removing item. Thus, the following item of $x_p$ is now $x_f$.

For the removing item $x_r$, un-define its proceeding item and following item, which removes it from the ordered list.

For the following item $x_f$, re-define its proceeding item to the proceeding item of the removed item. Thus, the proceeding item of $x_f$ is now $x_p$.

After all items are removed from the ordered list, the localization algorithm is complete. The number of elements in the set loci will be the count of analytes, and location information is the pixel coordinate for each s in the set loci.

Another embodiment searches local peak, which is not necessary the one with the highest heatmap value. To detect each local peak, we start from a random starting point, and search for the local maximal value. After we find the peak, we calculate the local area surrounding the peak but with smaller value. We remove this region from the heatmap and find the next peak from the remaining pixels. The process is repeated only all pixels are removed from the heatmap.

```
Algorithm LocalSearch (s, heatmap)
Input:
    s: starting location (x, y)
    heatmap
Output:
    s: location of local peak.
We only consider pixels of value > 0.
Algorithm Cover (s, heatmap)
Input:
    s: location of local peak.
    heatmap:
Output:
    cover: a set of pixels covered by peak:
```

This is a breadth-first-search algorithm starting from s, with one altered condition of visiting points: a neighbor p of the current location q is only added to cover if heatmap[p]>0 and heatmap[p]<=heatmap[q]. Therefore, each pixel in cover has a non-descending path leading to the local peak s.

```
Algorithm Localization (heatmap)
Input:
    heatmap
Output:
    loci
loci ← { }
pixels ← {all pixels from heatmap}
while pixels is not empty {
    s ← any pixel from pixels
    s ← LocalSearch(s, heatmap)           // s is now local peak
    probe local region of radius R surrounding s for better local peak
    r ← Cover(s, heatmap)
    pixels ← pixels \ r                    // remove all pixels in cover
    add s to loci
```

(ii) Mixture of Deep Learning and Computer Vision Approaches. In the second approach, the detection and localization are realized by computer vision algorithms, and a classification is realized by deep learning algorithms, wherein the computer vision algorithms detect and locate possible candidates of analytes, and the deep learning algorithm classifies each possible candidate as a true analyte and false analyte. The location of all true analyte (along with the total count of true analytes) will be recorded as the output.

(a) Detection. The computer vision algorithm detects possible candidate based on the characteristics of analytes, including but not limited to intensity, color, size, shape, distribution, etc. A pre-processing scheme can improve the detection. Pre-processing schemes include contrast enhancement, histogram adjustment, color enhancement, de-nosing, smoothing, de-focus, etc. After pre-processing, the input image is sent to a detector. The detector tells the existing of possible candidate of analyte and gives an estimate of its location. The detection can be based on the analyte structure (such as edge detection, line detection, circle detection, etc.), the connectivity (such as blob detection, connect components, contour detection, etc.), intensity, color, shape using schemes such as adaptive thresholding, etc.

(b) Localization. After detection, the computer vision algorithm locates each possible candidate of analytes by providing its boundary or a tight bounding box containing it. This can be achieved through object segmentation algorithms, such as adaptive thresholding, background subtraction, floodfill, mean shift, watershed, etc. Very often, the localization can be combined with detection to produce the detection results along with the location of each possible candidates of analytes.

(c) Classification. The deep learning algorithms, such as convolutional neural networks, achieve start-of-the-art visual classification. We employ deep learning algorithms for classification on each possible candidate of analytes. Various convolutional neural network can be utilized for analyte classification, such as VGGNet, ResNet, MobileNet, DenseNet, etc.

Given each possible candidate of analyte, the deep learning algorithm computes through layers of neurons via convolution filters and non-linear filters to extract high-level features that differentiate analyte against non-analytes. A layer of fully convolutional network will combine high-level features into classification results, which tells whether it is a true analyte or not, or the probability of being a analyte.

EXAMPLES

A) Example 1

An OAC is a QMAX device having two plates.

The first plate is a rectangle shaped PMMA plate having a flat surface and a thickness of, for example, from 0.8 to 1.1 mm, 0.5 to 1.5 mm, or 0.3 to 2 mm; a length of, for example, from 28 to 32 mm, 25 to 35 mm, or 20 to 50 mm; and a width of, for example, from 20 to 28 mm, 15 to 34 mm, or 10 to 40 mm.

The second plate is a rectangle shaped PMMA film having a flat surface and an array of micro pillars, i.e., pillar array, imprinted on the flat surface. The PMMA film has a thickness of, for example, from 0.8 to 1.1 mm, 0.5 to 1.5 mm, or 0.3 to 2 mm; a length of, for example, from 28 to 32 mm, 25 to 35 mm, or 20 to 50 mm; and a width of, for example, from 20 to 28 mm, 15 to 34 mm, or 10 to 40 mm. In some embodiments, when putting the first plate and the second plate together to hold the sample, at least three sides of the second plate is inside the area of the first plate. The pillar array has a shape of either rectangle or square, a flat top, and a pillar lateral size of, for example, from 30 to 40 microns (um), 25 to 45 um, 20 to 50 um, 10 to 60 um, or 5 to 70 um, a pillar height of, for example, from 10 to 30 um, 5 to 40 um, 1 to 50 um, or 0.1 to 100 um, and a distance between two neighboring pillar centers of, for example, from 80 to 110 um, 60 to 130 um, 30 to 180 um, or 30 to 200 um.

B) Hemoglobin Measurements Using OAC—Using One Wavelength

In an example experiment, an OAC is, for example, a QMAX device that has two plates. The first plate is 1 mm thick flat PMMA substrate with a size of 30 mm×24 mm. The second plate is 175 um thick PMMA film with a micro pillar array on it with a size of 24 mm×22 mm. The pillar array has pillar size of 30 um×40 um, pillar-to-pillar edge distance of 80 um, and pillar height of 10 um or 30 um.

The sample is a fresh whole blood (2.5 microliters (uL) for 10 um pillar height, 5 uL for 30 um pillar height), which sample was dropped in a location on the first plate, and pressed by the second plate.

In the optical measurements, shown in FIG. 13, an LED white source light was filtered by a dual band pass filter (e.g., 532 to 576 nm green; and e.g., 625 to 675 nm red) and illuminated two 45 degree mirror sets. The light then passed through a semi-opaque diffuser, to eliminate coherence of the point source's wave front and ensure the intensity change is only due to the absorption. Finally, the resulting diffused light transits the QMAX device (i.e., a sample card) and was collected by a lens, and imaged and recorded by a camera.

The LED source light and camera used in this example can both be, for example, from a mobile phone.

The picture taken by camera, i.e., the recorded image, shows that there are two regions: one region is the pillar region; and the other region is the blood sample region.

The absorption of light in the pillar region is negligible. Also, the extinction coefficient of oxygenated hemoglobin [HbO$_2$] and deoxygenated hemoglobin [Hb] in the wavelength range of 532 nm to 576 nm is similar $\varepsilon_{Hb} \approx \varepsilon_{HbO_2} = 44000$-$48000$ cm$^{-1}$/M.

Thus, $OD^{green} = \ln(I/Io) = \varepsilon_{HbO_2}^{green}\{[Hb]+[HbO_2]\}L$

Figure 14:
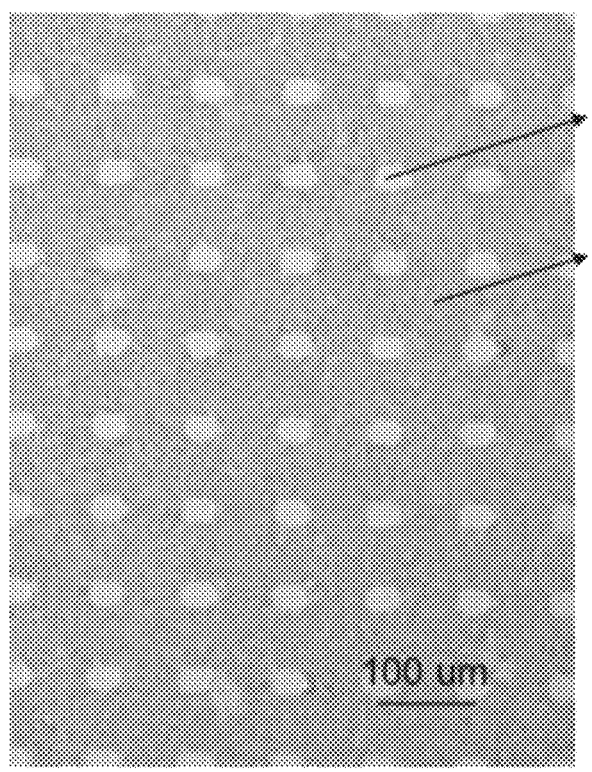
FIG. 14 illustrates an exemplary hemoglobin measurement in a QMAX card taken by an iPhone.

As shown in FIG. 14, I is the average intensity in the blood region, Io is the average intensity in the center of the pillar region. When calculating the average intensity, a 5 um area near the pillar boundary is subtracted to reduce the average error.

$$\text{Total hemoglobin concentration} = [HbO_2] + [Hb] = \frac{\ln\left(\frac{I}{Io}\right)}{\varepsilon \times gap}$$

Figure 15:
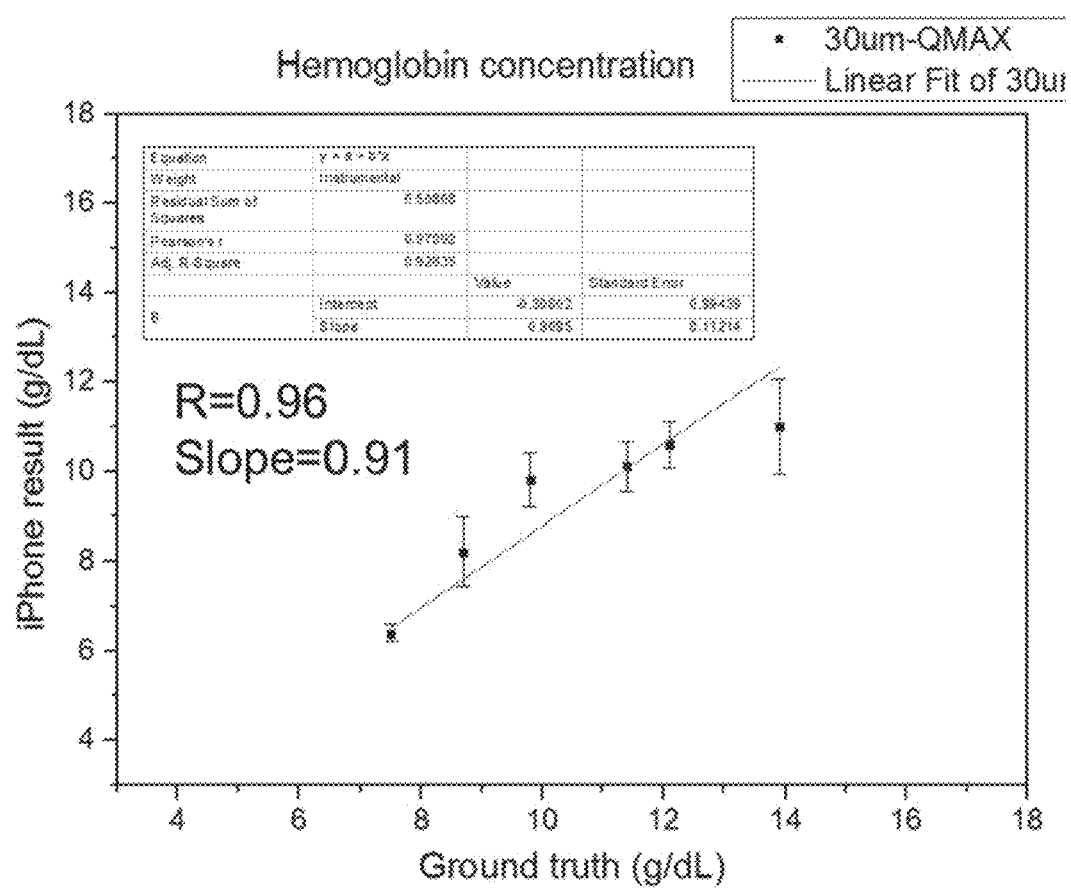
FIG. 15 illustrates an exemplary QMAX hemoglobin measurement compared with the gold standard (Abbott Emerald Hemocytometer).

The hemoglobin in blood ranging from 6 g/dL to 11 g/dL was measured with both QMAX device setup and a commercial Abbott Emerald hemocytometer machine and the results were compared as shown in FIG. 15. For each concentration, three cards were measured to calculate the standard deviation.

From the results, the repeatability (CV) of hemoglobin measurements for the same blood sample using a QMAX card was around 5% and the R2 value was 96% when compared with an industry standard, i.e., a commercial instrument from HemoCue America (www.hemocue.us), e.g., HemoCue® Hb 801 System or Hb 301 System. The HemoCue® Hb 301 System provides quick and easy access to lab-quality results in three seconds or less. The instrument is claimed to be optimized for hemoglobin measurement in blood bank donation and public health settings.

C) Example-3

Figure 23:
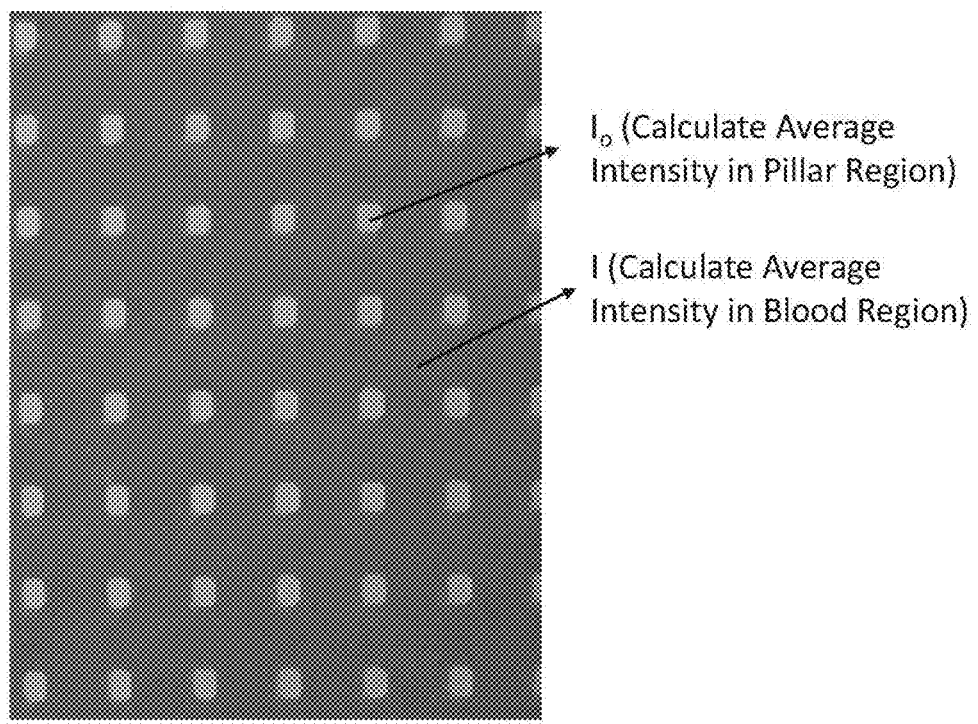
FIG. 23 illustrates an exemplary hemoglobin measurement in a QMAX card taken by iPhone, in accordance with an embodiment.

FIG. 23 illustrates an example of a hemoglobin measurement, where the image of an optical transmission image through a thin layer of whole blood (without lysing) in an OAC (e.g., the sample holder described in FIG. 6), and the light source is a diffusive light source (e.g., a light diffuser is placed in front of a point light source), and the image taken by an iPhone. In FIG. 23, the light-guiding spacers are periodically placed on a QMAX card, with a vertical periodic distance of 120 um and a horizontal periodic distance of 110 um.

Figure 16:
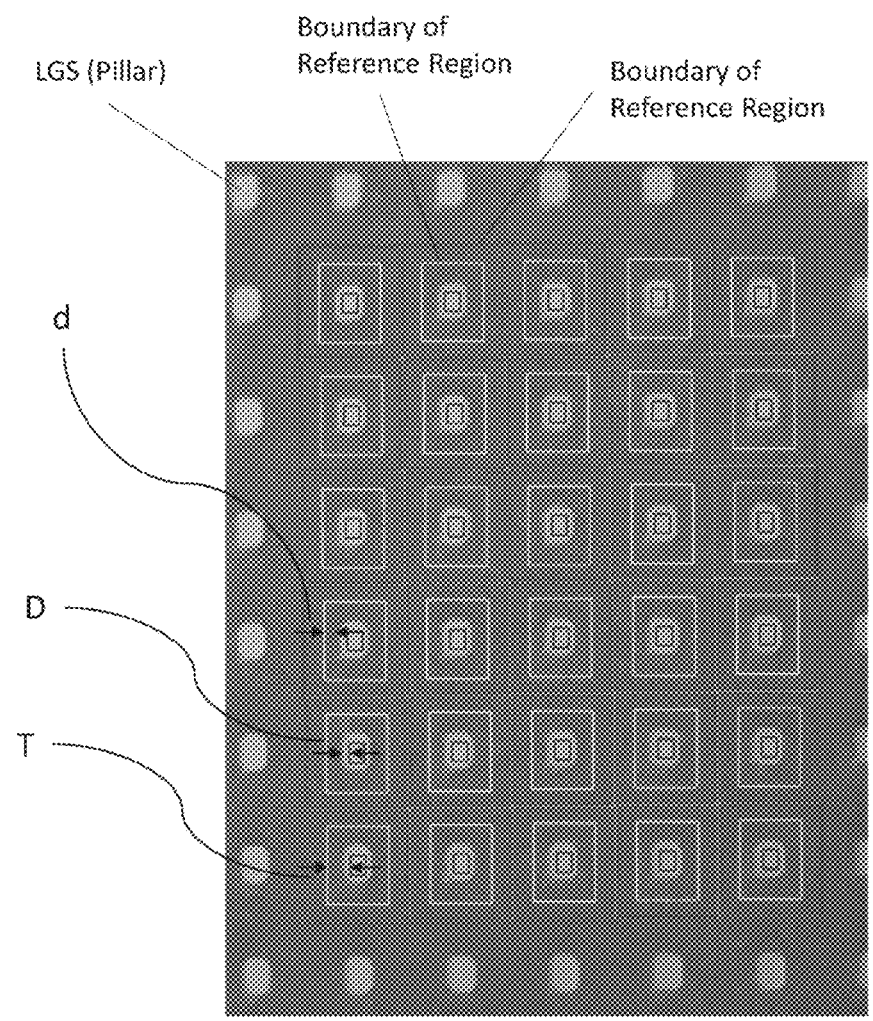
FIG. 16 illustrates an exemplary method for selecting sampling regions and reference regions.

FIG. 16 illustrates an example of the sample regions and reference regions selected for determining hemoglobin using the image from FIG. 16. The boundary of the sampling regions and the reference are marked. In FIG. 16, the reference regions (with the outer boundaries indicated in light shading) are inside light-guiding spacers; D, the distance between the edges of the reference region and the light-guiding spacer, is 10 um; d, the distance between the edges of the sampling region and the light-guiding spacer, is 30 um; and T, the distance between the edges of the sampling region and the reference region, is 40 um.

D) Image Processing

The image processing algorithm used in the hemoglobin absorption measurements made with the disclosed apparatus having a single white light source and a Bayer filter included of the following steps:

converting a raw image data file (e.g., a RAW file), to an image file having a two or three color value for each pixel by, for example, Bayer pattern interpolation but without (i.e., omitting certain conventional analysis and metrics), for example, color space conversion, white balance, gamma, curve, noise reduction, or any combinations thereof.

detecting the light-guiding spacers;

determining a reference region and a sampling region, and associating a specific reference region with a specific sample region to create an identified individual region;

calculating the total analyte concentration for the identified individual region, e.g., the total hemoglobin concentration using the above formula, from the intensity of the sample region and the intensity of the reference region for one or more of the associated identified individual region; and pooling one or more individual region, for example, using a pooling algorithm, to produce a single analyte absorption measurement or value for the analyzed sample.

Detecting the light-guiding spacer detects and locates the light-guiding spacers, which can be, for example, periodically, systematically, or regularly situated or placed on a QMAX card. Various object detection algorithms can be employed, including for example, template matching, blob detection, contour detection, and like algorithms. The detection can be performed, for example, in a single color channel in a color space (e.g., RGB, HSV, HSI, Lab, YCrCb, etc.), such as the green channel in a RGB color space, or the hue channel in the HSV space, or a combination of two or more color channels, such as using red-green-blue channels in a RGB color space.

After the periodic light-guiding spaces are detected and located, the reference regions (i.e., located inside or within the light-guiding spacer areas) and sampling regions are selected. Examples of the sizes of reference regions and sampling regions, and the distance among the edges of the light-guiding spaces, reference regions, and sampling regions are mentioned in the description the Figures.

For reference regions and sampling regions, they can be associated by the relative location and distance. When one (or more) reference region is associated with one (or more) sampling region to create an individual region, a hemoglobin absorption measurement can be calculated by the method and formula mentioned above. In some embodiments, one reference region can be associated with one sampling region having, for example, the shortest distance, and the hemoglobin absorption measurement can be calculated for each association.

A pooling algorithm can be used to mathematically characterize and further analyze the measurement data, for example, to pool hemoglobin absorption measurements from each association of a reference region and a sample region, and produce a single hemoglobin absorption measurement for the blood sample. Various pooling algorithms can be used to characterize the measurement data, such as median, mean, max, min, k-means, and like algorithms. Pooling can also refer to combining data, but pooling can also refer to combining information rather than the raw data. One common use of pooling is to estimate a variance. In one example pooling combines two estimates of variance for samples from two different groups and taking a weighted average of the pool provides a single estimate of common variance.

In some embodiments, the imaging processing can use artificial intelligence, machine learning, or both. In some embodiments, the imaging processing can use deep learning.

E) Using Two Wavelengths

Similar to above experimental setup, except using 2 different band pass filters and taking 2 pictures.

After taking the picture, by calculating the $$OD = \ln\left(\frac{I}{Io}\right)$$

of blood with two different wavelength $\lambda_1$ and $\lambda_2$, e.g, 660 nm and 940 nm:

$$OD^{\lambda_1} = \{\varepsilon_{Hb}^{\lambda_1}[Hb] + \varepsilon_{HbO_2}^{\lambda_1}[HbO_2]\}L$$

$$OD^{\lambda_2} = \{\varepsilon_{Hb}^{\lambda_2}[Hb] + \varepsilon_{HbO_2}^{\lambda_2}[HbO_2]\}L$$

We get:

$$[HbO_2] = \frac{\varepsilon_{Hb}^{\lambda_2}OD^{\lambda_1} - \varepsilon_{Hb}^{\lambda_1}OD^{\lambda_2}}{L\left(\varepsilon_{Hb}^{\lambda_2}\varepsilon_{HbO_2}^{\lambda_1} - \varepsilon_{Hb}^{\lambda_1}\varepsilon_{HbO_2}^{\lambda_2}\right)}$$

$$[Hb] = \frac{\varepsilon_{HbO_2}^{\lambda_2}OD^{\lambda_1} - \varepsilon_{HbO_2}^{\lambda_1}OD^{\lambda_2}}{L\left(\varepsilon_{Hb}^{\lambda_1}\varepsilon_{HbO_2}^{\lambda_2} - \varepsilon_{Hb}^{\lambda_2}\varepsilon_{HbO_2}^{\lambda_1}\right)}$$

ε is the extinction coefficient of hemoglobin, [Hb] and [HbO$_2$] is the concentration of hemoglobin, and L is the length of light path through the sample or the gap size of QMAX device.

Thus, total hemoglobin concentration=[HbO$_2$]+[Hb].

This method could further provide the detailed information of the ratio between [HbO$_2$] and [Hb].

HgB Image Processing to Compute Absorption Measurement from a Blood Sample Using Two Wavelengths In some embodiments, the disclosure provides a method of imaging of a HgB blood sample. The image can be processed with the following steps, the algorithm:

1. takes a digital image of a hemoglobin sample as input;
2. runs a color distribution check. If the check fails, the image sample is rejected;
3. runs pillar detection;
4. checks the pillar detection score. If the check fails, the image sample is rejected;
5. after the image passes the pillar detection score check, the algorithm runs a horizontal pillar check;
6. runs vertical pillar check; and
7. computes a hemoglobin (HgB) value.

Figure 3:
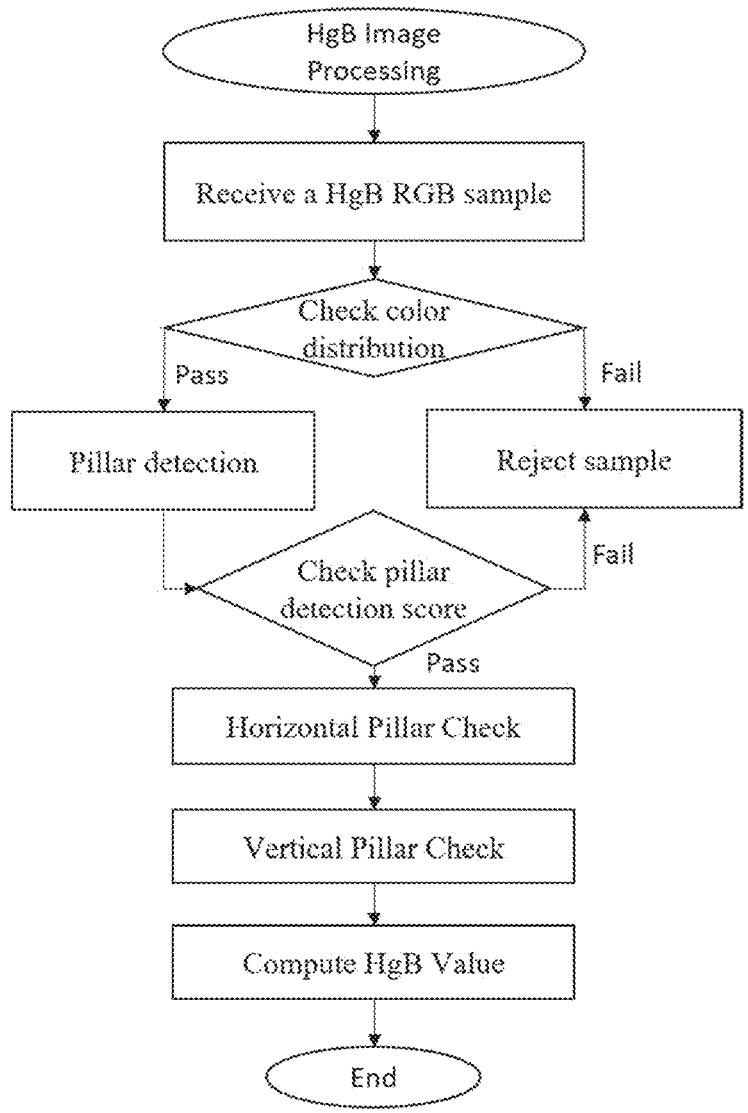
FIG. 3 illustrates a flow chart for the workflow for HgB absorption measurement image processing, in accordance with an embodiment.

FIG. 3 shows a flow chart for the workflow for HgB absorption measurement image processing. During the color distribution check, if the average intensity of a color channel was outside a given range, then the image was rejected. Each channel was checked against a different range. If the pillar detection score for pillars was outside a given range, then the image was rejected.

Figure 4:
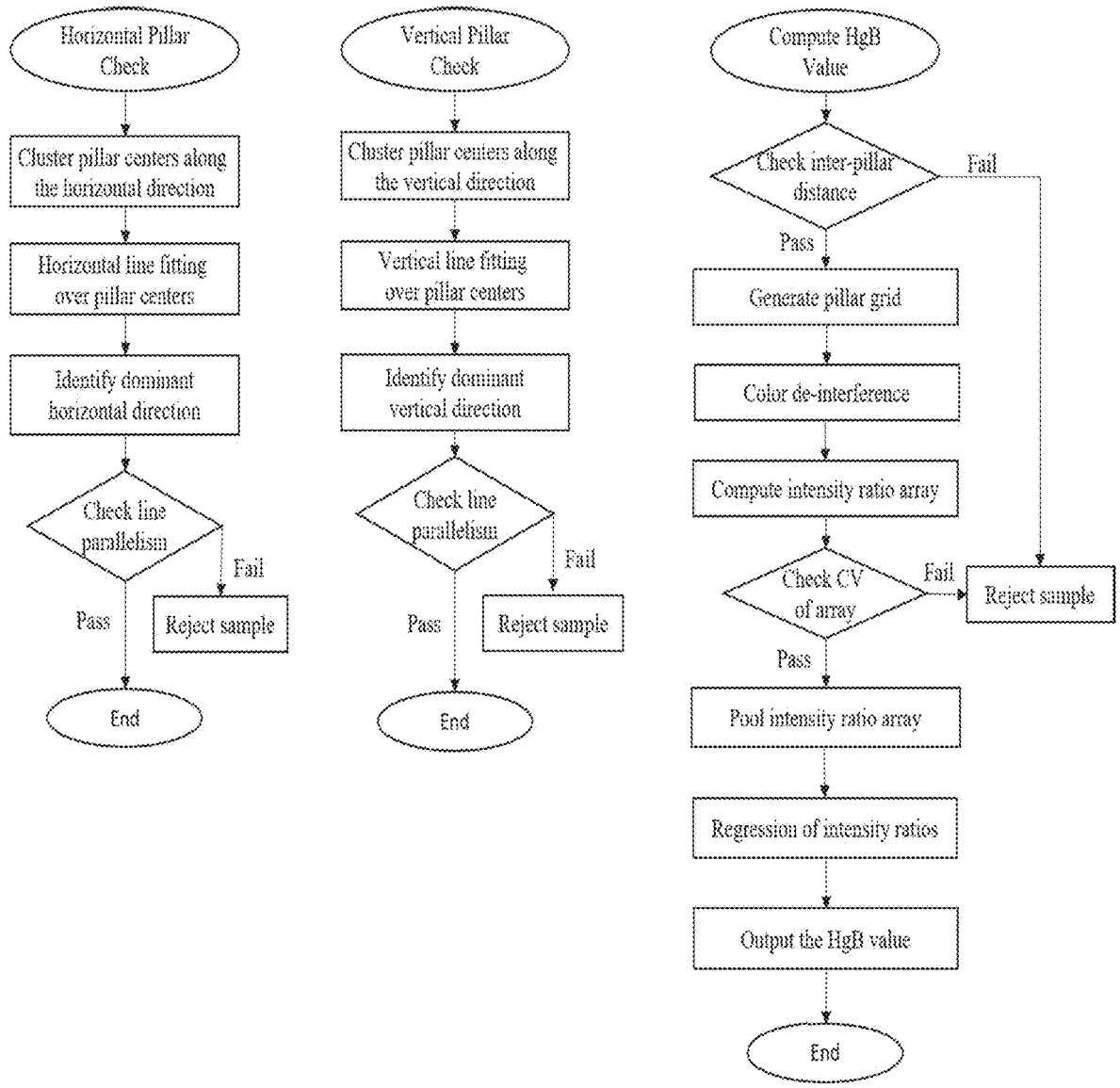
FIG. 4 illustrates components of HgB image processing including: the horizontal pillar check, the vertical pillar check, and the compute intensity ratio, in accordance with an embodiment.

FIG. 4 shows the components of HgB image procesing including: the horizontal pillar check, the vertical pillar check, and the compute intensity ratio. The horizontal direction clustering identifies horizontal lines passing through pillar centers. The algorithm includes the following steps:
1. makes clusters of pillar centers along the horizontal direction;
2. runs horizontal line fitting over pillar centers;
3. identifies a dominant horizontal direction;
4. runs a line parallelism check (if the check fails, the image sample is rejected);
5. After the image passes a line parallelism check, the algorithm goes to the next step of vertical direction clustering.

The vertical direction clustering identifies vertical lines passing through the pillar centers. The algorithm includes of the following steps:
1. makes clusters of pillar centers along the vertical direction;
2. runs vertical line fitting over pillar centers;
3. identifies a dominant vertical direction;
4. runs line parallelism check (if the check fails, the image sample is rejected);

The "compute HgB value" component algorithm includes the following steps:
1. checks the inter-pillar distance (if the check fails, the image sample is rejected);
2. After the image passes the inter-pillar distance check, the algorithm generates a pillar gird;
3. employs a color de-interference matrix to separate red and green color channels;
4. computes the ratio of the blood intensity over pillar intensity for each pillar in both red and green channels;
5. checks the coefficient of variation (CV) of intensity ratios (if the check fails, the image sample is rejected);
6. After the image passes the CV check, it finds the medium of intensity ratios for red and green channels;
7. computes a linear combination of the output intensity ratio from red and green channels and outputs the result as the HgB value;

For inter-pillar distance, if the average distance between each pair of adjacent pillar centers is outside a given range, then the image is rejected.

The red and green channels of a HgB image from dual wavelengths can interfere with each other. A color de-interference matrix is applied to derive new red and green channels to reduce color interference $$\begin{pmatrix} R_{new} \\ G_{new} \end{pmatrix} = \begin{bmatrix} a_1 & a_2 \\ b_1 & b_2 \end{bmatrix} \begin{pmatrix} R \\ G \end{pmatrix}$$

where $a_1$, $a_2$, $b_1$, and $b_2$ are the color de-interference matrix coefficients. They are determined, for example, using single wavelength referecne samples.

After the intensity ratio for each pillar in both red and green channels are computed, the alogrithm checks the CV of intensity ratios. If the CV of intensity is outside a given range, then the image is rejected.

The medium of intensity ratios, r red and r green, of both red and green channels are employed for the HgB value calculation. The formula for the HgB value calculation is based on a linear combination of the logarithm of these two ratios:

$$HgB = A \ln(r_{red}) + B \ln(r_{green}) + C$$

The three coefficients A, B, and C are pre-determined, for example, using regression on HgB blood samples with known HgB values.

F) Light Guiding Spacer, Sampling Region, and Reference Region

In some embodiments, the sampling region boundary has a size of 120 um by 110 um; the edge of sampling area has a size of 60 um by 45 um; the light guiding spacer or pillar has a size of 40 um by 30 um; the reference region has a size of 20 um by 15 um. In some embodiments, the area of reference region is ½ of the size of the light guiding spacer area, the distance between edge of the sampling area and that of the light guiding spacer is ½ of the light guiding spacer area, and the area of the sampling area is equal to the periodic inter spacer distance.

EXAMPLES

The following Examples demonstrate making, use, and analysis of the disclosed apparatus and methods in accordance with the above general procedures.

Example 1 (Actual)

Figure 19A:
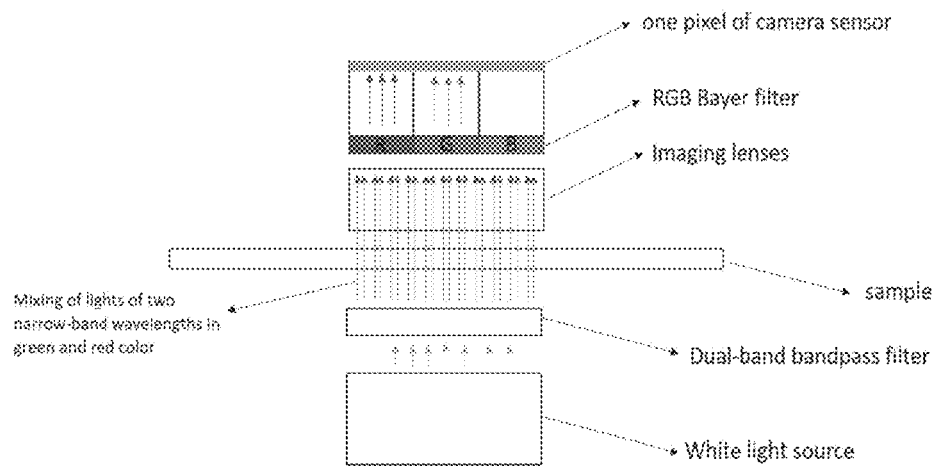
FIG. 19A schematically illustrates an apparatus and a method of using an RGB color camera sensor to measure a transmitted light signal at dual wavelengths in red and green color regions by a single sensor image or single camera shot, in accordance with an embodiment.
Figure 19B:
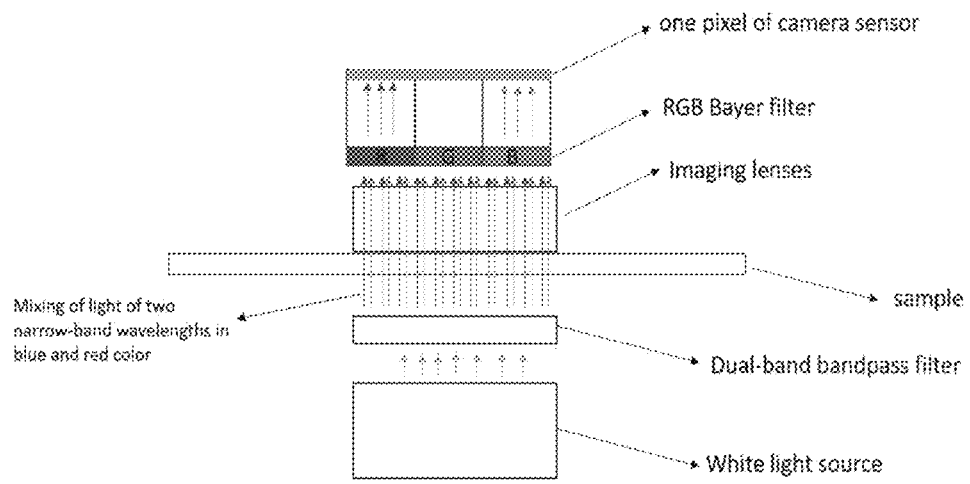
FIG. 19B is a schematic illustration of an apparatus and a method of using an RGB color camera sensor to measure a transmitted light signal at dual wavelengths in red and blue color regions by a single sensor image or single camera shot, in accordance with an embodiment.
Figure 19C:
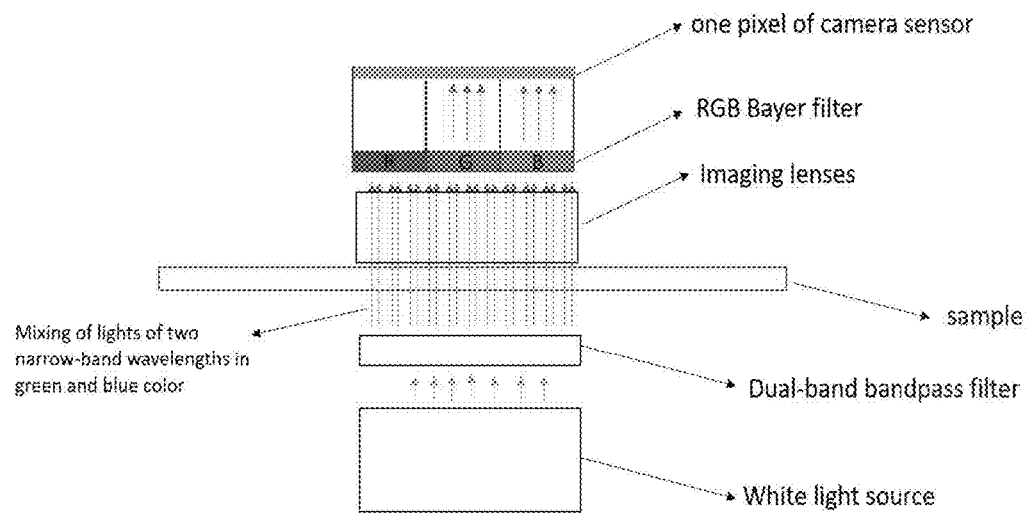
FIG. 19C is a schematic illustration of an apparatus and a method of using an RGB color camera sensor to measure a transmitted light signal at dual wavelengths in green and blue color regions by a single sensor image or single camera shot, in accordance with an embodiment.
Figure 19D:
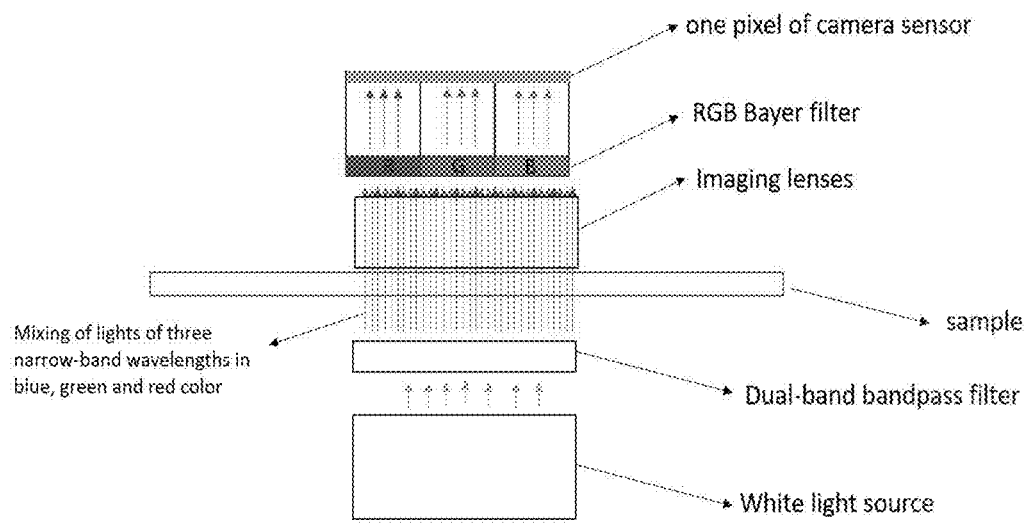
FIG. 19D is a schematic illustration of an apparatus and a method of using an RGB color camera sensor to measure a transmitted light signal at dual wavelengths in green, blue and red color regions by a single sensor image or single camera shot, in accordance with an embodiment.

Apparatus having dual-band bandpass filter for hemoglobin analysis in blood. In an apparatus as shown in FIG. 19A, the illuminant was a single white light source such as an LED in a smart phone, the filter was a dual-band bandpass filter that converted or cleaned the single white light source into a mixture of two different colored lights of green and red light, and the sample was human whole blood expected to have hemoglobin as the analyte. The dual-bandpass filter converted or cleaned the single white light, for example, before interrogating the sample.

Example 2 (Prophetic)

Figure 20:
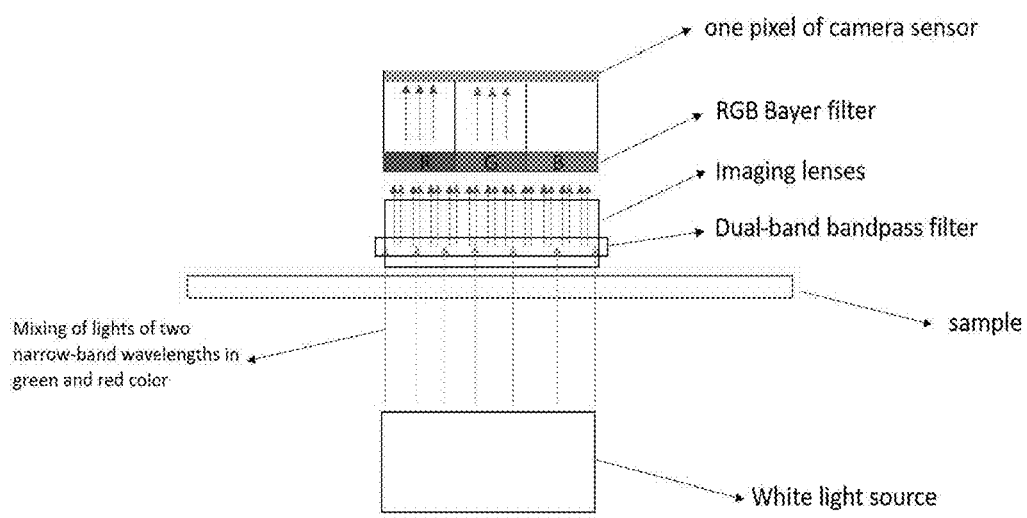
FIG. 20 is a schematic illustration of an apparatus and a method of using an RGB color camera sensor to measure a transmitted light signal at triple wavelengths in green, blue, and red color regions by a single sensor image or single camera shot, in accordance with an embodiment.

Apparatus having triple-band bandpass filter for hemoglobin analysis in blood. In an apparatus as shown in FIG. 20, the illuminant is a single white light source such as an LED in a smart phone, and the filter is a triple-band bandpass filter that converts or cleans the single white light source into a mixture of three different colored lights such as red, green, and blue light, and the sample is human whole blood expected to contain hemoglobin as the analyte. The triple-band bandpass filter converts or cleans the single white light, for example, after interrogating the sample.

Aspects:
1. A device comprising:
    a first plate, a second plate, a light guiding spacer (LGS), a sampling region, and a reference region, wherein:
    (i) the first plate and second plate are configured to sandwich a sample, this is for an optical transmission analysis by light, into a thin layer between the plates, and each plate has a sample contact area on its inner surface that contacts the sample;
    (ii) the light-guiding spacer (LGS) has a pillar shape, is sandwiched between the two plates with each end of the pillar in direct contact to one of the plates forming a LGS-plate contact area, and is configured to allow the light transmits from the first plate, through the LGS, to the second plate without going through a sample,
(iii) the sampling region is the region that the light can go through, in sequence, the first plate, the sample, and the second plate, wherein the sampling region does not have the LGS; and
(iv) the reference region is the region that the light transmits through, in sequence, the first plate, the light-guiding spacer, and the second plate, without going through the sample;

wherein the LGS-contact areas and a lateral cross-section of the LGS are larger than the wavelength of the light, wherein the light-guiding spacer is surrounded by or near the sample; and wherein the sample in the sampling region has a thickness of 500 um or less.

2. A device for analyzing hemoglobin in a sample, comprising:

a first plate, a second plate, and a light-guiding spacer, wherein:
(i) the first plate and second plate are movable relative to each other into different configurations, including an open configuration and a closed configuration;
(ii) each of the plates comprises an inner surface that has a sample contact area for contacting a sample that contains or is suspected to contain hemoglobin; and
(iii) the light-guiding spacer has a pillar shape, wherein top and bottom surfaces of the light-guiding spacers are substantially flat and the bottom surface is fixed on the inner surface of one of the plates, wherein the area of the top and bottom surfaces and average lateral cross-section of each spacer is respectively larger than the wavelength of the light that analyze the sample, wherein the light-guiding spacer is inside the sample contact area;

wherein the open configuration is a configuration, in which: the two plates are separated apart, the spacing between the plates is not regulated by the light-guiding spacers, and the sample is deposited on one or both of the plates;

wherein the closed configuration is a configuration, which is configured after the sample deposition in the open configuration; and in the closed configuration: at least part of the sample is compressed by the two plates into a layer of highly uniform thickness, wherein the uniform thickness of the layer is confined by the sample contact areas of the plates and is regulated by the plates and the light-guiding spacers; and wherein in the closed configuration: (a) at least one spacer in the sample contact area has its top surface in direct contact with one of the plates, and the at least one spacer and the regions of the plates above and below the at least one spacer define a reference region wherein the reference region is transparent to light within a wavelength range, and (b) at least one region in the sample contact area on one plate and its corresponding region on the other plate are not occupied by the light-guiding spacers, defining a sampling region that is transparent to light within the same wavelength range.

3. A device for analyzing hemoglobin in an analyte in a sample, comprising:

a first plate, a second plate, and a light-guiding spacer, wherein:
(i) the first plate and second plate are configured to hold a sample that contains or is suspected to contain an analyte, wherein at least part the sample is between the two plates and is in contact with both plates; and
(ii) the light-guiding spacer has a pillar shape and a predetermined substantially height, wherein top and bottom surfaces of the light-guiding spacers are substantially flat and the top and bottom surfaces of at least one spacer are in direct contact with the plates, wherein the area of the top and bottom surfaces and average lateral cross-section of each spacer is respectively larger than the wavelength of the light that analyze the sample, and wherein: (a) the at least one spacer and the regions of the plates directly above and below the at least one spacer define a reference region that is transparent to light within a wavelength range and passing through the plates and the spacer, and (b) at least one region in the sample contact area on one plate and its corresponding region on the other plate are not occupied by the light-guiding spacers, defining a sampling region that is transparent to light within the same wavelength range.

4. A device for analyzing an analyte in a sample, comprising:

a first plate, a second plate, and light-guiding spacers, wherein:
(i) the first plate and second plate are movable relative to each other into different configurations, including an open configuration and a closed configuration;
(ii) each of the plates comprises an inner surface that has a sample contact area for contacting a sample that contains or is suspected to contain an analyte; and
(iii) the light-guiding spacers have a pillar shape and a predetermined substantially uniform height, wherein top and bottom surfaces of the light-guiding spacers are substantially flat and the bottom surface is fixed on the inner surface of one or the plates, wherein the area of the top and bottom surfaces and average lateral cross-section of each spacer is respectively larger than 1 the wavelength of the light that analyze the sample, wherein at least one of the light-guiding spacers is inside the sample contact area;

wherein the open configuration is a configuration, in which: the two plates are separated apart, the spacing between the plates is not regulated by the light-guiding spacers, and the sample is deposited on one or both of the plates;

wherein the closed configuration is aa configuration, which is configured after the sample deposition in the open configuration; and in the closed configuration: at least part of the sample is compressed by the two plates into a layer of highly uniform thickness, wherein the uniform thickness of the layer is confined by the sample contact areas of the plates and is regulated by the plates and the light-guiding spacers; and wherein in the closed configuration, (a) at least one spacer in the sample contact area has its top surface in direct contact with one of the plates, and the at least one spacer and the regions of the plates above and below the at least one spacer define a reference region, wherein the reference region is transparent to light within a wavelength range, and (b) at least one region in the sample contact area on one plate and its corresponding region on the other plate are not occupied by the light-guiding spacers, defining a sampling region that is transparent to the light within the wavelength range.

5. A device for analyzing hemoglobin in a sample, comprising:
a first plate, a second plate, and a light guiding spacer, wherein:
   (v) the first plate and second plate are configured to sandwich a sample into a thin layer;
a first plate, a second plate, and a light guiding spacer, wherein:
   (i) the first plate and second plate are configured to sandwich a sample into a thin layer;
   (ii) the light-guiding spacer has a pillar shape that is sandwiched between the two plates, wherein each end of the pillar directly contact one of the plates so that there is no sample between the end of the pillar and the respective plate, wherein the light-guiding spacer is either surrounded by or near the sample, and wherein the direct-contact area and an average lateral cross-section of the pillar is respectively at least 1 um^2 (square micron) or larger;
wherein the spacing between the inner surfaces of the plates is 200 um or less.

6. An apparatus for sample analysis, comprising:
   a device of any of prior device embodiments, a light source, a camera; and an adaptor, wherein
   (i) the light source is configured to emit light in the wavelength range that is configured to go through the reference region;
   (ii) the camera is configured to image the reference region and the sampling region; and
   (iii) the adaptor is configured to position the device, the light source, and the camera relative to each other, so that the light from the light source goes through the reference region and the sampling region and is imaged by the camera.

7. The apparatus of any prior apparatus embodiments, further comprising:
   a processor, which is configured to process the images captured by the camera, and determine a property of the analyte in the sample based on comparing light transmissions from the reference region and the sampling region.

8. The apparatus of any prior Aspect, wherein the camera and the processor are parts of a single mobile device.

9. The apparatus of any prior Aspect, wherein the light source and the processor are parts of a single mobile device.

10. The apparatus of any prior Aspect, wherein the light source, the camera, and the processor are parts of a single mobile device.

11. The apparatus of any prior apparatus embodiments, wherein the mobile device is a smart phone.

12. A method for sample analysis using an transmitted light, comprising the steps of:
   (a) having a device of any prior device embodiments;
   (b) depositing the sample at the open configuration of the device, wherein the sample is suspected of containing an analyte;
   (c) bringing the device into the closed configuration;
   (d) having a light source that has a wavelength that is configured to go through the reference region of the device;
   (e) having an imager that is configured to image the reference region and the sampling region of the device;
   (f) having an adaptor that is configured to position the device, the light source, and the camera relative to each other, so that the light from the light source goes through the reference region and the sampling region and is imaged by the camera;
   (g) determining a property of the analyte by comparing the light transmission from the sampling region and the reference region.

13. The device, method, or system of any prior Aspect, wherein the analyte is hemoglobin.

14. The device, method, or system of any prior Aspect, wherein the analyte is type of cells.

15. The device, method, or system of any prior Aspect, wherein the thickness of the sample layer is regulated by plates and the light-guiding spacers and is substantially the same as the uniform height of the light-guiding spacers;

16. The device, method, or system of any prior Aspect, wherein the analyte is red blood cells.

17. The device, method, or system of any prior Aspect, wherein the analyte is white blood cells.

18. The device, method, or system of any prior Aspect, wherein the reference region and the sampling region have a same size.

19. The device, method, or system of any prior Aspect, wherein the reference region is within a corresponding area of the cross section of the light-guide spacer.

20. The device, method, or system of any prior Aspect, wherein the reference region is less than 0.1 um^2, less than 0.2 um^2, less than 0.5 um^2, less than 1 um^2, less than 2 um^2, less than 5 um^2, less than 10 um^2, less than 20 um^2, less than 50 um^2, less than 100 um^2, less than 200 um^2, less than 500 um^2, less than 1000 um^2, less than 2000 um^2, less than 5000 um^2, less than 10000 um^2, less than 20000 um^2, less than 50000 um^2, less than 100000 um^2, less than 200000 um^2, less than 500000 um^2, less than 1 mm^2, less than 2 mm^2, less than 5 mm^2, less than 10 mm^2, less than 20 mm^2, or less than 50 mm^2, or in a range between any of the two values.

21. The device, method, or system of any prior Aspect, wherein the device further comprises a plurality of light guiding spacers that have substantially uniform height, and wherein at least one of the light-guiding spacers is inside the sample contact area.

22. The device, method, or system of any prior Aspect, wherein the device further comprises a plurality of light guiding spacers that have substantially uniform height, wherein the distance between two neighboring light guiding spacers are known, and wherein at least one of the light-guiding spacers is inside the sample contact area.

23. The device, method, or system of any prior Aspect, wherein the device further comprises a plurality of light guiding spacers that have substantially uniform height, wherein the distances between two neighboring light guiding spacers are known and are substantially constant (i.e., the light guiding spacers are substantially a periodic array), and wherein at least one of the light-guiding spacers is inside the sample contact area.

24. The device, method, or system of any prior Aspect, wherein the bottom surface of the light guiding spacer is fixed on the inner surface of one of the plates by molding the light guiding spacer on the inner surface of the plate.

25. The device, method, or system of any prior Aspect, wherein the bottom surface of the light guiding spacer is fixed on the inner surface of one of the plates and is made of the same material as the inner surface.

26. The device, method, or system of any prior Aspect, wherein the bottom surface of the light guiding spacer is fixed on the inner surface of one of the plates, and is made of the same material as the inner surface, and the bottom surface of the light guiding spacer has no interface with on the inner surface of the plate.

27. The device, method, or system of any prior Aspect, wherein the wavelength of the light is longer than 300 nm, and wherein the wavelength of the light is also less than 20 μm, less than 15 μm, less than 10 μm, less than 5 μm, less than 4 μm, less than 3 μm, less than 2 μm, less than 1 μm, less than 800 nm, less than 750 nm, less than 700 nm, less than 650 nm, less than 600 nm, less than 550 nm, less than 500 nm, less than 450 nm, less than 400 nm, or in a range between any of the two values.

28. The device, method, or system of any prior Aspect, wherein the wavelength of the light is longer than 500 nm, and wherein the wavelength of the light is also less than 600 nm, less than 590 nm, less than 580 nm, less than 570 nm, less than 560 nm, less than 550 nm, less than 540 nm, less than 530 nm, less than 520 nm, less than 510 nm, or in a range between any of the two values.

29. The device, method, or system of any prior Aspect, wherein the average lateral cross-section of each light-guiding spacer is less than 1 um^2 (micron-square), 10 um^2, 20 um^2, 30 um^2, 50 um^2, 100 um^2, 150 um^2, 200 um^2, 300 um^2, 500 um^2, 1000 um^2, 2000 um^2, 5000 um^2, 10,000 um^2, 30,000 um^2, 100,000 um^2, 200,000 um^2, 500,000 um^2, 1 mm^2, 2 mm^2, 5 mm^2, 10 mm^2, 50 mm^2, or in a range between any of the two values.

30. The device, method, or system of any prior Aspect, wherein the average lateral cross-section of each light-guiding spacer is less than 1 um^2 (micron-square), 10 um^2, 20 um^2, 30 um^2, 50 um^2, 100 um^2, 150 um^2, 200 um^2, 300 um^2, 500 um^2, 1000 um^2, 2000 um^2, 5000 um^2, 10,000 um^2, 30,000 um^2, 100,000 um^2, 200,000 um^2, or in a range between any of the two values.

31. The device, method, or system of any prior Aspect, wherein the average lateral cross-section of each light-guiding spacer is less than 1 um^2 (micron-square), 10 um^2, 20 um^2, 30 um^2, 50 um^2, 100 um^2, 150 um^2, 200 um^2, 300 um^2, 500 um^2, 1000 um^2, 2000 um^2, 5000 um^2, 10,000 um^2, 30,000 um^2, or in a range between any of the two values.

32. The device, method, or system of any prior Aspect, wherein the sample contact area is larger than 100 um^2 (micron-square), larger than 200 um^2, larger than 400 um^2, larger than 600 um^2, larger than 800 um^2, larger than 1,000 um^2, larger than 2,000 um^2, larger than 4,000 um^2, larger than 6,000 um^2, larger than 8,000 um^2, larger than 10,000 um^2, larger than 20,000 um^2, larger than 40,000 um^2, larger than 60,000 um^2, larger than 80,000 um^2, larger than 100,000 um^2, larger than 200,000 um^2, larger than 250,000 um^2, larger than 500,000 um^2 (micron-square), or in a range between any of the two values.

33. The device, method, or system of any prior Aspect, wherein a predetermined constant inter-spacer distance that is at least about 2 times larger than the size of the analyte.

34. The device, method, or system of any prior Aspect, wherein a predetermined constant inter-spacer distance that is larger than the size of the analyte by a factor that is at least 2 times, at least 6 times, at least 8 times, at least 10 times, at least 20 times, at least 40 times, at least 60 times, at least 80 times, or at least 100 times.

35. The device, method, or system of any prior Aspect, wherein the height of light-guiding spacer is 1 um, 2 um, 5 um, 10 um, 30 um, 50 um, 100 um, 200 um, 500 um, 1,000 um, 2,000 um, 5,000 um, 10,000 um, or in a range between any of the two values.

36. The device, method, or system of any prior Aspect, wherein the spacers are arranged in periodic array with a period of 1 um, 2 um, 5 um, 10 um, 30 um, 50 um, 100 um, 200 um, 500 um, 1,000 um, 2,000 um, 5,000 um, 10,000 um, or in a range between any of the two values.

37. The device, method, or system of any prior Aspect, wherein the LGS has a pillar shape with its ends substantially flat.

38. The device, method, or system of any prior Aspect, wherein one or both of the ends of the LGS are fixed with one or both of the plates by bonding, fusing, made from a single piece, or other methods that connect LGS to the plates.

39. The device, method, or system of any prior Aspect, wherein the shape of the lateral cross-section of LGS includes, not limited to circular, rectangle, square, triangle, polygon, alphabets, numbers, or a combination of thereof.

40. The device, method, or system of any prior Aspect, wherein the average lateral cross-section of each light-guiding spacer (LGS) is 1 um^2 (micron-square), 10 um^2, 20 um^2, 30 um^2, 50 um^2, 100 um^2, 150 um^2, 200 um^2, 300 um^2, 500 um^2, 1000 um^2, 2000 um^2, 5000 um^2, 10,000 um^2, 30,000 um^2, 100,000 um^2, 200,000 um^2, 500,000 um^2, 1 mm^2, 2 mm^2, 5 mm^2, 10 mm^2, 50 mm^2, or in a range between any of the two values.

41. The device, method, or system of any prior Aspect, wherein the average lateral cross-section of each light-guiding spacer is 1 um^2 (micron-square), 10 um^2, 20 um^2, 30 um^2, 50 um^2, 100 um^2, 150 um^2, 200 um^2, 300 um^2, 500 um^2, 1000 um^2, 2000 um^2, 5000 um^2, 10,000 um^2, 30,000 um^2, 100,000 um^2, 200,000 um^2, or in a range between any of the two values.

42. The device, method, or system of any prior Aspect, wherein the average lateral cross-section of each light-guiding spacer is 1 um^2 (micron-square), 10 um^2, 20 um^2, 30 um^2, 50 um^2, 100 um^2, 150 um^2, 200 um^2, 300 um^2, 500 um^2, 1000 um^2, 2000 um^2, 5000 um^2, 10,000 um^2, 30,000 um^2, or in a range between any of the two values.

43. The device, method, or system of any prior Aspect, wherein the average lateral cross-section of each light-guiding spacer is 1 um^2 (micron-square), 10 um^2, 20 um^2, 30 um^2, 50 um^2, 100 um^2, 150 um^2, 200 um^2, 300 um^2, 500 um^2, 1000 um^2, 2000 um^2, 5000 um^2, or in a range between any of the two values.

44. The device, method, or system of any prior Aspect, wherein the average lateral cross-section of each light-guiding spacer is larger than the wavelength of the light that goes through the reference region, by 1 fold, 2 fold, 3 fold, 5 fold, 10 fold, 20 fold, 50 fold, 100 fold, 200 fold, 500 fold, 1000 fold, 5000 fold or in a range between any of the two values.

45. The device, method, or system of any prior Aspect, wherein the average lateral cross-section of each light-guiding spacer is larger than the wavelength of the light that goes through the reference region, by 1 fold, 2 fold, 3 fold, 5 fold, 10 fold, 20 fold, 50 fold, 100 fold, 200 fold, 500 fold, or in a range between any of the two values.

46. The device, method, or system of any prior Aspect, wherein the reference region is less than the size of the minimum lateral cross-section of the light guiding pillar. One advantage is to avoid or reduce light scattering the light guiding sidewall to affect the reference signal.

47. The device, method, or system of any prior Aspect, wherein the minimum distance between the edge of the light guiding spacer and that of the reference region is 1 um (micron), 2 um, 3 um, 5 um, 10 um, 20 um, 30 um, 50 um, 100 um, 200 um, 500 um, 1000 um, or in a range between any of the two values.

48. The device, method, or system of any prior Aspect, wherein the minimum distance between the edge of the light guiding spacer and that of the reference region is 1 um (micron), 2 um, 3 um, 5 um, 10 um, 20 um, 30 um, 50 um, 100 um, 200 um, or in a range between any of the two values.

49. The device, method, or system of any prior Aspect, wherein the minimum distance between the edge of the light guiding spacer and that of the reference region is 1 um (micron), 2 um, 3 um, 5 um, 10 um, 20 um, 30 um, 50 um, or in a range between any of the two values.

50. The device, method, or system of any prior Aspect, wherein the minimum distance between the edge of the light guiding spacer and that of the reference region is larger than the wavelength, that goes through the reference region, by 1 fold, 2 fold, 3 fold, fold, 10 fold, 20 fold, 50 fold, 100 fold, 200 fold, 500 fold, 1000 fold, 5000 fold or in a range between any of the two values.

51. The device, method, or system of any prior Aspect, wherein the minimum distance between the edge of the light guiding spacer and that of the reference region is larger than the wavelength, that goes through the sampling region, by 1 fold, 2 fold, 3 fold, 5 fold, 10 fold, 20 fold, 50 fold, 100 fold, 200 fold, 500 fold, 1000 fold, 5000 fold or in a range between any of the two values.

52. The device, method, or system of any prior Aspect, wherein the ratio of the reference region area and the light guiding spacer area is 3/10, 2/5, 1/2, 3/5, 7/10, 4/5, or in a range between any of the two values.

53. The device, method, or system of any prior Aspect, wherein the edge of the sampling region is a distance away from the edge of the light guiding pillar.

54. The device, method, or system of any prior Aspect, wherein the area of the sampling region is 3/5, 7/10, 4/5, 9/10, 1, 11/10, 6/5, 13/10, 7/5, 3/2, or in the range between any of the two values, of the periodic inter spacer distance.

55. The device, method, or system of any prior Aspect, wherein the distance between the edge of the sampling region and that of the light guiding spacer is 1/5, 3/10, 2/5, 1/2, 3/5, 7/10, 4/5, 9/10, 1, or in the rage between any of the two values, of the light guiding spacer area.

56. The device, method, or system of any prior Aspect, wherein the distance between the edge of the sampling region and that of the light guiding spacer is larger than the wavelength, that goes through the reference region, by 1 fold, 2 fold, 3 fold, 5 fold, 10 fold, 20 fold, 50 fold, 100 fold, 200 fold, 500 fold, 1000 fold, 5000 fold or in a range between any of the two values.

57. The device, method, or system of any prior Aspect, wherein the distance between the edge of the sampling region and that of the light guiding spacer is larger than the wavelength, that goes through the sampling region, by 1 fold, 2 fold, 3 fold, 5 fold, 10 fold, 20 fold, 50 fold, 100 fold, 200 fold, 500 fold, 1000 fold, 5000 fold or in a range between any of the two values.

58. The device, method, or system of any prior Aspect, wherein the distance between the edge of sampling area and the reference region is 1 um (micron), 2 um, 3 um, 5 um, 10 um, 20 um, 30 um, 40 um, 50 um, 100 um, 200 um, 500 um, 1000 um or in the range between any of the two values.

59. The device, method, or system of any prior Aspect, wherein the distance between the edge of sampling area and the reference region is from 30 um (micron) to 50 um, 20 um to 60 um, 10 um to 70 um, 5 um to 75 um, or in the range between any of the two values.

60. The device, method, or system of any prior Aspect, wherein the distance between the edge of sampling area and the reference region is larger than the wavelength, that goes through the reference region, by 1 fold, 2 fold, 3 fold, 5 fold, 10 fold, 20 fold, 50 fold, 100 fold, 200 fold, 500 fold, 1000 fold, 5000 fold or in a range between any of the two values.

61. The device, method, or system of any prior Aspect, wherein the distance between the edge of sampling area and the reference region is 2/5, 1/2, 3/5, 7/10, 4/5, 9/10, 1, 11/10, 6/5, 13/10, 7/5, 3/2, 8/5, 17/10, or in the range between any of the two values, of the light guiding spacer area.

62. The device, method, or system of any prior Aspect, wherein the distance between the edge of sampling area and the reference region is larger than the wavelength of the light that goes through the reference region, by 1 fold, 2 fold, 3 fold, 5 fold, 10 fold, 20 fold, 50 fold, 100 fold, 200 fold, 500 fold, 1000 fold, 5000 fold or in a range between any of the two values.

63. The device, method, or system of any prior Aspect, wherein the distance between the edge of sampling area and the reference region is larger than the wavelength, that goes through the sampling region, by 1 fold, 2 fold, 3 fold, 5 fold, 10 fold, 20 fold, 50 fold, 100 fold, 200 fold, 500 fold, 64. The device, apparatus, or method of any prior Aspect, wherein the analyte is a biomarker, an environmental marker, or a foodstuff marker.

65. The device, apparatus, or method of any prior Aspect, wherein the analyte is a biomarker indicative of the presence or severity of a disease or condition.

66. The device, apparatus, or method of any prior Aspect, wherein the analyte is a cell, a protein, or a nucleic acid.

67. The device, apparatus, or method of any prior Aspect, wherein the analyte is hemoglobin.

68. The device, apparatus, or method of any prior Aspect, wherein the analyte comprises proteins, peptides, nucleic acids, synthetic compounds, inorganic compounds, organic compounds, bacteria, virus, cells, tissues, nanoparticles, and other molecules, compounds, mixtures and substances thereof.

69. The device, apparatus, or method of any prior Aspect, wherein the sample is original, diluted, or processed forms of: bodily fluids, stool, amniotic fluid, aqueous humour, vitreous humour, blood, whole blood, fractionated blood, plasma, serum, breast milk, cerebrospinal fluid, cerumen, chyle, chime, endolymph, perilymph, feces, gastric acid, gastric juice, lymph, mucus, nasal drainage, phlegm, pericardial fluid, peritoneal fluid, pleural fluid, pus, rheum, saliva, sebum, semen, sputum, sweat, synovial fluid, tears, vomit, urine, or exhaled breath condensate.
70. The device, apparatus, or method of any prior Aspect, wherein the sample is original, diluted, or processed forms of blood.
71. The device, apparatus, or method of any prior Aspect, wherein the sample comprises whole blood.
72. The method or device of any prior Aspect, wherein the inter spacer distance (SD) is equal or less than about 150 um (micrometer).
73. The method or device of any prior Aspect, wherein the inter spacer distance (SD) is equal or less than about 100 um (micrometer).
74. The method or device of any prior Aspect, wherein the fourth power of the inter-spacer-distance (ISD) divided by the thickness (h) and the Young's modulus (E) of the flexible plate ($ISD^4/(hE)$) is $5\times10^6$ um$^3$/GPa or less.
75. The method or device of any prior Aspect, wherein the fourth power of the inter-spacer-distance (ISD) divided by the thickness (h) and the Young's modulus (E) of the flexible plate ($ISD^4/(hE)$) is $5\times10^5$ um$^3$/GPa or less.
76. The method or device of any prior Aspect, wherein the spacers have pillar shape, a substantially flat top surface, a predetermined substantially uniform height, and a predetermined constant inter-spacer distance that is at least about 2 times larger than the size of the analyte, wherein the Young's modulus of the spacers times the filling factor of the spacers is equal or larger than 2 MPa, wherein the filling factor is the ratio of the spacer contact area to the total plate area, and wherein, for each spacer, the ratio of the lateral dimension of the spacer to its height is at least 1 (one).
77. The method or device of any prior Aspect, wherein the spacers have pillar shape, a substantially flat top surface, a predetermined substantially uniform height, and a predetermined constant inter-spacer distance that is at least about 2 times larger than the size of the analyte, wherein the Young's modulus of the spacers times the filling factor of the spacers is equal or larger than 2 MPa, wherein the filling factor is the ratio of the spacer contact area to the total plate area, and wherein, for each spacer, the ratio of the lateral dimension of the spacer to its height is at least 1 (one), wherein the fourth power of the inter-spacer-distance (ISD) divided by the thickness (h) and the Young's modulus (E) of the flexible plate ($ISD^4/(hE)$) is $5\times10^6$ um$^3$/GPa or less.
78. The device of any prior device Aspect, wherein the ratio of the inter-spacing distance of the spacers to the average width of the spacer is 2 or larger, and the filling factor of the spacers multiplied by the Young's modulus of the spacers is 2 MPa or larger.
79. The device, apparatus, or method of any prior Aspect, wherein one or both plates comprises a location marker, either on a surface of or inside the plate, that provide information of a location of the plate.
80. The device, apparatus, or method of any prior Aspect, wherein one or both plates comprises a scale marker, either on a surface of or inside the plate, that provide information of a lateral dimension of a structure of the sample and/or the plate.
81. The device, apparatus, or method of any prior Aspect, wherein one or both plates comprises an image marker, either on a surface of or inside the plate that assists an imaging of the sample.
82. The device, method, or system of any prior Aspect, wherein the sample is original, diluted, or processed forms of: bodily fluids, stool, amniotic fluid, aqueous humour, vitreous humour, blood, whole blood, fractionated blood, plasma, serum, breast milk, cerebrospinal fluid, cerumen, chyle, chime, endolymph, perilymph, feces, gastric acid, gastric juice, lymph, mucus, nasal drainage, phlegm, pericardial fluid, peritoneal fluid, pleural fluid, pus, rheum, saliva, sebum, semen, sputum, sweat, synovial fluid, tears, vomit, urine, or exhaled breath condensate.
83. The device, method, or system of any prior Aspect, wherein the sample is original, diluted, or processed forms of blood.
84. The device, method, or system of any prior Aspect, wherein the sample comprises whole blood.
85. The device, method, or system of any prior Aspect, wherein the sample is a biological sample, a chemical sample, an environmental sample, or a foodstuff sample.

It must be noted that, as used herein and in the appended claims, the singular forms "a", "an", and "the" include plural referents unless the context clearly dictates otherwise, e.g., when the word "single" is used. For example, reference to "an analyte" includes a single analyte and multiple analytes, reference to "a capture agent" includes a single capture agent and multiple capture agents, reference to "a detection agent" includes a single detection agent and multiple detection agents, and reference to "an agent" includes a single agent and multiple agents.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. The term "about" or "approximately" can mean within an acceptable error range for the particular value as determined by one of ordinary skill in the art, which will depend in part on how the value is measured or determined, e.g. the limitations of the measurement system. For example, "about" can mean within 1 or more than 1 standard deviation, per the practice in the art. Alternatively, "about" can mean a range of up to 20%, up to 10%, up to 5%, or up to 1% of a given value. Alternatively, particularly with respect to biological systems or processes, the term can mean within an order of magnitude, within 5-fold, and more preferably within 2-fold, of a value. Where particular values are described in the application and claims, unless otherwise stated the term "about" meaning within an acceptable error range for the particular value should be assumed. The term "about" has the meaning as commonly understood by one of ordinary skill in the art. In certain embodiments, the term "about" can refer to ±10%. In certain embodiments, the term "about" can refer to ±5%.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function. Similarly, subject matter that is recited as being configured to perform a particular function can additionally or alternatively be described as being operative to perform that function.

As used herein, the phrase, "for example," the phrase, "as an example," and/or simply the terms "example" and "exemplary" when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the phrases "at least one of" and "one or more of," in reference to a list of more than one entity, means any one or more of the entity in the list of entity, and is not limited to at least one of each and every entity specifically listed within the list of entity. For example, "at least one of A and B" (or, equivalently, "at least one of A or B," or, equivalently, "at least one of A and/or B") can refer to A alone, B alone, or the combination of A and B.

As used herein, the term "and/or" placed between a first entity and a second entity means one of (1) the first entity, (2) the second entity, and (3) the first entity and the second entity. Multiple entity listed with "and/or" should be construed in the same manner, e.g., "one or more" of the entity so conjoined. Other entity can optionally be present other than the entity specifically identified by the "and/or" clause, whether related or unrelated to those entities specifically identified.

Where numerical ranges are mentioned herein, the invention includes embodiments in which the endpoints are included, embodiments in which both endpoints are excluded, and embodiments in which one endpoint is included and the other is excluded. It should be assumed that both endpoints are included unless indicated otherwise. Furthermore, unless otherwise indicated or otherwise evident from the context and understanding of one of ordinary skill in the art.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

What is claimed is:

1. An apparatus for measuring a light absorption of a sample for each wavelength in a light with two difference wavelengths, the apparatus comprising:
a sample holder that has a first plate, a second plate, a light guiding spacer (LGS), at least a sampling region, and at least a reference region, wherein the two plates sandwich the sample to be analyzed into a thin layer, wherein the sample contains or is suspected of containing an analyte that absorbs the light,
a light source providing a light that has a first wavelength, Xi, mixed with a second wavelength, $\lambda_2$,
a color camera for measuring the light that is transmitted through the sample in the sample holder, wherein the transmitted light has an intensity for the first wavelength, $I_{\lambda_1}$, mixed with an intensity for the second wavelength, $I_{\lambda_2}$, wherein the camera comprises a first color channel, A, and a second color channel, B; each of the first and second color channels measures the light to generate a signal $I_A$ and $I_B$ respectively;
a non-transitory computer readable medium storing an algorithm that determines (i) the intensity of $I_{\lambda_1}$ and $I_{\lambda_2}$, respectively, using the signal $I_A$ and $I_B$ and a predetermined channel cross talking matrix, and (ii) the light absorption of a sample for each of the wavelengths;
wherein the sampling region is a region that the light can go through, in sequence, the first plate, the sample, and the second plate, wherein the sampling region does not have the LGS;
wherein the reference region is a region that the light transmits through, in sequence, the first plate, the light-guiding spacer, and the second plate, without going through the sample.

2. The apparatus of claim 1, wherein the light source with two different wavelengths comprises a broadband light source passing from a bandwidth filter, wherein the bandwidth filter allows the light of two wavelengths to pass through while blocking the other wavelengths.

3. The apparatus of claim 1, wherein the light with two different wavelengths comprises two light sources emitting at the same time, wherein each light source has a different wavelength.

4. The apparatus of claim 1, wherein the color camera is a camera on mobile phone.

5. The apparatus of claim 1, wherein the color camera has at least two color channels and each color channel comprises more than one detection element.

6. The apparatus of claim 1, wherein the first channel is the red channel of a color camera, and the second channel is the green channel of the same color.

7. The apparatus of claim 1, wherein each of matrix elements of the predetermined cross-channel matrix is predetermined by measurements, respectively, using the first wavelength and the second wavelength.

8. The apparatus of claim 1, wherein the first plate and the second plate are movable relative to each other into different configurations, including an open configuration and a closed configuration;
wherein in the open configuration, the two plates are partially or entirely separated apart, the spacing between the two plates are not regulated by the LGS, and the sample is deposited on one or both of the plates;
wherein in the closed configuration which is configured after the sample deposition in the open configuration: at least a part of the sample is compressed by the two plates into a layer of substantially uniform thickness, wherein the substantially uniform thickness of the layer is confined by the inner surfaces of the two plates and is regulated by the plates and the LGS.

9. The apparatus of claim 1, wherein one or both of the plates of the sample holder are flexible, the fourth power of the inter-spacer-distance (ISD) divided by the thickness (h) and the Young's modulus (E) of the flexible plate (ISD$^4$/(hE)) is 5×10$^5$ μm$^3$/GPa or less, and the thickness of the flexible plate times the Young's modulus of the flexible plate is in the range 60 to 750 GPa-μm.

10. The apparatus of claim 1, wherein the sample holder further comprises a plurality of light guiding spacers between the two plates, wherein the light guiding spacers have a substantially uniform height, and wherein at least one of the light-guiding spacers is inside the sample contact area.

11. The apparatus of claim 10, wherein the distance between two neighboring light guiding spacers is known and periodic.

12. The apparatus of claim 1, wherein the bandwidth of the first wavelength and the second wavelength is, respectively, in a range of from 1 to 50 nm.

13. The apparatus of claim 1, wherein the color camera is a camera on mobile phone, and wherein the first wavelength is centered at a value selected in the range of from 500 nm to 550 nm, and the second wavelength is centered at a value selected in the range from 600 to 700 nm.

14. The apparatus of claim 13, wherein the first wavelength and the second wavelength respectively have a bandwidth of 1 nm to 50 nm.

15. The apparatus of claim 13, wherein the first wavelength and the second wavelength respectively have a bandwidth of 50 nm to 100 nm.

16. The apparatus of claim 1, wherein the sample thickness is 250 μm or less.

17. The apparatus of claim 1, wherein the spacers and/or LGS have a height of 250 μm or less.

18. The apparatus of claim 1, wherein the apparatus further comprises a non-transitory computer readable medium storing an algorithm of machine learning that is trained by learning the scattering.

19. The apparatus of claim 1, wherein the sample of a whole blood sample, wherein the apparatus further comprises a non-transitory computer readable medium storing a machine learning model that determines the hemoglobin in the whole blood sample, wherein the training of the machine learning model comprises a use of an image of a whole blood sample that is not lysed and an image of a whole blood sample that is lysed.

20. The apparatus of claim 1, wherein the first wavelength and the second wavelength respectively have a bandwidth of 50 nm to 100 nm.

21. The apparatus of claim 1, wherein the first wavelength is centered at a value selected in the range of from 500 nm to 550 nm, and the second wavelength is centered at a value selected in the range from 600 to 800 nm.

22. The apparatus of claim 1, the color camera is a camera on mobile phone and wherein the first wavelength is centered at a value selected in the range of from 500 nm to 550 nm, and the second wavelength is centered at a value selected in the range from 600 to 800 nm.

23. The apparatus of claim 1, wherein the first wavelength is centered at a value selected in the range of from 532 nm to 576 nm, and the second wavelength is centered at a value selected in the range from 625 to 675 nm.

24. The apparatus of claim 1, wherein the algorithm determines the light absorption in the sample by taking a ratio of the intensities of the light transmitted through the sample region and through the reference region.

25. The apparatus of claim 1, wherein the light source further has a third wavelength, $\lambda_3$ that is mixed with the light of the first wavelength and the second wavelength, wherein the light of a third wavelength, $\lambda_3$, after transmitted through the sample has an intensity of $I_{\lambda_3}$, wherein the color camara further has a third color channel that measures the light, generating a signal $I_C$, and whereint the algorithm determines (i) the intensity of $I_{\lambda_1}$, $I_{\lambda_2}$, and $I_{\lambda_3}$, respectively, using the signal $I_A$ $I_B$ and $I_C$ and the channel cross talking matrix, and (ii) the light absorption of a sample for each of the wavelength and (ii) the light absorption of a sample for each of the wavelengths.

26. A method of determining, using a color camera, an intensity for each wavelength in a light with two different wavelengths, the method comprising:
providing a color camera for measuring light, wherein the camera comprises a first color channel, A, and a second color channel, B;
obtaining a light source that has a first wavelengths of an intensity, $I_{\lambda_1}$, mixed with a second wavelength of an intensity, $I_{\lambda_2}$;
providing a non-transitory computer readable medium storing an algorithm;
measuring the light using the color camera, wherein each color channel of the color camera generates, respectively, a signal $I_A$ and a signal $I_B$; and
determining the intensity of $I_{\lambda_1}$ and $I_{\lambda_2}$, respectively using the algorithm and the signal $I_A$ and $I_B$, and
wherein the algorithm comprises a predetermined channel cross talking matrix that relates the signal $I_A$ and $I_B$ to the intensity of $I_{\lambda_1}$ and $I_{\lambda_2}$.

27. A method of measuring a light absorption of a sample for each wavelength in a light with two different wavelengths, the method comprising:
providing the apparatus of claim 1;
placing the sample to be analyzed in the sample holder, wherein the sample contains or is suspected of containing an analyte that absorbs the light;
shining the light through the sample in the sample holder and measuring the signal $I_A$ and $I_B$ from the light that passes through the sample from the light that passes through the sample using the color channels of the color camera;
determining the light absorption of the sample for each wavelength using the algorithm and calculating the intensity of $I_{\lambda_1}$ and $I_{\lambda_2}$ for the sample region and the reference region respectively.

28. The method of claim 27, wherein the sample is a blood; wherein the hemoglobin in the blood is determined from the light absorptions of the sample for the first wavelength and the second wavelength.

29. The method of claim 28, wherein the algorithm comprises a machine learning model, wherein the training of the machine learning model uses images of the sample from the camera.

30. The method of claim 28, wherein the sample of a whole blood sample, wherein the apparatus further comprises a non-transitory computer readable medium storing a machine learning model that determines the hemoglobin in the whole blood sample, wherein the training of the machine learning model comprises a use of an image of a whole blood sample that is not lysed and an image of a whole blood sample that is lysed.

31. The method of claim 28, wherein the first wavelength is centered at a value selected in the range of from 500 nm to 550 nm, and the second wavelength is centered at a value selected in the range from 600 to 700 nm.

32. The method of claim 31, wherein the first wavelength and the second wavelength respectively have a bandwidth in a range of 1 nm to 50 nm.

33. The method of claim 31, wherein the first wavelength and the second wavelength respectively have a bandwidth in a range of 50 nm to 100 nm.

34. The method of claim 28, wherein the first wavelength is centered at a value selected in the range of from 500 nm to 550 nm, and the second wavelength is centered at a value selected in the range from 600 to 800 nm.

35. The method of claim 28, wherein the first wavelength is centered at a value selected in the range of from 532 nm to 576 nm, and the second wavelength is centered at a value selected in the range from 625 to 675 nm.

36. The method of claim 35, wherein the color camera is a camera on mobile phone.

37. The method of claim 28, wherein the first wavelength is centered at a value selected in the range of from 500 nm to 550 nm, and the second wavelength is centered at a value selected in the range from 600 to 700 nm, and wherein the LGS have a height of 20 μm to 40 μm.

38. The method of claim 37, wherein the first wavelength and the second wavelength respectively have a bandwidth of 1 nm to 100 nm.

39. The method of claim 28, wherein the algorithm determines the light absorption in the sample by taking a ratio of the intensities of the light transmitted through the sample region and through the reference region.

40. The method of claim 28, wherein the light source further has a third wavelength, $\lambda_3$ that is mixed with the light of the first wavelength and the second wavelength, wherein the light of a third wavelength, $\lambda_3$, after transmitted through the sample has an intensity of $I_{\lambda_3}$, wherein the color camara further has a third color channel that measures the light, generating a signal $I_C$, and wherein the algorithm determines (i) the intensity of $I_{\lambda_1}$, $I_{\lambda_2}$, and $I_{\lambda_3}$, respectively, using the signal $I_A$ $I_B$ and $I_C$ and the channel cross talking matrix, and (ii) the light absorption of a sample for each of the wavelength and (ii) the light absorption of a sample for each of the wavelengths.

* * * * *